United States Patent [19]

Gassaway et al.

[11] 4,373,197
[45] Feb. 8, 1983

[54] EXPLORATION SYSTEM FOR ENHANCING THE LIKELIHOOD OF PREDICTING LITHOLOGY OF EARTH FORMATIONS ASSOCIATED WITH DEPOSITS OF ORE, MARKER ROCK AND/OR ECONOMIC MINERALS

[75] Inventors: Gary S. Gassaway, San Rafael; William R. Scott, El Cerrito; Richard J. Runge, Anaheim, all of Calif.

[73] Assignee: Chevron Research Company, San Francisco, Calif.

[21] Appl. No.: 176,605

[22] Filed: Aug. 8, 1980

Related U.S. Application Data

[63] Continuation of Ser. No. 971,627, Dec. 20, 1978, abandoned.

[51] Int. Cl.³ .............................................. G01V 1/30
[52] U.S. Cl. ....................................... 367/36; 367/58; 367/73; 364/421
[58] Field of Search ....................... 367/36, 50, 95, 73; 364/421

[56] References Cited

U.S. PATENT DOCUMENTS

| | | | |
|---|---|---|---|
| 2,267,858 | 12/1941 | Dix ........................................ | 367/36 |
| 2,596,463 | 5/1952 | Barthelmes .......................... | 367/36 |
| 2,658,578 | 11/1953 | Olephant ............................... | 367/58 |
| 3,302,164 | 1/1967 | Waters et al. ........................ | 367/75 |
| 3,946,356 | 3/1976 | Anstey ................................... | 367/73 |

OTHER PUBLICATIONS

Braile, "Interpretation of . . . Amplitude-Corrected Seismic Refraction Profiles", 1977, pp. 427–439.
Geophysical Maragraph 20, American Geophysical Union, "The Earths Crust".

*Primary Examiner*—Nelson Moskowitz
*Attorney, Agent, or Firm*—H. D. Messner; Edward J. Keeling

[57] ABSTRACT

The present invention provides for the accurate mapping of shallow crustal earth formations by means for refractive seismic waves to identify structure, elastic parameters and lithology of the strata undergoing survey to indicate deposits of ore, marker rock, economic minerals and the like. After a "roll-along" technique has been used in the field to collect the refraction data and preliminary processing steps undertaken in which there are provisions for (i) accurate separation and determination of seismic shear and compressional responses; (ii) stacking displays that allow for accurate identification of shape of the surveyed strata; and (iii) final depth displays of the refracting bed segments associated with seismic shear and compressional wave velocities as well as Poisson's ratios, in accordance with the present invention, additional processing then occurs. The added processing indicates lithology of the earth formation to a surprising degree based, inter alia, on multi-dimensional space searching techniques.

12 Claims, 19 Drawing Figures

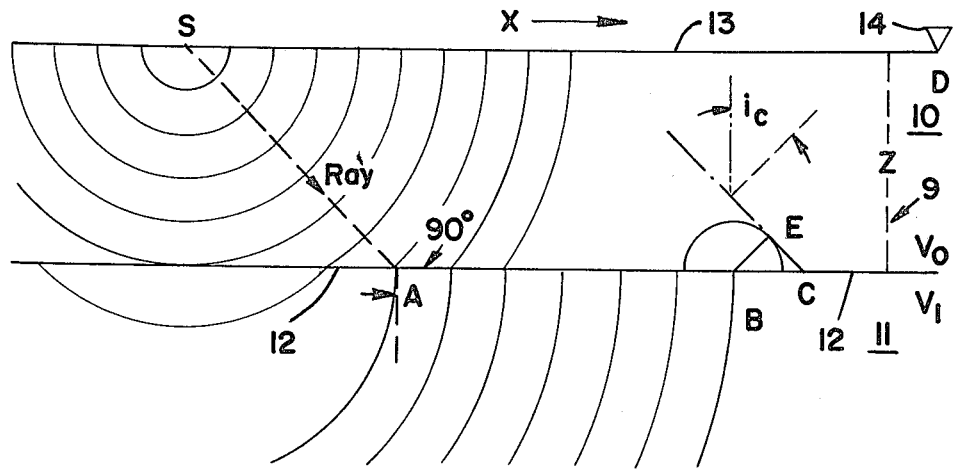
FIG_1
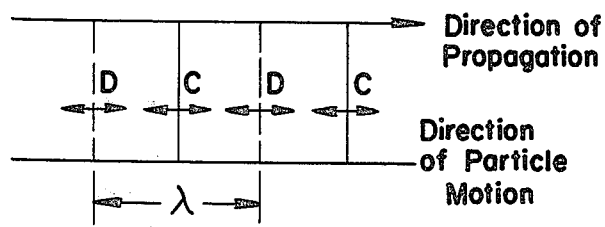
FIG_2a
Compressional waves
D- Dilatational motion
C- Compressional motion
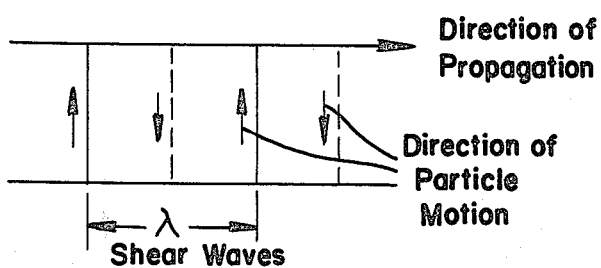
FIG_2b
Shear Waves
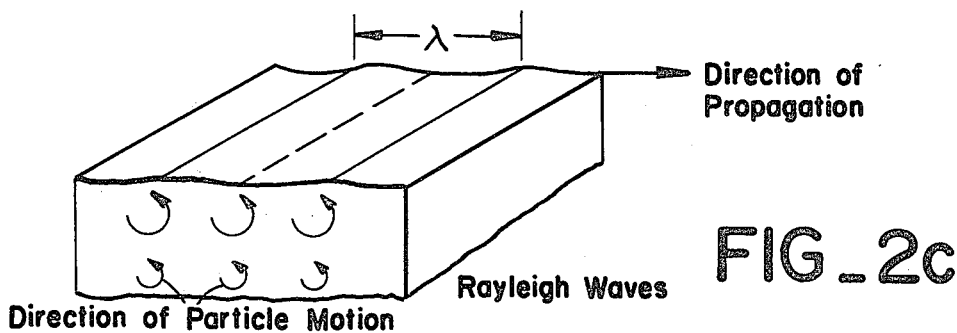
FIG_2c
Rayleigh Waves
Direction of Particle Motion

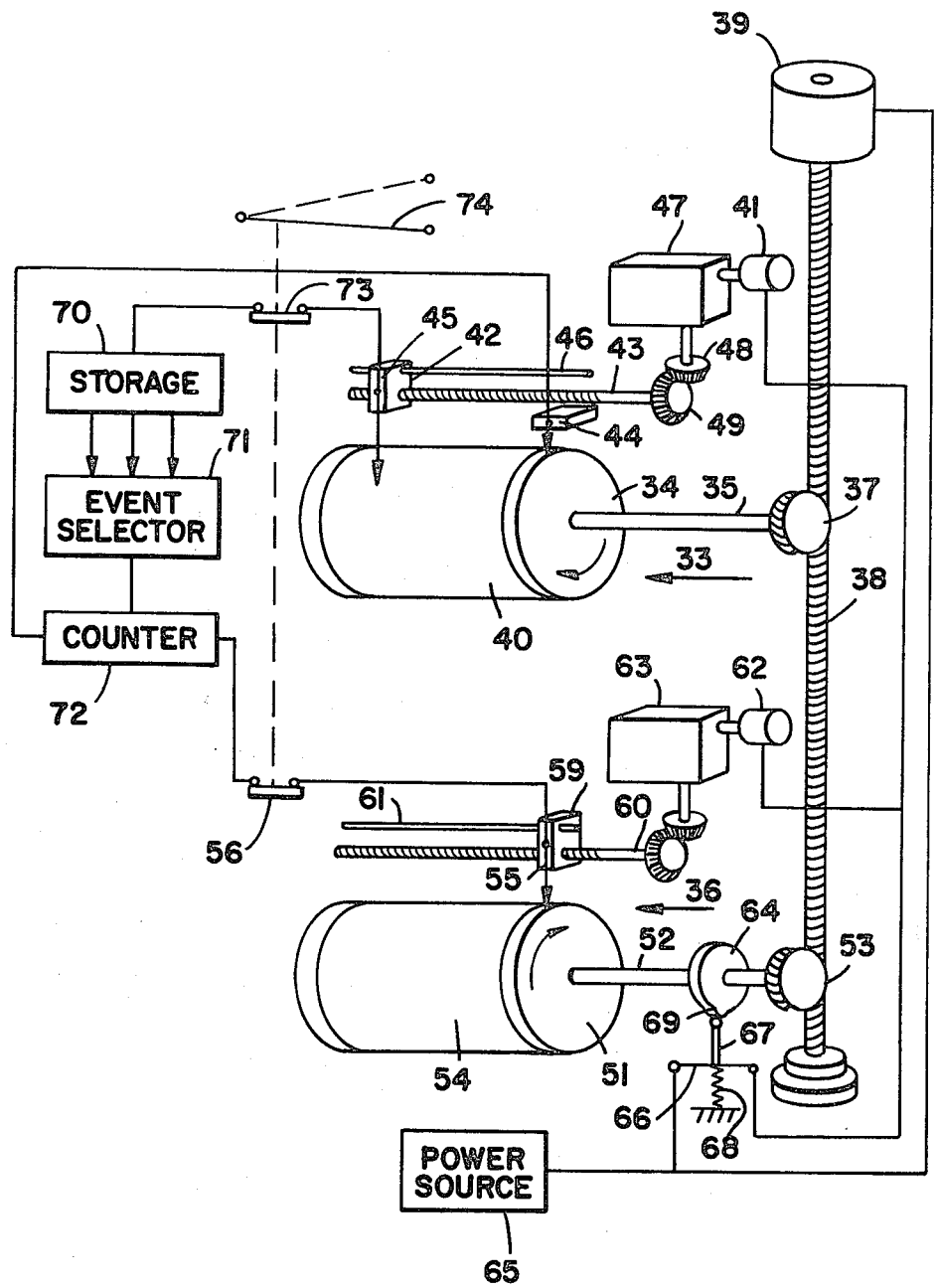
FIG_4

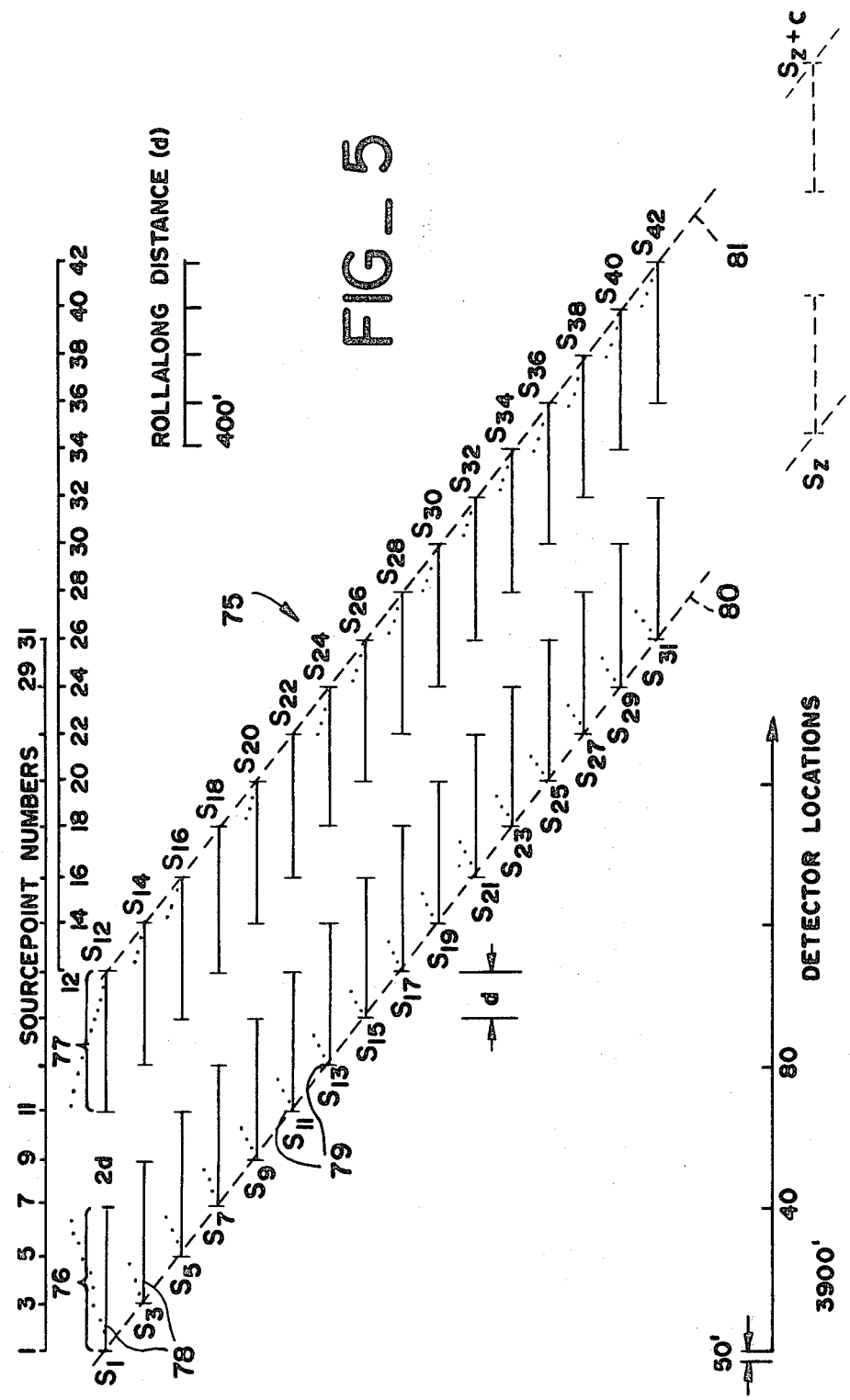

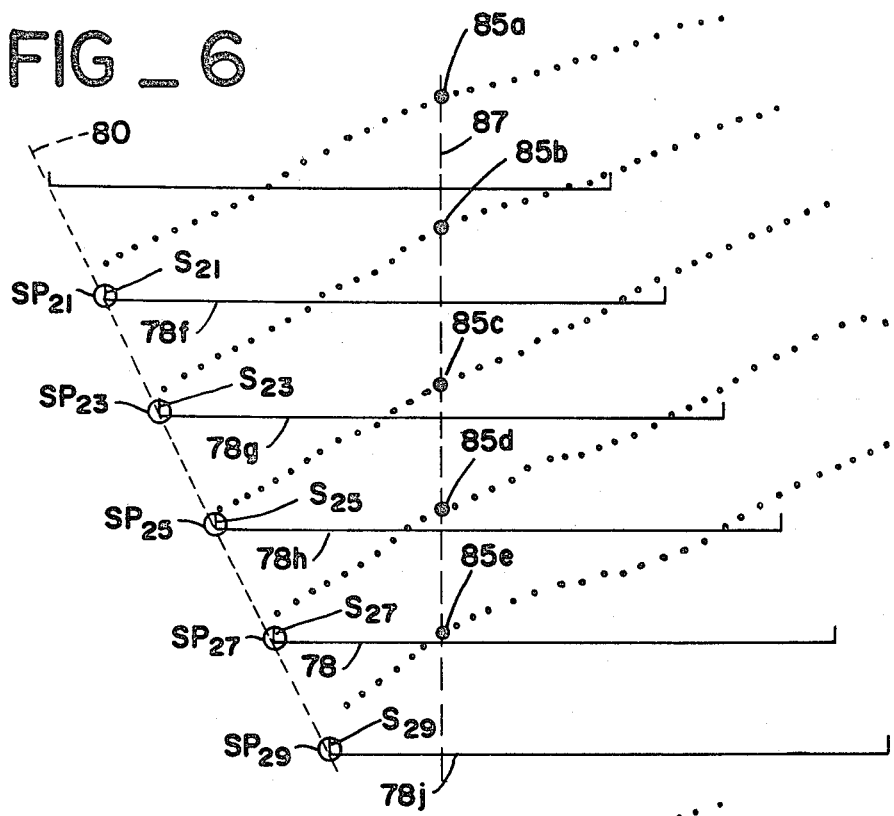
FIG_6
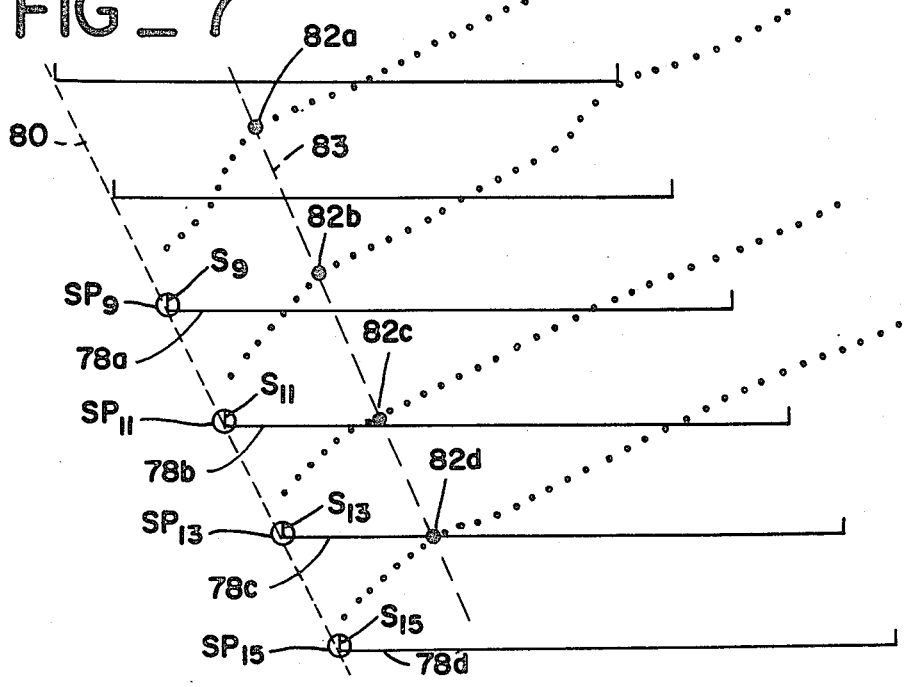
FIG_7

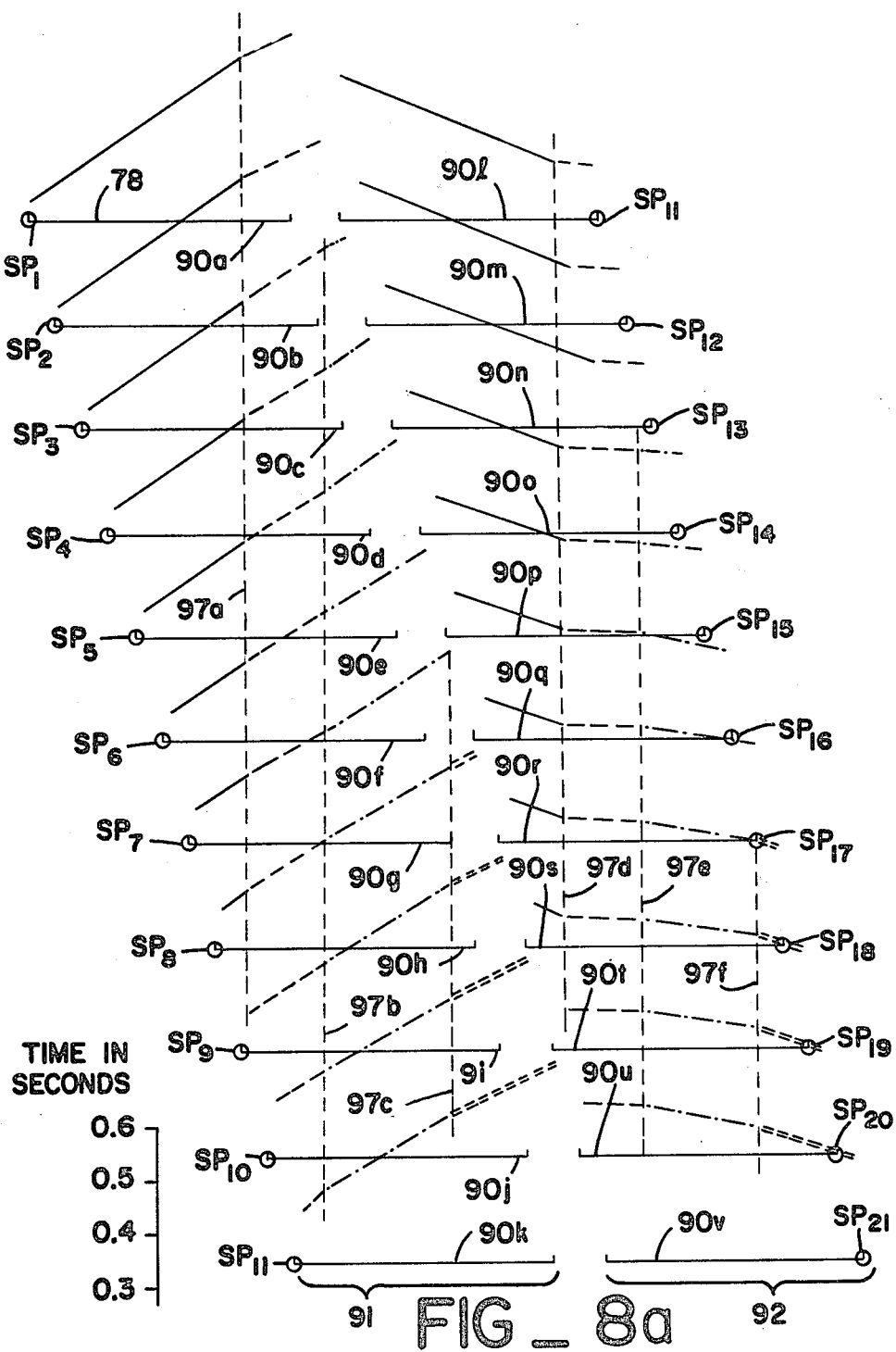
FIG_8a

LEGEND RELATED TO DEPICTED VELOCITIES

APPARENT COMPRESSION VELOCITY (FT/SEC)

"FORWARD" H-BARS 90a - 90k

SOLID LINE          (———) = 11,881
    BROKEN LINE       (– – –) = 14,285
    DASHED LINE       (—·—) = 12,121
    DOUBLE DASHED LINE (===) = 17,647

"REVERSE" H-BARS 90l - 90v

SOLID LINE          (———) = 20,339
    BROKEN LINE       (– – –) = 130,000
    DASHED LINE       (—·—) = 60,000
    DOUBLE DASHED LINE (===) = 23,076

FIG _ 8b

FIG_10

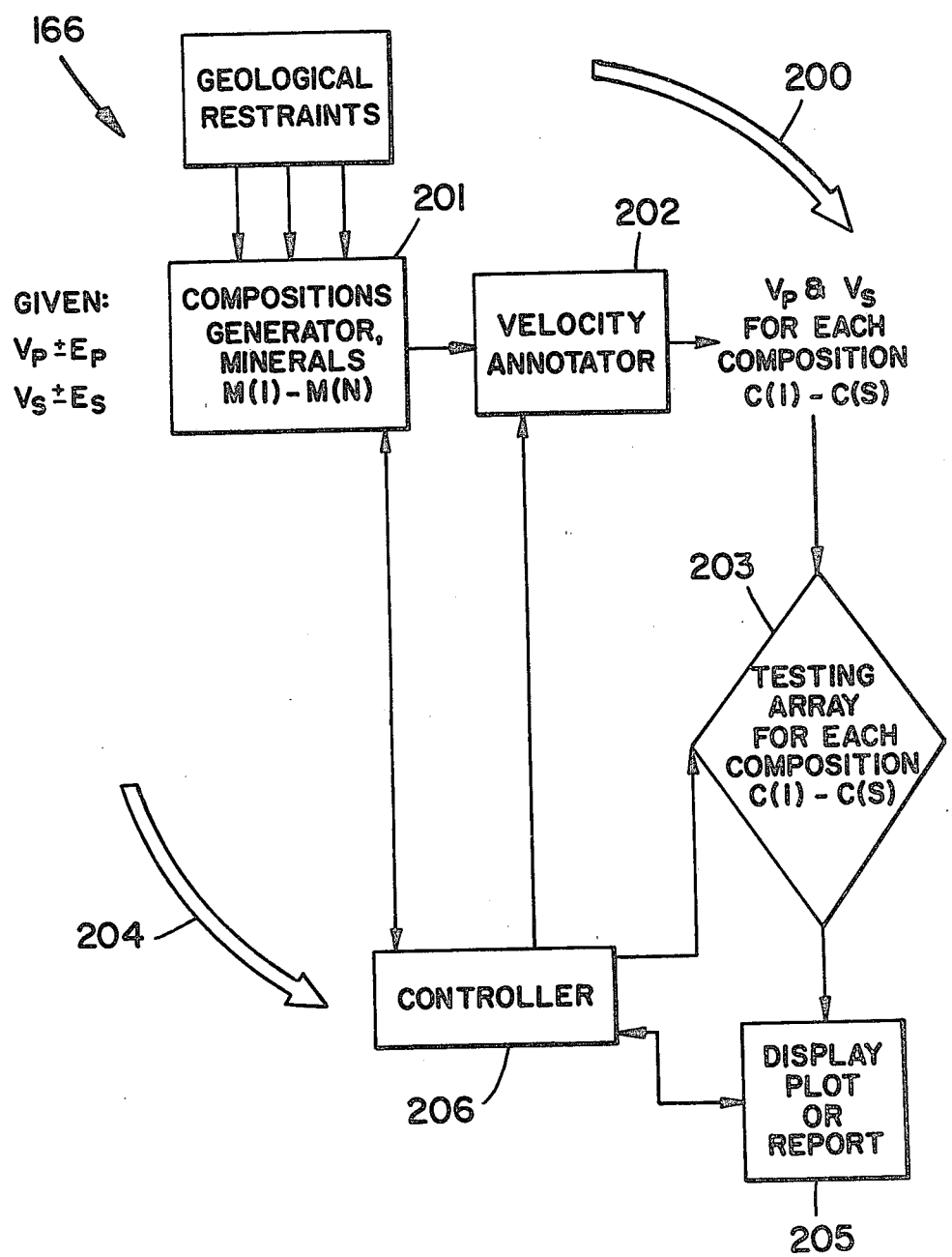
FIG_14

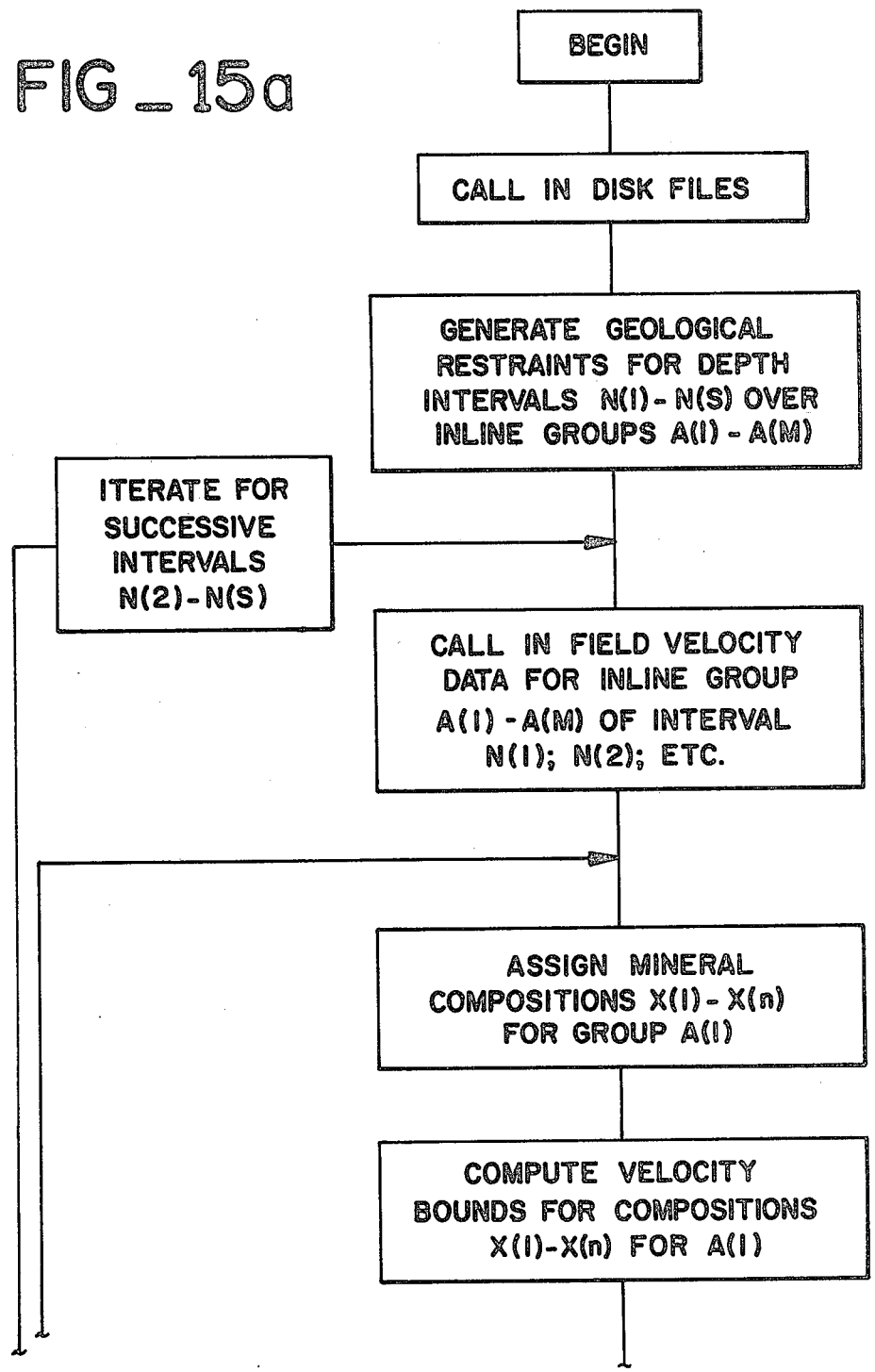
FIG_15a

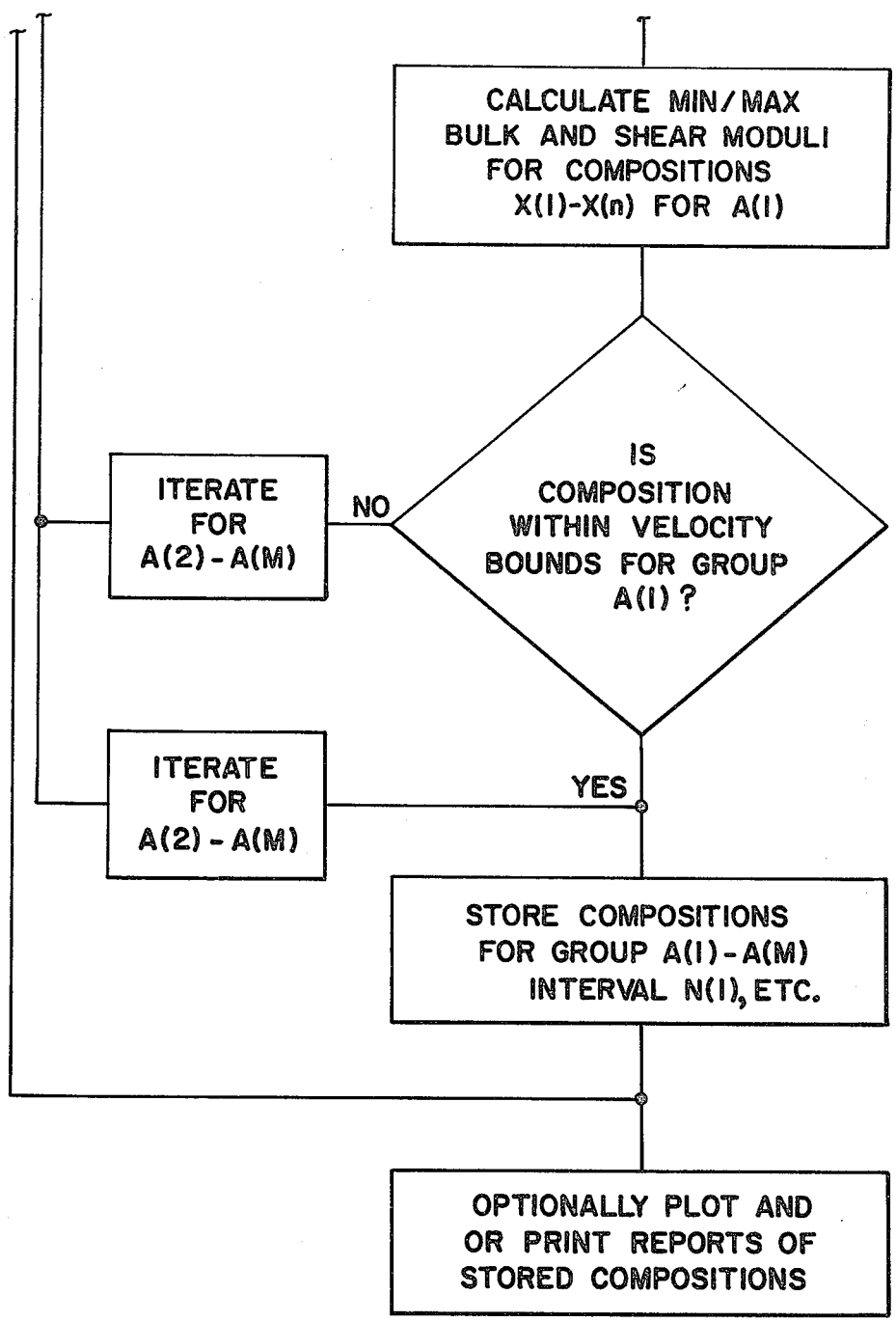
FIG_15b

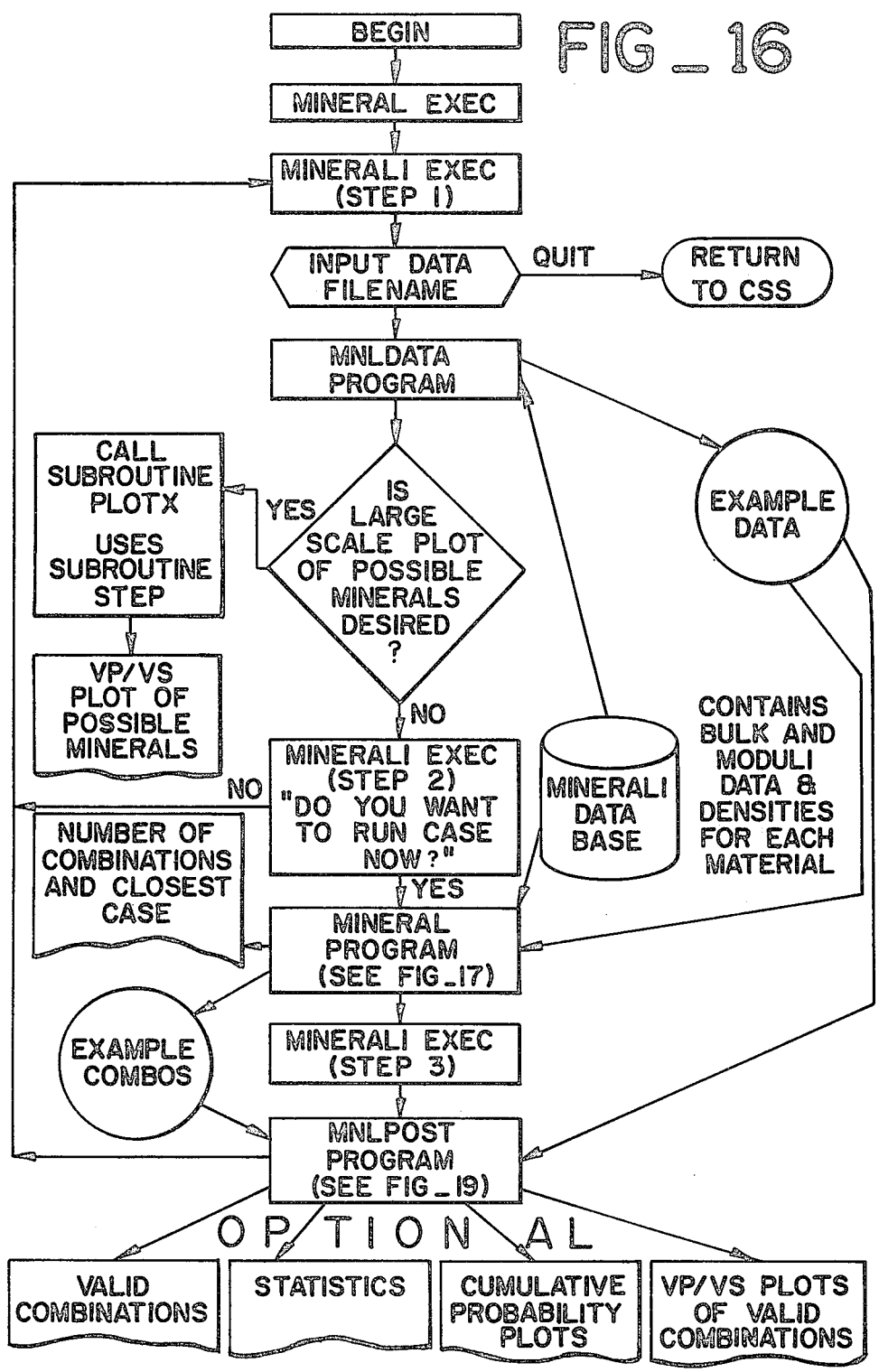
FIG_16

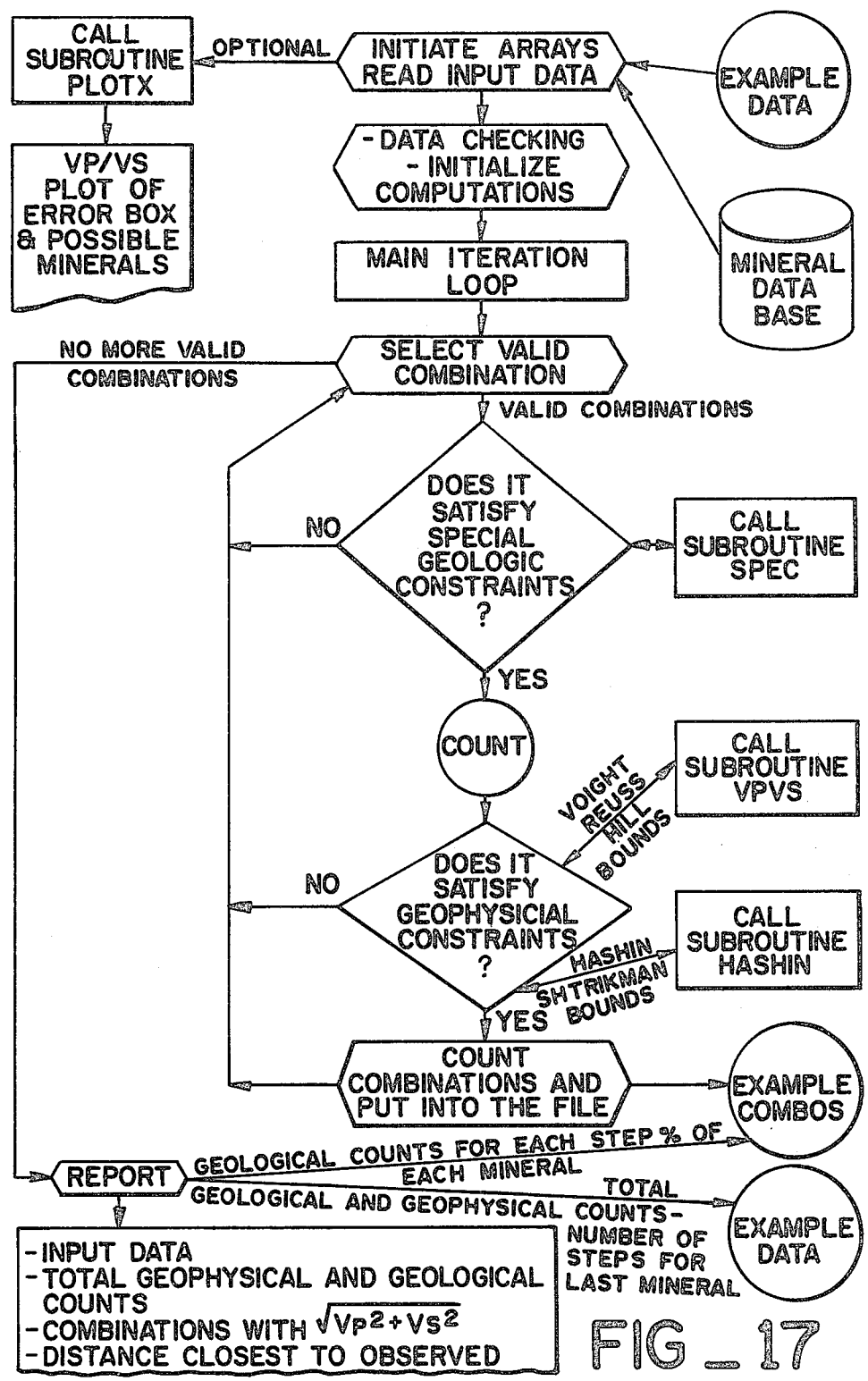
FIG_17

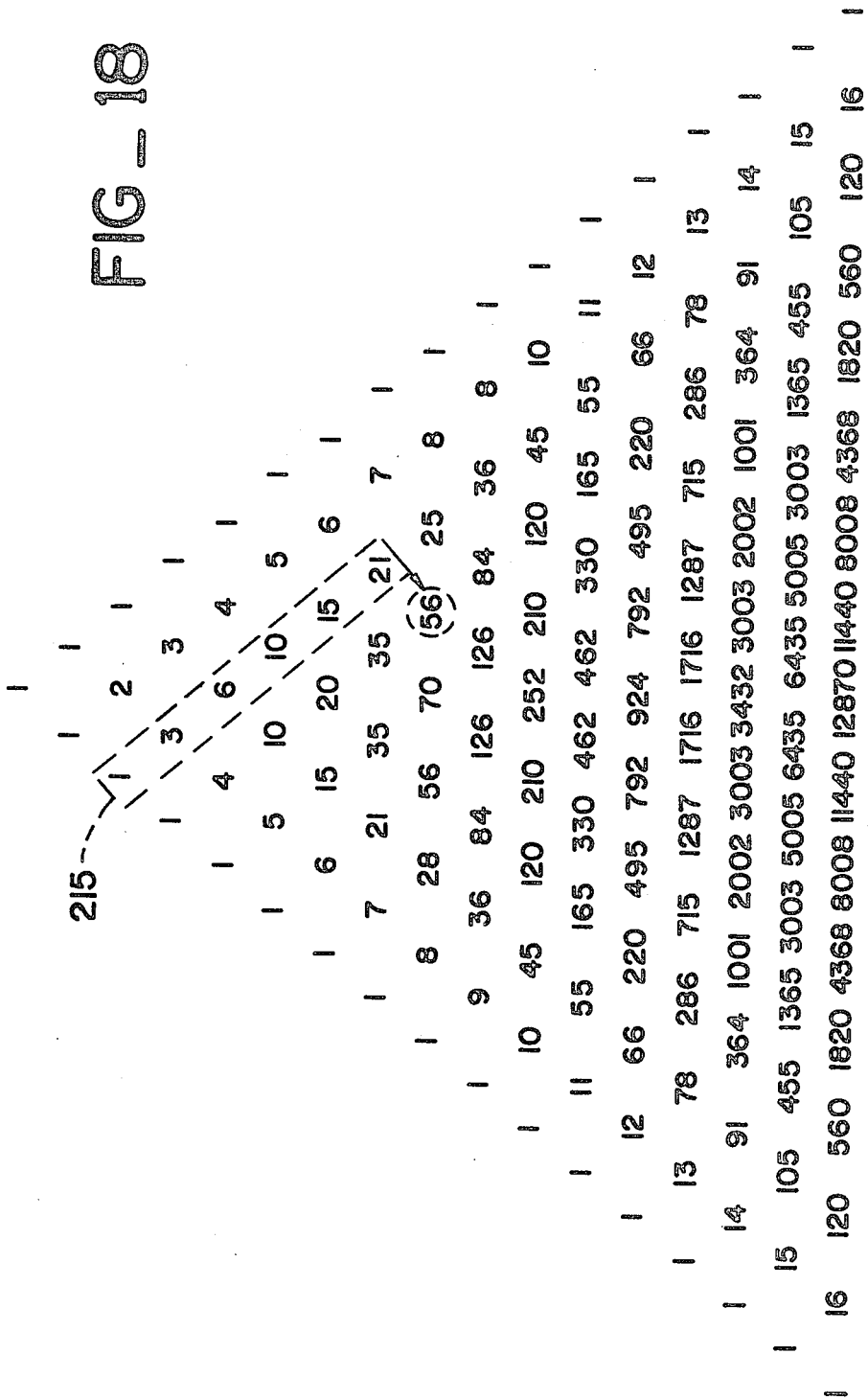

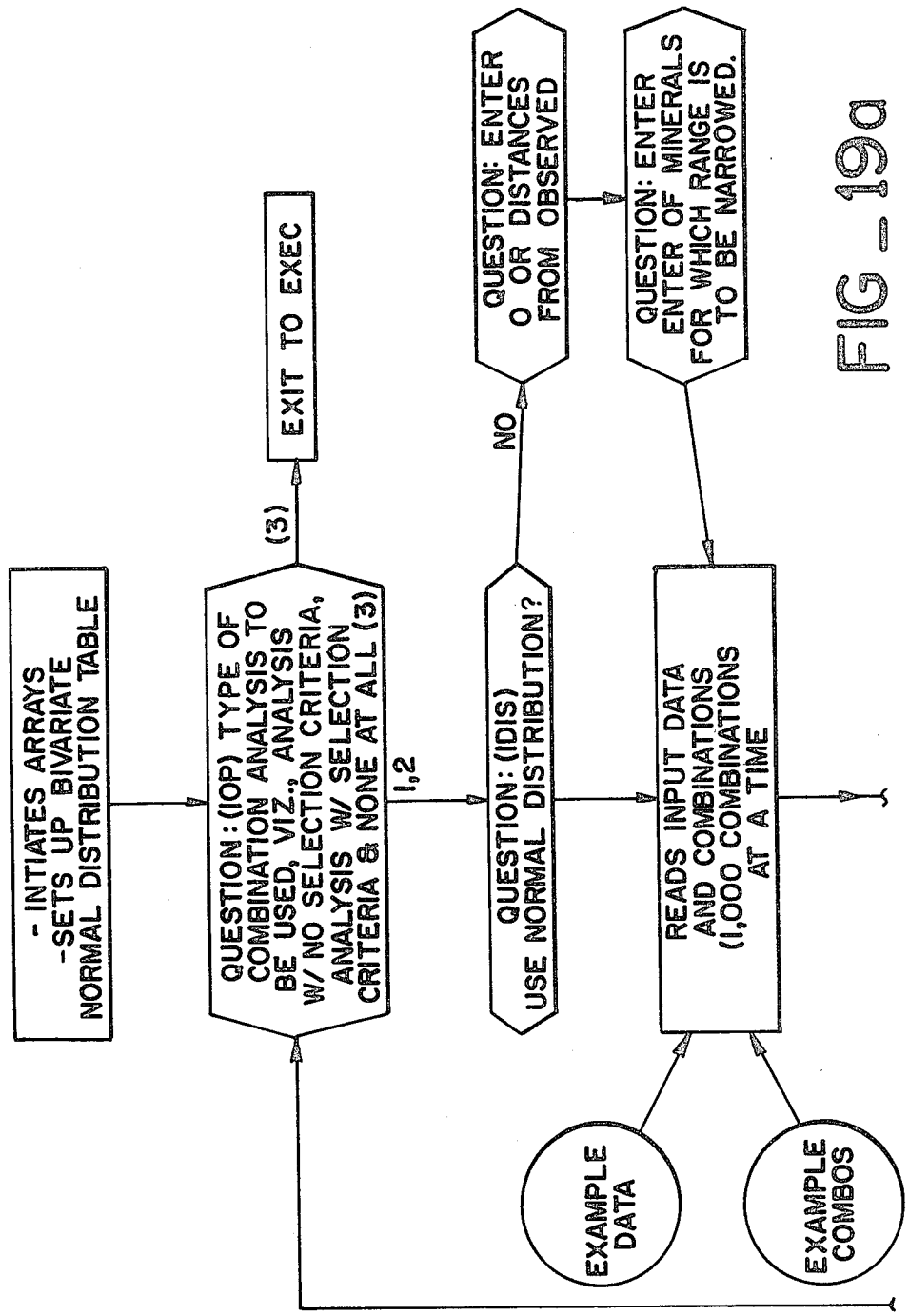

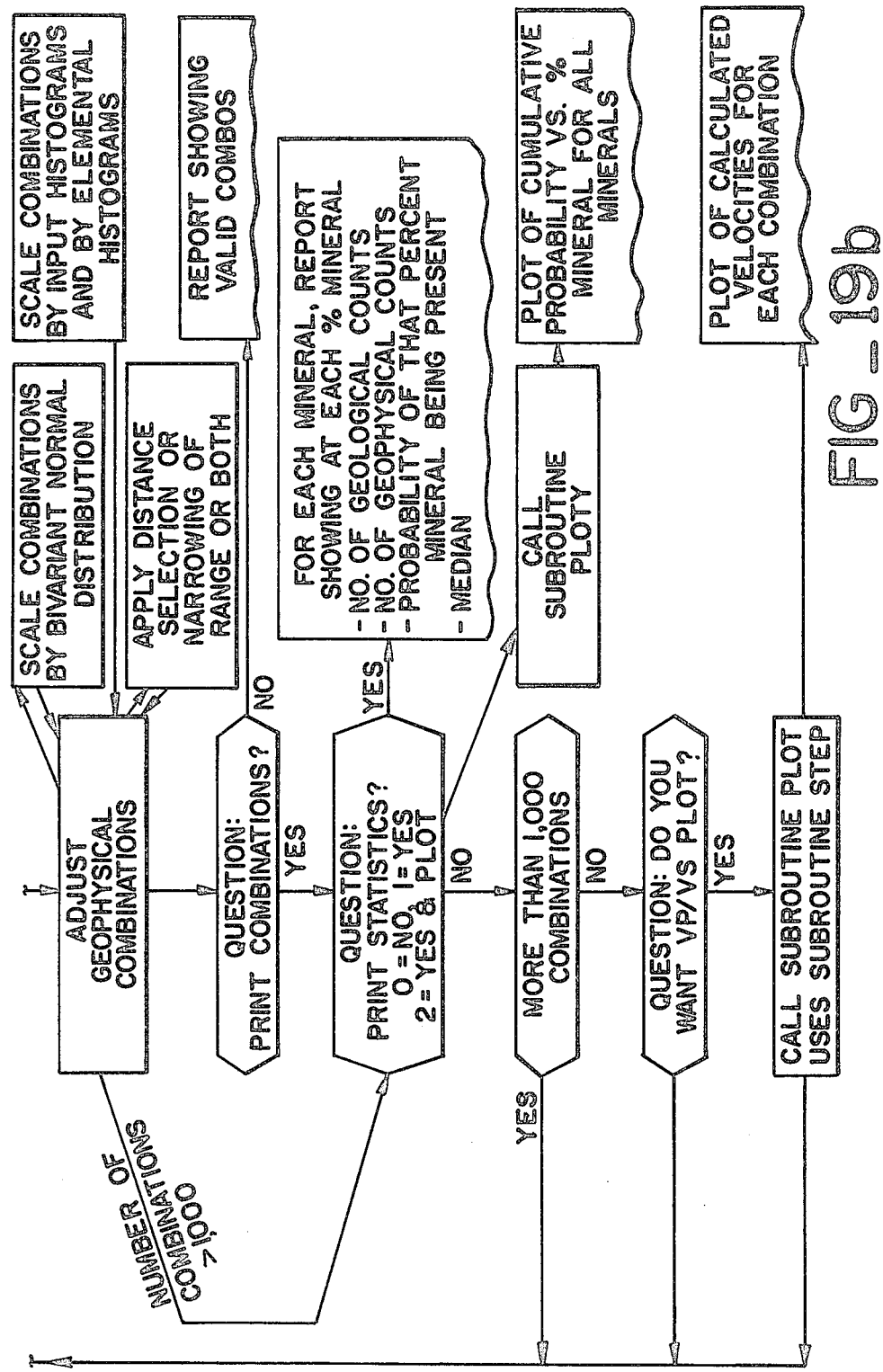
FIG_19b

EXPLORATION SYSTEM FOR ENHANCING THE LIKELIHOOD OF PREDICTING LITHOLOGY OF EARTH FORMATIONS ASSOCIATED WITH DEPOSITS OF ORE, MARKER ROCK AND/OR ECONOMIC MINERALS

This is a continuation of application Ser. No. 971,627, filed Dec. 20, 1978 and now abandoned.

RELATED APPLICATIONS

This application is related to application Ser. No. 952,888 filed Oct. 18, 1978, entitled "Exploration System for Discovering Deposits of Ore, Marker Rock and/or Economic Minerals", Gary S. Gassaway, Henry J. Richgels and James I. Foster, and associated applications and patents cited therein.

SCOPE OF THE INVENTION

The present invention relates to the exploration for deposits of ore, marker rock and economic minerals in the shallow crust of the earth by means of interpretation of refractive seismic waves passing therethrough whereby lithology of the strata undergoing survey, can be accurately predicted.

In this application several terms are used and are defined as follows: the term "marker rock" means rock that identifies ores, economic minerals, metallic and non-metallic minerals and/or minerals or rocks capable of supporting and/or at one time containing steam or water at elevated temperatures. The term "ores" means rocks and minerals that can be recovered at a profit, and includes not only metals and metal-bearing minerals, but also a plurality of non-metallic minerals such as sulfur and fluorite. The definition may also be rock containing small amounts of useful minerals or may be rocks in a massive ore-bearing strata. The term "economic minerals" includes concentrations sufficient to allow economic recovery and/or are in a form that permits economic recovery such as building stones, industrial materials (abrasives, clays, refractories, lightweight aggregates, and salt), and includes the term "ore minerals" (compounds valued for their metal content only) within its definition.

BACKGROUND OF THE INVENTION

Demand for all types of mineral products is accelerating. At the same time, shifts to alternate sources of energy such as use of steam or water at elevated temperatures in situ (associated with "marker rocks") for driving compressors and the like have occurred. Unfortunately, physical properties of economic ore minerals and country or host rock surrounding them are not well defined by conventional surface exploration techniques. Accordingly, the lithology of the earth formation under survey is most difficult to predict under such conditions.

Although in the prior-referenced application, supra, a method is described for accurately mapping shallow formations by means of refractive waves, such method primarily annotates, inter alia, subsurface addresses to observed shear and compressional wave velocities. Lithology was not predicted.

SUMMARY OF THE INVENTION

The present invention has been surprisingly successful in predicting lithology so that deposits of ore, economic minerals and marker rock in the earth's crust can be easily indicated. A key to resolution of field refraction records: The observed P-wave and S-wave velocities are used in a machine-dominated process to predict lithology based on the following strategies and steps:

(1) Combinations of minerals are systematically selected, arranged and sorted into a series of compositions $X(1)$-$X(N)$; then the P-wave and S-wave velocities for each such combination are calculated; those P-wave and S-wave velocities that fall within uncertainty limits of the observed seismic P- and S-wave velocities are considered to be successful candidates for further analysis.

(2) In generating the combination of materials of (1) supra, special input constraints are utilized; these relate to number and type of minerals minimum and maximum values of each mineral assumed to be present, and mineral distribution pattern of member components.

(3) The constraints of (1) and (2) supra are further refined by the introduction of scaling factors based on various factors including the spacial distributive pattern of the minerals of interest in the earth formation under survey.

Result: The lithology of the formation can be surprisingly and accurately predicted by systematically outputting the mineralogical combinations in association with various inline receiver groups $A(1)$-$A(M)$ and/or different depth intervals $N(1)$-$N(S)$.

In accordance with further aspects of the present invention, the lithology of the earth formation under survey is surprisingly predictable based on refracted P-wave and S-wave velocities information observed in the field. Such lithology predictions and estimations use a machine-implemented data processing method in which a multi-dimensional space is searched—in variable function steps ("delta step")—for all possible mineralogical combinations. The successful candidates must satisfy the observed P-wave and S-wave velocities within predetermined uncertainty limits. Constraints to that space can include estimates of P-wave and S-wave velocities (i.e., $V_p$ and $V_s$) derivable from two fundamental quantities of significance: the bulk modulus, K, the shear modulus, G, and the bulk density, P. The method of the present invention is surprisingly rapid—up to 20 mineralogical combinations can be examined in rapid succession and successful candidates displayed on a $V_p$ vs. $V_s$ plot. Additional geological constraints are possible based on special known mineralogical inputs of a particular fashion. Finally, an interpretor can examine each constrained combination to provide a most probable one based on various statistical methods.

SPECIFIC DESCRIPTION OF THE DRAWINGS

FIG. 1 is a schematic section of an earth formation illustrating the mechanism of transmission of refracted seismic waves;

FIGS. 2A, 2B and 2C are schematic diagrams of wave propagation within solids to illustrate compressional waves, shear waves and Rayleigh waves, respectively.

FIG. 4 is a schematic diagram of equipment useful in carrying out the present invention;

FIGS. 5, 8A and 8B are plots of data provided in the array of FIG. 3 transformed in accordance with the teachings of the present invention;

FIGS. 6 and 7 are details of the plot of FIG. 5;

FIGS. 13 and 14 illustrate a lithology-indicating system for carrying out a portion of the steps of the method of FIG. 10;

Figure 13:
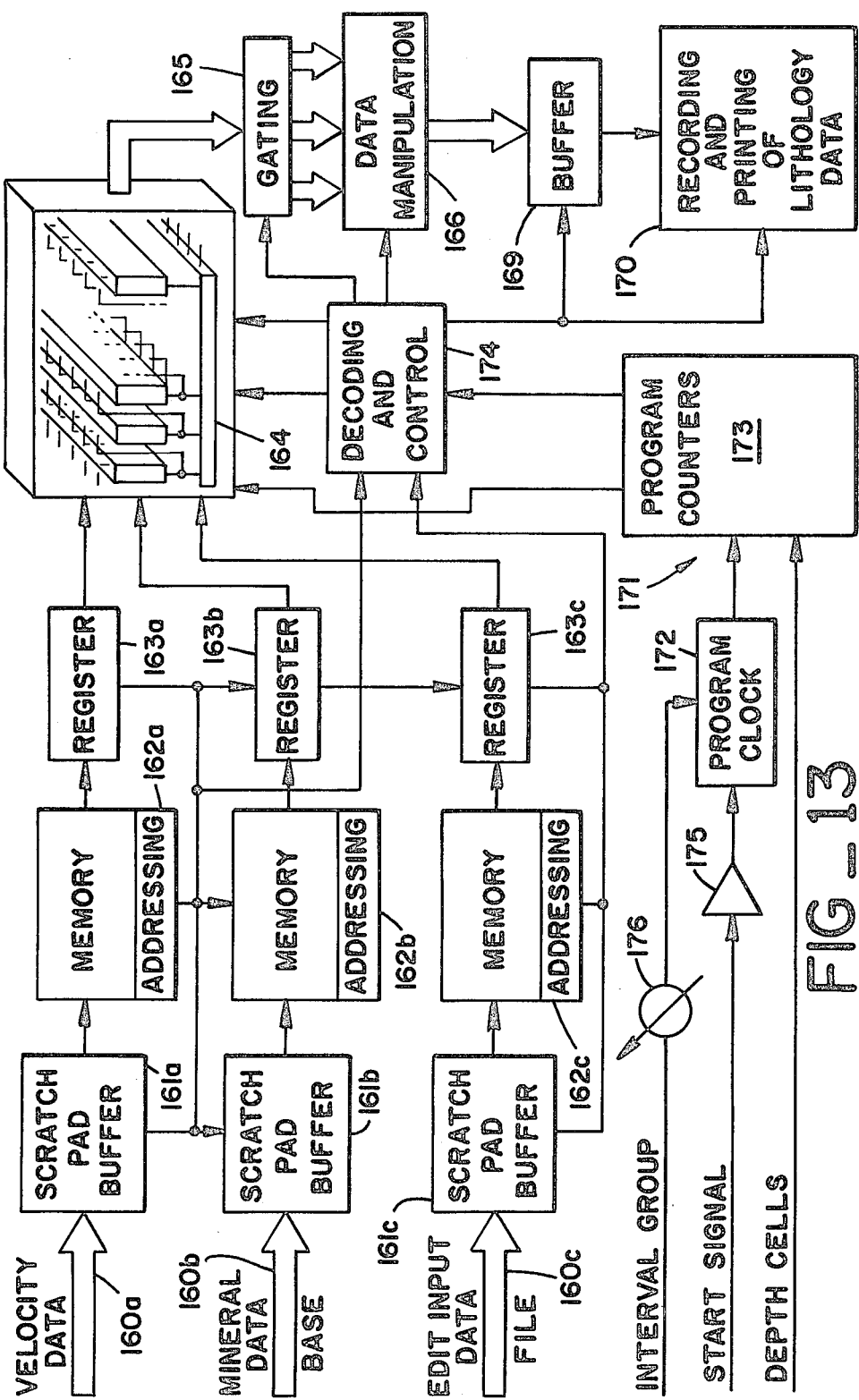

FIGS. 15A, 15B, 16 and 17 and 19A and 19B are flow diagrams for carrying out the method aspects of FIGS. 13 and 14; and FIG. 18 illustrates a particular series of stored coefficients useful in the flow diagrams of FIGS. 15–17 and 19.

DESCRIPTION OF THE PREFERRED EMBODIMENT OF THE INVENTION

In order to understand certain aspects of the invention a brief review of the history of refraction seismology is in order and is presented below.

FIG. 1 illustrates the mechanism for transmission of refracting waves in an earth formation 9.

In FIG. 1 the formation 9 consists of a two-bed model, i.e., beds 10 and 11, each with homogeneous and isotropic elastic properties. Upper bed 10 is separated from the lower bed 11 by horizontal interface 12. The upper bed 10 has a velocity less than that of lower bed 11, i.e., the beds increase in velocity as a function of depth. The surface 13 of the formation 9 is separated from interface 12 by a depth z. Compressional velocity of the seismic wave in the upper bed 10 is assumed to be $V_0$ while the compressional velocity in the lower bed 11 is $V_1$. If a seismic wave is generated at point S, the energy travels with hemispherical wavefronts through bed 10. Detector 14 is placed at point D, at the earth's surface 13, a distance X from S; the wave traveling horizontally through upper bed 10 reaches the detector 14 before any other wave (if X is small). For large values of X, the wave traveling along the top of the lower bed 11 (having a higher speed $V_1$) overtakes the direct wave, however. The mechanism by which energy is transmitted from S to D along the indirect paths SA, AB, and BD has been analyzed mathematically. Briefly, when the spherical wavefronts from S strike the interface 12 the velocity changes and energy is refracted into the lower bed 11 according to Snell's law. At some point A on the wavefront, the tangent is a sphere in the lower bed 11 and is perpendicular to the boundary interface 12. The ray corresponding to this wavefront now begins to travel along the interface 12 with the speed $V_1$ of the lower bed 11. By definition, the ray SA strikes the interface 12 at the critical angle. In FIG. 1, the wavefronts below the interface 12 travel faster than those above. The interface 12 is subjected to oscillating stresses. As a consequence, continuous new disturbances are generated along interface 12 spreading out in the upper bed 10 with a speed $V_0$. The spherical waves adjacent to point B in the lower bed 11 travel a distance BC during the time the wave in the upper bed 10 attains a radius of BE. The resultant wave front above the interface 12 follows the line CE, making an angle $i_c$ with the boundary interface 12 in accordance with the following equations:

$$\sin i_c = BE/BC = V_0 t / V_1 t = V_0 / V_1$$

The angle ($i_c$) which the wavefront makes with the horizontal is the same as the ray makes with the vertical so that the wavefront will return to the surface at the critical angle ($\sin^{-1} V_0/V_1$) with respect to the vertical.

While FIG. 1 deals with compressive seismic wave propagation within the earth, similar plots explain the travel of transverse or shear waves within the earth. In order to understand the differences as well as similarities of these types of waves, reference should now be made to FIGS. 2A, 2B and 2C. Before such discussion a brief explanation of elastic waves is in order and is presented below.

Briefly, the simplest type of elastic wave propagation in a homogeneous, isotropic infinite elastic medium consists of alternating condensations and rarefactions in which adjacent particles of solid are moved closer together and then farther apart. If a pressure is suddenly applied to a medium at a point source, the region within the material of the medium that is most compressed will move outwardly from the disturbance, the disturbance having a radius increasing at a rate determined by the elastic properties of the medium.

In FIG. 2A the wave has a direction of particle motion that is the same (or at an angle of 180°) as the direction of wave propagation. Such waves are referred to as compressional or P-waves. The speed of the compressional waves is related to the elastic constants and density of the medium in a well-known manner.

In FIG. 2B, the particle motion within the transmitting medium is at right angles to the direction of the wave propagation. Since the deformation is essentially a shearing motion, such waves are often referred to as "shear waves". The velocity of any transverse waves also depends on the elastic constants and the density of the medium.

Rayleigh waves of FIG. 2C are waves travelling along a free surface of any elastic solid. The particle motion (in a vertical plane) is elliptical and retrograde with respect to the direction of propagation. Amplitude decreases exponentially with depth. The speed is slower than P-waves or S-waves, and can vary when a low-speed surface layer overlays a much thicker material.

Figure 3:
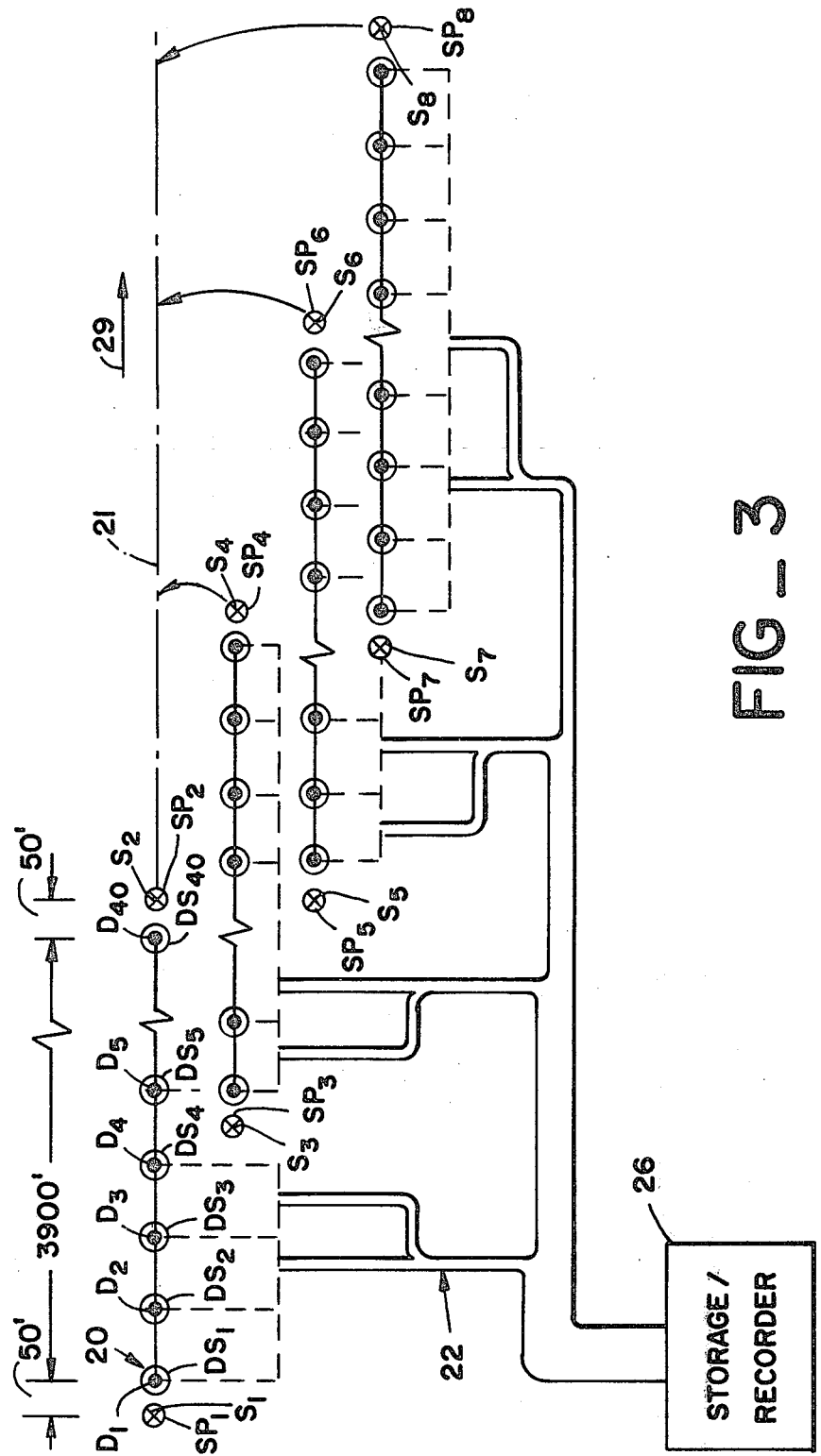
FIG. 3 is a schematic diagram of an array of sources and detectors positionally arranged along a line of survey in which the sources and detectors are incrementally moved along the lines of survey to provide higher resolution of refracting interfaces, such advancement being analogous to a "roll-along" technique conventional in reflection seismology.

In order to collect both compressional and shear waves in the field, an array 20 of detectors $D_1$, $D_2$... in FIG. 3 is aligned along a parallel line 21, designated "the line of survey" of the array. Each detector can be provided with the ability to discern shear waves, and compressional waves through the use of a three-component system of response. By the term "three-component" is meant that one or more of separate detectors is provided with the capability of detecting vibrations in two directions in the horizontal plane and in a single direction along the vertical axis. In that way, electrical signals associated with the "three components" can be transmitted via cable array 22 to recorder/-storage unit 26, as separate signals for further processing as discussed below.

Sources $S_1$, $S_2$... etc. of seismic waves are placed as sourcepoints $SP_1$, $SP_2$... etc. adjacent to end detector positions $DS_1$, $DS_{40}$... etc. Sequential shots can be taken at each end.

Detectors $D_1$, $D_2$... etc., of FIG. 3 are positionable at a series of stations, such as detector stations $DS_1$, $DS_2$ ... etc. When the sources are located at the sourcepoints $SP_1$ and $SP_2$, and when sources therein are energized in sequence, the refraction data that are produced are capable of being indexed to detector positions $DP_1$, $DP_2$ ... etc. at the recorder/storage unit 26.

Since spacing between adjacent detector stations $DS_1$, $DS_2$ ... etc., and source points $SP_1$, $SP_2$, $SP_3$ ... etc., determines the resolution pattern of the array, the closer the spacing, the better the dip resolution. And the longer the array, the greater the depth resolution. Offset positions of detector and sources in a typical field arrangement are as indicated in FIG. 3. Preferred spread length: 3900 feet. In-line spacing of detectors: 100 feet. In-line spacing of the sources with respect to the detector spread: 50 feet. Variations, of course, occur depending on the many factors indicated above.

Recorder/storage unit 26 connects to the outputs of the detectors through cable array 22 and other appropriate signal processing circuits (not shown) which can include indexing and recording address means. The latter annotates the positions—in the field—of the seismic source producing the energy (viz., the source at each sourcepoint $SP_1$ or $SP_2$ ... etc., as well as the detector stations receiving the refracted energy, viz. stations $DS_1$, $DS_2$ ... etc. In operation, after activation of sources $S_1$ and $S_2$ at sourcepoints $SP_1$ and $SP_2$, data records are produced at the detector stations $DS_1$, $DS_2$ ... etc. Thereafter, the array is advanced in the direction of arrow 29; that is to say, the array of FIG. 3 is "rolled forward" whereby station $DS_1$ is advanced to station $DS_5$ with appropriate relocation of the remaining detectors at original stations $DS_6$, $DS_7$ ... etc., occurring. After new sources $S_3$ and $S_4$ at the sourcepoints $SP_3$ and $SP_4$ are energized, and seismic energy is received at the detector stations $DS_5$, $DS_6$ ... etc., a new field data record is generated at recorder/storage unit 26. It should be noted in FIG. 3 in this regard that the detector stations, $DS_5$, $DS_6$ ... etc., define common offset positions so that indexing of the refraction location data as a function of offset position at the recorder/storage unit 26 is a somewhat firm requirement. In this regard, efficiency of the "roll-along" technique can be somewhat enhanced by using a roll-along switch such as described in U.S. Pat. No. 3,618,000, issued Nov. 2, 1971, for "Roll-along Switch" and assigned to the assignee of this application.

Data addressing is also a function of the nature of the detector positioned at stations $DS_1$, $DS_2$, etc. Assume at each detector station $DS_1$, $DS_2$ ... etc., e.g., the transverse component output of each three-component detector is used, independently, to measure shear wave response. Similarly, the vertical component output of the same three-component detector can be recorded, directly, as the compressional wave response. Hence, processing and addressing problems can be lessened.

As previously described, separate outputs of each detector measure velocity of the displacement (movement) of the earth's surface in three directions: (i) vertical displacement; and (ii) two horizontal displacements at right angles to each other. The former usually measures P-wave response; the latter usually relate to S-wave response. Hence, three-component detectors are preferred as array detectors under usual circumstances. However, it should be noted that it is possible to use a single vertical component detector under selected circumstances. Also a combination of both types is possible, i.e., a 3-component detector can be used at the stations DS, $DS_5$, etc. in conjunction with conventional vertical detectors in between. i.e., at stations $DS_2$, $DS_3$, $DS_4$, $DS_6$, etc.

PROCESSING

After collection, processing of the data is required. Object of such processing: to associate a series of usual travel time vs. offset plots with selected detector spreads of FIG. 3 to provide a guide to the interpretor of the strata under survey.

While various types of equipment of both an analog and digital nature can be used, the equipment of FIG. 4 has advantages of simplicity and low cost, and so is presented in detail below. Briefly, such processing utilizes either one of two data files: (i) a P-wave data file associated with results of a vertical component of each three-component detector of the field array, or (ii) an S-wave record associated with the horizontal component of the same detector of the same array.

In FIG. 4, separate magnetic recording and playback systems are illustrated at 33 and 36. While the method of the present invention could be performed with less apparatus than shown herein by physically moving records back and forth between recording systems, the process is more easily described and understood by referring to the two systems as shown. It should be understood that other combinations of the apparatus, as well as other types of recording, reproducing and data processing systems are contemplated. An example of other such combinations would be a properly programmed digital computer.

The magnetic recording system 33 constitutes a drum 34 supported on a rotatable drive shaft 35 driven by a suitable mechanism such as gear 37 through the worm shaft 38 and motor 39. Actual record processing in accordance with the present invention will require careful speed control for rotation of the systems 33 and 36, as well as synchronization between the rotation of the record drums and the movements of magnetic heads within each system. The drum 33 is adapted with conventional apparatus, not shown, for securing a record in the form of a magnetic tape 40 to the periphery of the drum. Separate scanners 44 and 45 are carried adjacent to drum 34. The tape 40 includes two sets of data: amplitude-vs.-time refraction data and a timing trace or marks associated with activation of the source. The tape 40 is scanned simultaneously by scanners 44 and 45 as a function of rotation of drum 34. Movement of scanner 45 also occurs along the drum 33. That is to say, after a single revolution of the drum 34, motor 41 is energized by apparatus to be described, to cause one step of movement of the scanner 45 in the lateral direction. Scanner 44 is not activated by the motor 41, however; instead it remains fixed at a known circumferential position relative to the drum 34.

It should be understood that different schemes may be employed to provide individual control for the movement of each of the heads. For example, the magnetic heads need not mounted on a simple bar, but instead can be mounted as separate members that are capable of individual circumferential movements around the drum. The bar-type mechanism is illustrated here for didactic clarity.

Scanner 45 is mounted on a threaded block 42 positioned by rotation of worm 43. The threaded block 42 is guided by a fixed rod 46 to prevent its rotation about worm 43. The worm 43 is driven from gear box 47 by a gear 48 and its engagement with gear 49. Energization of motor 41 causes rotation of gears 48 and 49 and the consequent movement of the scanner 45 parallel to the axis of drum 34. With each energization, the scanner 45 is moved one trace transversely across the record to read the side-by-side refraction traces.

Recording system 36 constitutes a drum 51 supported on a rotatable shaft 52 driven by suitable mechanism such as gear 53, worm shaft 38 and motor 39. The drum 51 is adapted with apparatus, not shown, for securing the recording medium in the form of magnetic tape 54 to the periphery of the drum 51. A single recording head 55, connected through switchable contact 56, to be described later, which cooperates with the tape 54 to produce a recorded magnetic record. The single recording head 55 is mounted on a threaded block 59 positioned by rotation of worm 60. The threaded block is guided by fixed rod 61 to prevent its rotation. Energization of motor 62 causes rotation of gear box 63 and the consequent movement of the recording head 55 parallel to the axis of drum 51.

The pitch of the worms 43 and 60 are so related that the scanners 44 and 45 are moved step-by-step from one side to the other of their respective drums while the cam 64 makes one complete revolution from one limiting position to another. Stepping switches likewise can aid in providing appropriate synchronization of the system, as previously mentioned.

Energization of the system illustrated in FIG. 4 is provided from a power source 65 to motor 39 and through switch contact 66 to the motors 41 and 62. Cam 64 on shaft 52 pushes on rod 67, against the bias of spring 68 to close the switch 66, the eccentric projection 69 of the cam 64 being the cause of contact 66 closing during the part of the revolution in which the magnetic tapes on drums 34 and 51 are in such a position that their respective heads 44 and 45 are in the peripheral gap between the beginning and the end of the tapes. During the relatively short time that these heads are in that gap and, therefore, not transmitting useful information, the heads are repositioned axially along their respective drums while the drums 34 and 51 continue to revolve at constant speed.

In operations refraction data on tape 40 of drum 34 flows via scanner 45 to a storage unit 70 and through an event selector 71 to counter 72, and thence to tape 54 on drum 51. The analysis of the refraction data requires more than one trace to identify events of interest. Hence, both storage 70 and event selector 71 are interposed between scanner 45 and connector 56 as shown.

Event selector 71 compares a group of three adjacent refraction traces to detect arrival times within the central trace, as set forth in U.S. Pat. No. 3,149,302, Klein et al., for "Information Selection Programmer Emphasizing Relative Amplitude, Attribute Amplitude and Time Coherence," issued Sept. 15, 1964, assigned to the assignee of the instant application. The output of selector 71 is a single trace, modified in accordance with selection code described in the above-identified patent.

Storage unit 70 can include a multi-position relay connected to a recording means, as described in U.S. Pat. No. 3,149,303, Klein et al., for "Seismic Cross Section Plotter," issued Sept. 15, 1964 and assigned to the instant assignee.

Counter 72 is selectively operated on a predetermined "on-off" basis as follows: the activation spike of the source via scanner 45 activates the counter 72 while the occurrence of a refraction event on tape 40 of drum 33 terminates operations of the counter 72, after which a reset signal resets the counter 72 to zero and simultaneously activates the marker of head 55. Result: a refraction measure of time—a "mark"—is placed on the tape 54 wound about drum 51. As the process is repeated, a series of "timing marks" vs. offset position is provided, in the manner of FIG. 5. Operations cease through opening switch contacts 56 and 73 controlled by rod 74.

FIG. 5 illustrates a series of refraction travel time vs. common offset plots 75 annotated by sourcepoint activation number and/or position, provided by the apparatus of FIG. 4.

As shown, plots 75 are assembled in a paired, obliquely segmented basis to better aid in stratigraphic interpretation. In general, FIG. 5 shows individual plots of forward and reverse line vs. offset signature diagrams displayed side-by-side using adjacent profile oblique segments 76 and 77, each containing a series of normalizing "H" signature bars 78.

FIG. 5 is akin to the conventional common depth point stacking charts used in reflection seismology, and described in detail in Ser. No. 77,240 filed Sept. 19, 1979, for "Method for Interpretation of Seismic Records to Yield Indications of Gaseous Hydrocarbons," W. S. Ostrander, and assigned to the assignee of the instant application.

In usual stacking diagrams as described in Ser. No. 756,584, above, several separate variables are addressable including amplitude vs. time values, offset positions (say, detector, sourcepoint, centerpoint positions), sourcepoint, profile line number, common offset lines, common centerpoint lines, and common detector location lines, etc.

In the above-identified application, emphasis was placed upon centerpoint location in a two-dimensional coordinate system, say in a X-Y domain along oblique lines, with the third dimension being reserved for analysis and processing of the amplitude-vs.-time traces.

In FIG. 5, in the present invention, centerpoint position in the offset direction and common centerpoint locations have been assigned to the third dimension, remaining coordinates of interest addressable in the X-Y domain.

Of particular importance: travel time vs. offset coordinate of refraction events annotated as to direction of refraction arrivals and their sourcepoints.

For example, along the top of FIG. 5, the detector stations are numbered in sequence, while along the bottom of FIG. 5, the sourcepoint locations are likewise indicated. Each set of refraction-vs.-time values is plotted as shown with reference to the series of normalizing signature bars 78. Each bar 78 has a length equal to that of the detector spread plus twice the sourcepoint offset distance with respect to the spread ends, as discussed below.

In particular in FIG. 5, since plots 75 were generated using an end-shooting array in which sources and detectors advance 4 detector intervals per shot point, the "H" bars 78 overlap. Note further that each offset position (after initialization) is associated with 8 separate time values so that such values can be associated with common surface detector positions.

In order to geometrically associate generated data with common surface position, or common offset position, address guidance, as provided by printed "H" bars 78, is of some importance.

Signature bars 78 form the ordinates of the display and are seen to be paired into sets, each associated with an opposite arrival direction of the refraction wave.

Each pair is spaced a constant distance, say, a value 2d feet where d is the rollalong increment of the field procedure.

Vertical upright segments 79 of each bar 78 coincides with the offset position of the sourcepoints, say $SP_1$, $SP_3$, $SP_5$ . . . alignable along oblique line 80, and $SP_{12}$, $SP_{14}$ . . . etc. alignable along oblique line 81.

Annotatin of each H-bar 78 is preferably based on sourcepoint position, and direction of wave travel. "Forward" data profiles 76 designate that wave travel is in the same "forward" direction as array progression, while "reverse" data profiles 77 refer to wave travel in the opposite direction as array progression.

At the bottom of the display, the last-in-line profiles, say the profiles $S_z$ of profile segment 76 and profile column $S_{z+c}$ of segment 77, are related to the detector and shot point positions in a manner convenient for easy display. Note that if sourcepoint $S_z$ is odd, then sourcepoint $S_{z+c}$ is even, and vice versa.

FIGS. 6, 7, 8 and 9 illustrate how the plots of FIG. 4 can be used to indicate shape and model depth of a formation under survey.

In FIG. 6, note that the travel time data are associated with certain particular H-signature bars of FIG. 5, viz., bars 78a, 78b, 78c and 78d. I.e., the latter relate to and are associated with the forward profile column 76 of FIG. 5, say, annotated to sourcepoints $SP_9$, $SP_{11}$, $SP_{13}$ and $SP_{15}$, as shown.

Values of travel time vs. offset are plotted as shown.

Note the intersection points of the plotted points occur at breakpoints 82a, 82b, 82c and 82d. These breakpoints can be connected by a line 83 having a slope about equal to that line 80 through the sourcepoints $SP_9$, $SP_{11}$, $SP_{15}$ . . . etc., of the signature bars 78a–78d. Result: the interpreter of the data can confidently assume that bedding to which the data relate is horizontal.

FIG. 7 illustrates travel times plotted for other certain H-signature bars occurring later in time in the survey, say, data associated with bars 78f, 78g, 78h, 78i and 78j, are also related to forward column profile 76 of FIG. 5. These are annotated to, say, sourcepoints $SP_{21}$, $SP_{23}$, $SP_{25}$, $SP_{27}$ and $SP_{29}$ as shown.

Note that here the breakpoints 85a, 85b, 85c, 85d and 85e do not align themselves parallel to line 80 through the sourcepoints $SP_{21}$, $SP_{23}$ . . . etc. But instead these breakpoints aligned themselves along a line 87 whose slope is the vertical. Result: the interpreter can assume a vertical contact exists below the near bed undergoing survey. Hence, appropriate formulas for the geometry change can be implemented in the depth model as discussed below.

Figure 9:
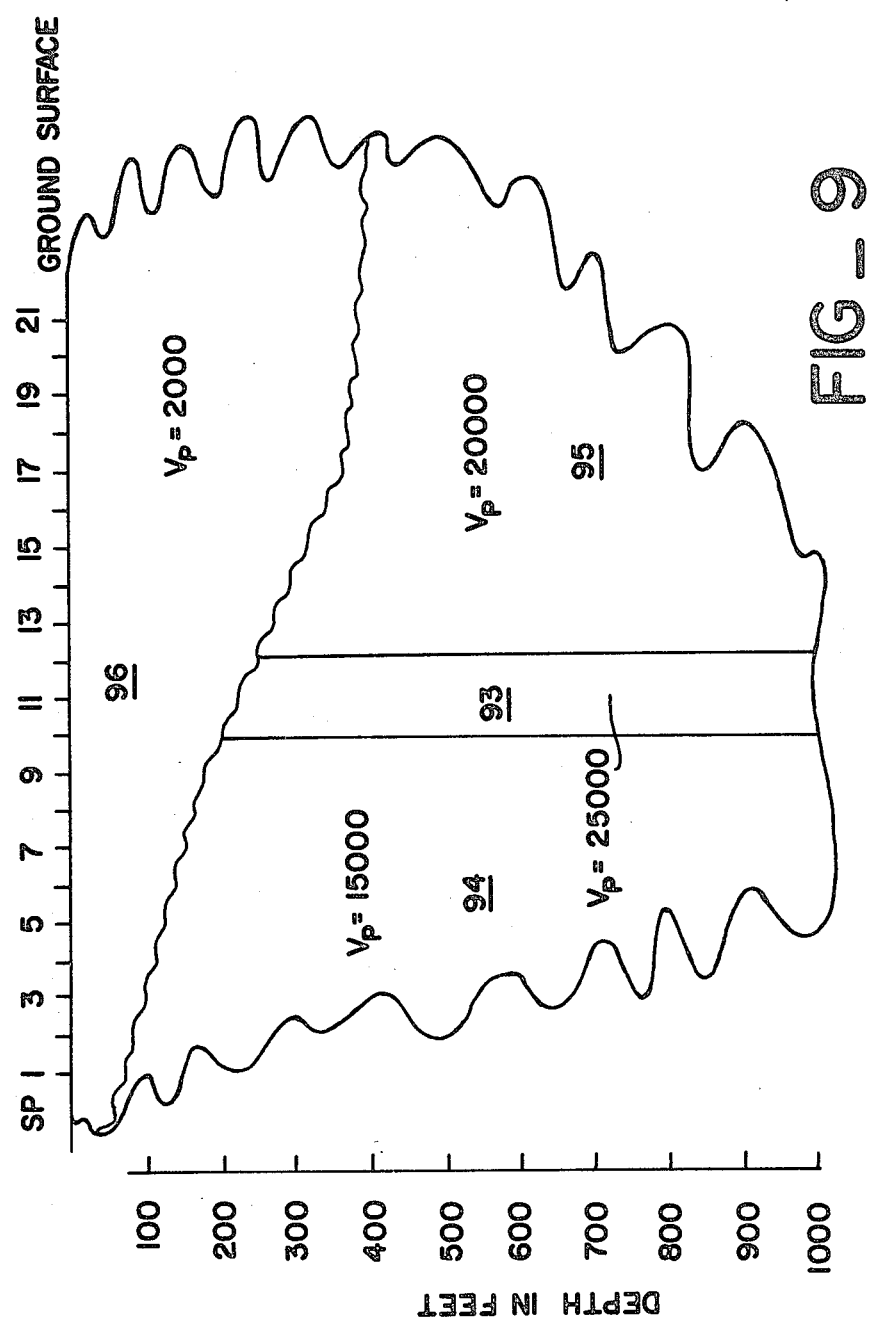
FIG. 9 is a depth plot constructed from the plot of FIG. 8.

FIGS. 8 and 9 illustrate a further example of the method of the present invention in which the pairing of "H" signature bars 78 of FIG. 5 has been changed to provide more interpretive insight for the user.

As shown in FIG. 8, the adjacent pairing of H-bars has been changed so that oblique column segments 91 and 92 no longer are a combination of odd/even or even/odd sourcepoints as before. Instead, the pairings are changed to emphasize a particular bedding structure of FIG. 9 below a certain sourcepoint location, viz. sourcepoint 11 of FIG. 9.

In FIG. 8 note that the compressional travel time data are associated with certain particular H-signature bars, viz. bars 90a, 90b, 90c, . . . 90k, and bars 90l, 90m . . . 90v.

The former, in turn, relate to and are associated with the forward profile segment 91, say, annotated to sourcepoints $SP_1$, $SP_2$ . . . $SP_{11}$, as shown. The latter in turn relate to and are associated with the rear profile segment 92 annotated to sourcepoints $SP_{11}$, $SP_{12}$ . . . $SP_{21}$.

Breakpoints are as indicated, with vertical lines 97a–97f being drawn through them for emphasis.

Note that since the lines 97a–97f are somewhat vertical and deviate radially from common lines through sourcepoints $SP_1$, $SP_2$, $SP_3$ . . . etc., and through $SP_{12}$, $SP_{13}$ . . . etc., the bedding of interest is not horizontally disposed.

The compressional data of FIG. 8 further illustrate that apparent refraction times have been greatly affected by the shape of formation undergoing surveying, viz. by the presence of dike 93 of FIG. 9 uplifted through deeper beds 94 and 95 but terminating well below upper bed 96.

Of course, it is apparent that the above H-bar data can be easily used to indicate apparent compressional velocities as set forth in FIG. 9. True velocity of the bed 96 can then be calculated using intercept time-distance relationships well understood in the art, see Dobrin, M. B., "Introduction to Geophysical Prospecting" McGraw-Hill (1960), assuming correct pairs of forward and reverse plots, are utilized.

As to dike 93 of FIG. 9, the importance of using intercept times and apparent velocities associated with sourcepoint "H"-bars which do not straddle breaklines 97a–97b and 97d–97e must be emphasized. That is to say, intercept times and apparent velocities associated with "H"-bars 90k and 90v do not provide correct results which can be directly associated with dike 93, i.e., intercept times and apparent velocity deduced therefrom, from which the velocity and depth can be calculated as shown in FIG. 9, would be erroneous. Note that the slopes of the breakpoint lines are directly associated with the vertical slope of the walls of the dike 93 of FIG. 9, however.

On the other hand, if the data of H-bars 90j and 90m are used, the interpretive results would be correct.

Key to correctly interpreting H-bars 90a–90v: pick H-bar data closest to breakpoints in the forward and reverse direction but which do not straddle them, and so provide true indications of the intercept time and apparent velocity of the dike 93 of FIG. 9. Note also that the velocity magnitudes and intercept times associated with chosen forward and reverse pairs of H-bars also indicate the magnitude of the dips of the strata under survey. From such data, the interpreter can be provided with information from which true velocity data can be determined; while the intercept times and other distance-time data of FIG. 8 are used to calculate true compressional velocity, similar plots and values associated with shear waves are used, in a similar manner to calculate true shear velocity of each bed of interest with appropriate final displays of such data being available, as required.

Thereafter, depth values can be calculated using the methods of FIGS. 8 and 9 in conjunction with appropriate geometrical formulas set forth in Dobrin, op. cit. Note further that over a given but changeable depth interval, interface bedding segments can be identified; each can be addressed and stored for future reference, say, as to length, end-point locations, compressional and shear velocity values, Poisson's ratio etc., as required. In that way, values storable in files within any analog or digital computer can be ordered out as required onto, say, a disk unit. Thereafter, any off-line digital plotter is used in conjunction with the data on the disk unit. In this regard, equipment illustrated in "Continuous Automatic Migration," Ser. No. 567,458, filed April 14, 1975, John W. Sherwood, assigned to the assignee of the instant application, is of interest, and can be used to address, index and store segments of data in accordance with the teachings of the present invention.

Such plotters are available in the art, and one proprietary model uses a computer-controlled CRT for optically merging onto photographic paper, as a display mechanism, the seismic data. Briefly, in such a plotter the data are converted to CRT deflection signals; the resulting beam is drawn on the face of the CRT and the optically merged record of the data is thereafter indicated, say, via photographic film. Then the film is processed in a photography laboratory and hard copies returned to the interpreters for their review. Additionally, the data could be plotted by hand, if desired. But for usual applications, in which speed is important, the plotter described above is preferred.

The following patents assigned to the assignee of the present invention which contain sorting and stacking techniques, including beam steering techniques, are of interest in carrying out the method of the present invention.

such combinations are computed and compared to the determined P-wave and S-wave velocities. Successful candidates meeting selection criteria to be discussed below are next stored, displayed or printed, to illustrate probable lithology of the formation of interest.

Figure 10:
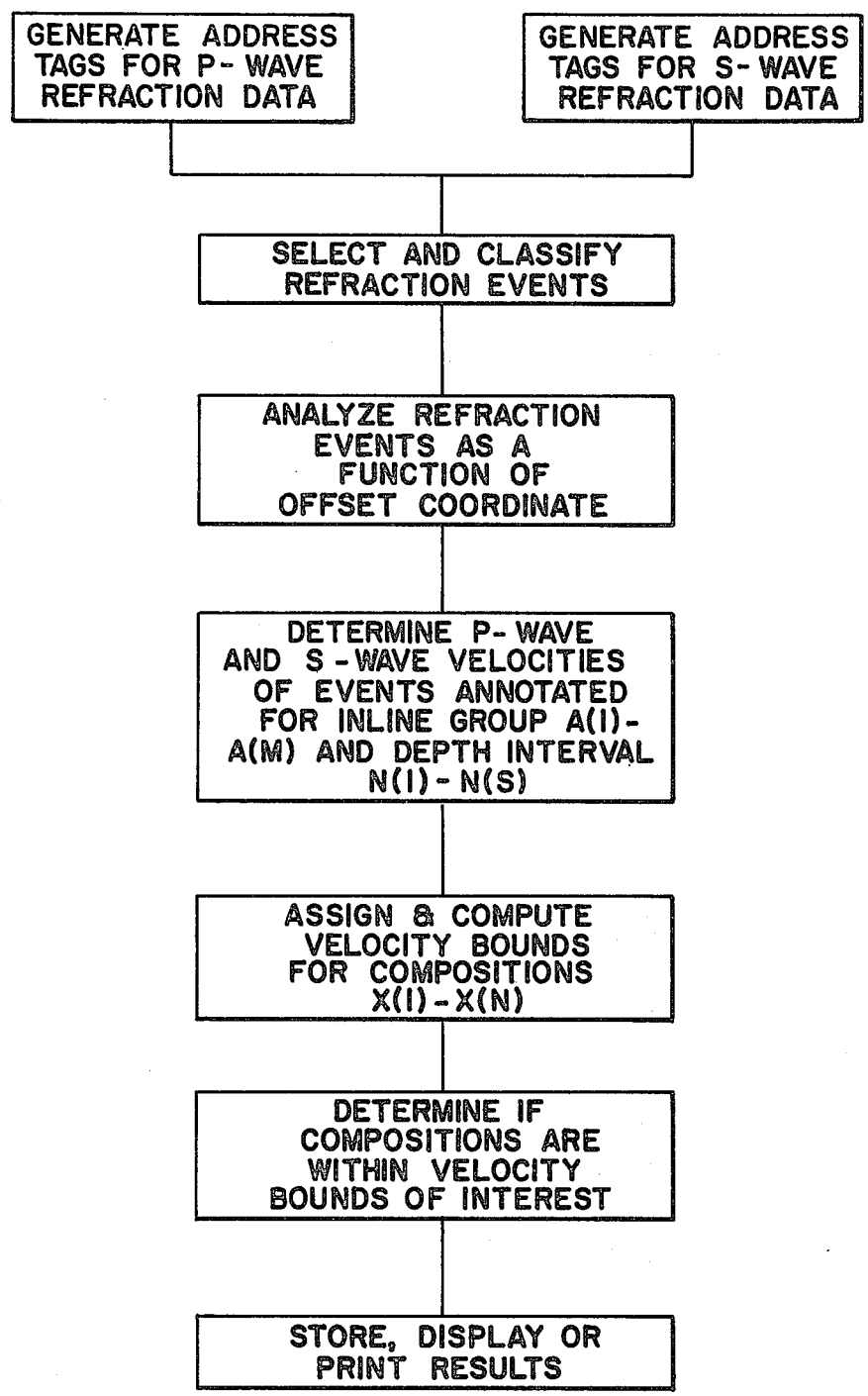
FIG. 10 is a flow diagram illustration of a machine-dominated process in which functions required by the method of the present invention can be easily achieved.
Figure 11:
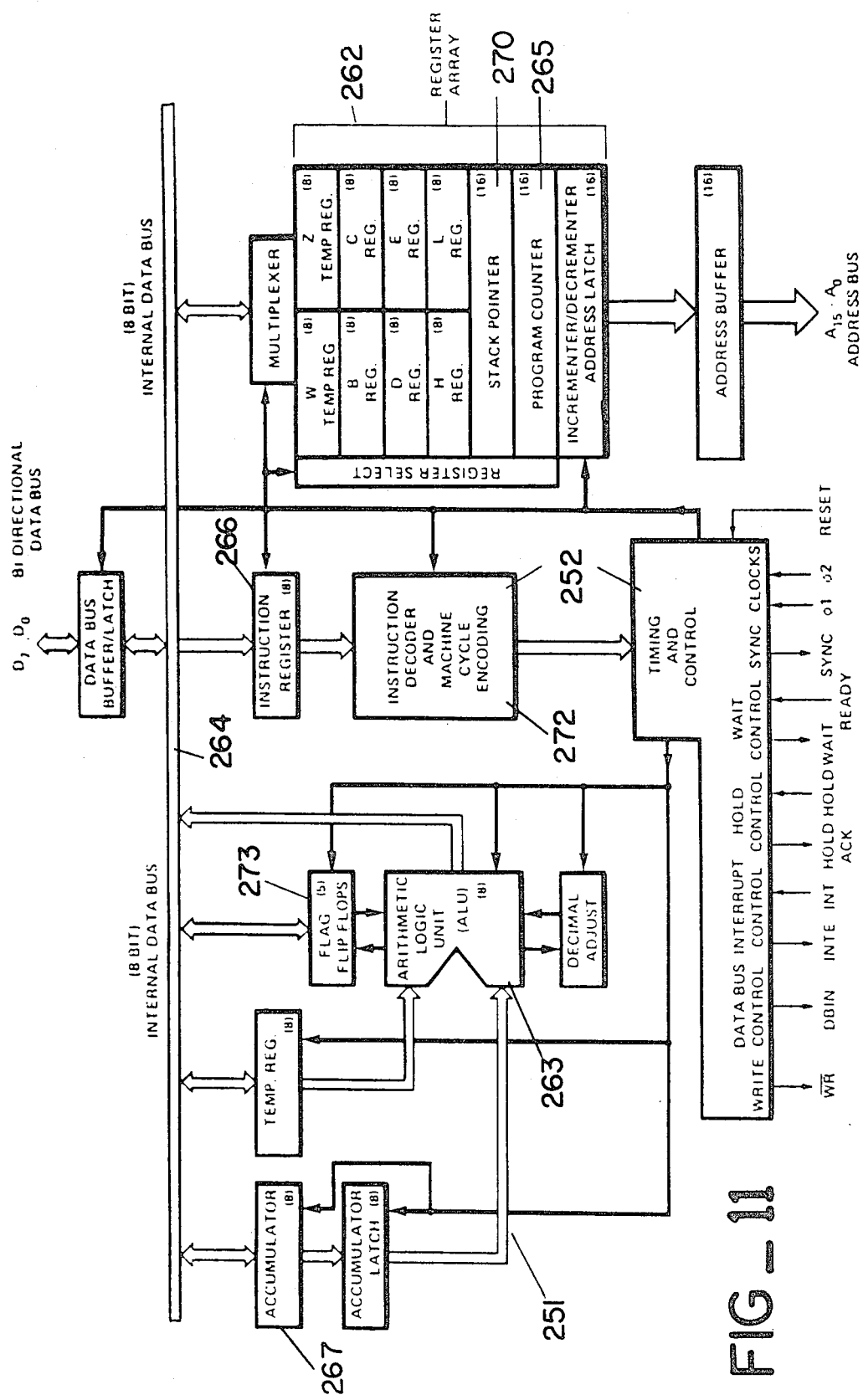
FIGS. 11 and 12 illustrate particular elements of a computing system for carrying out the steps of FIG. 10.

FIG. 11 illustrates particular elements of a computing system for carrying out the steps of FIG. 10. While many computing systems are available to carry out the process of the invention, perhaps to best illustrate operations at the lowest cost per instruction, a microcomputing system 250 is didactically best and is presented in detail below. The system 250 of FIG. 11 can be implemented on hardware provided by many different manufacturers, and for this purpose, elements provided by Intel Corporation, Santa Clara, Calif., may be preferred.

Such a system 250 can include a CPU 251 controlled by a control unit 252. Two memory units 253 and 254 connect to the CPU 251 through BUS 255. Program memory unit 253 stores instructions for directing the activities of the CPU 251 while data memory unit 254 contains data (as data words) related to the seismic data provided by the field acquisition system. Since the seismic traces contain large amounts of bit data, an auxil-

| Patent | Issued | Inventor | Title |
|---|---|---|---|
| 3,597,727 | 12/30/68 | Judson et al | Method of Attenuating Multiple Seismic Signals in the Determination of Inline and Cross Dips Employing Cross-Steered Seismic Data |
| 3,806,863 | 4/23/74 | Tilley et al | Method of Collecting Seismic Data of Strata Underlying Bodies of Water |
| 3,638,178 | 1/25/72 | Stephenson | Method for Processing Three-Dimensional Seismic Data to Select and Plot Said Data on a Two-Dimensional Display Surface |
| 3,346,840 | 10/10/67 | Lara | Double Sonogramming for Seismic Record Improvement |
| 3,766,519 | 10/16/73 | Stephenson | Method for Processing Surface Detected Seismic Data to Plotted Representations of Subsurface Directional Seismic Data |
| 3,784,967 | 1/8/74 | Graul | Seismic Record Processing Method |
| 3,149,302 | 9/15/74 | Klein et al | Information Selection Programmer Employing Relative Amplitude, Absolute Amplitude and Time Coherence |
| 3,149,303 | 9/15/64 | Klein et al | Seismic Cross-Section Plotter |

FIG. 10 is a flow diagram illustrative of a computer-dominated process in which the functions required by the initial stages of the method of the present invention can be easily ascertained.

The steps of FIG. 10 include generating addresses for the P-wave and S-wave refraction data. Variables to be addressed include: refraction amplitude-vs.-time values; offset position (detector, sourcepoint, centerpoint) sourcepoint-profile number, common offset lines, common centerpoint lines, and common detector location lines, as previously noted. After P-wave and S-wave refraction events have selected and classified, the resulting data are analyzed, say, graphically as a function of offset position in the manner of FIG. 5.

After the apparent refraction time-vs.-offset data have been displayed and shape of the formation determined as previously suggested, annotation of P-wave and S-wave velocity determinations as a function of group and depth interval, can occur. Then, various mineral compositions are assigned to the above-designated group and depth intervals and the velocities of iary memory unit 255 can be provided. The CPU 251 can rapidly access data stored through addressing the particular input port, say, at 256 in the Figure. Additional input ports can also be provided to receive additional information as required from usual external equipment well known in the art, e.g., floppy disks, paper-tape readers, etc., including such equipment interfaced through input interface port 257 tied to a keyboard unit 258 for such devices. Using clock inputs, control circuitry 252 maintains the proper sequence of events required for any processing task. After an instruction is fetched and decoded, the control circuitry issues the appropriate signals (to units both internal and external) for initiating the proper processing action. Often the control circuitry will be capable of responding to external signals, such as an interrupt or wait request. An interrupt request will cause the control circuitry 252 to temporarily interrupt main program execution, jump to a special routine to service the interrupting device, then automatically return to the main program. A wait request is often issued by memory units 253 or 254 or an I/O element that operates slower than the CPU.

For outputting information, the system 250 can include a printer unit 259 whereby the amplitude of the summed traces as a function of time is printable. Of more use as an output unit, however, is disk unit 260, which can temporarily store the data. Thereafter, an off-line digital plotter capable of generating a side-by-side display is used in conjunction with the data on the disk unit 260. Such plotters are available in the art, and one proprietary model has been previously described as a computer-controlled CRT for optically merging onto photographic paper, as a display mechanism, the seismic data.

Figure 12:
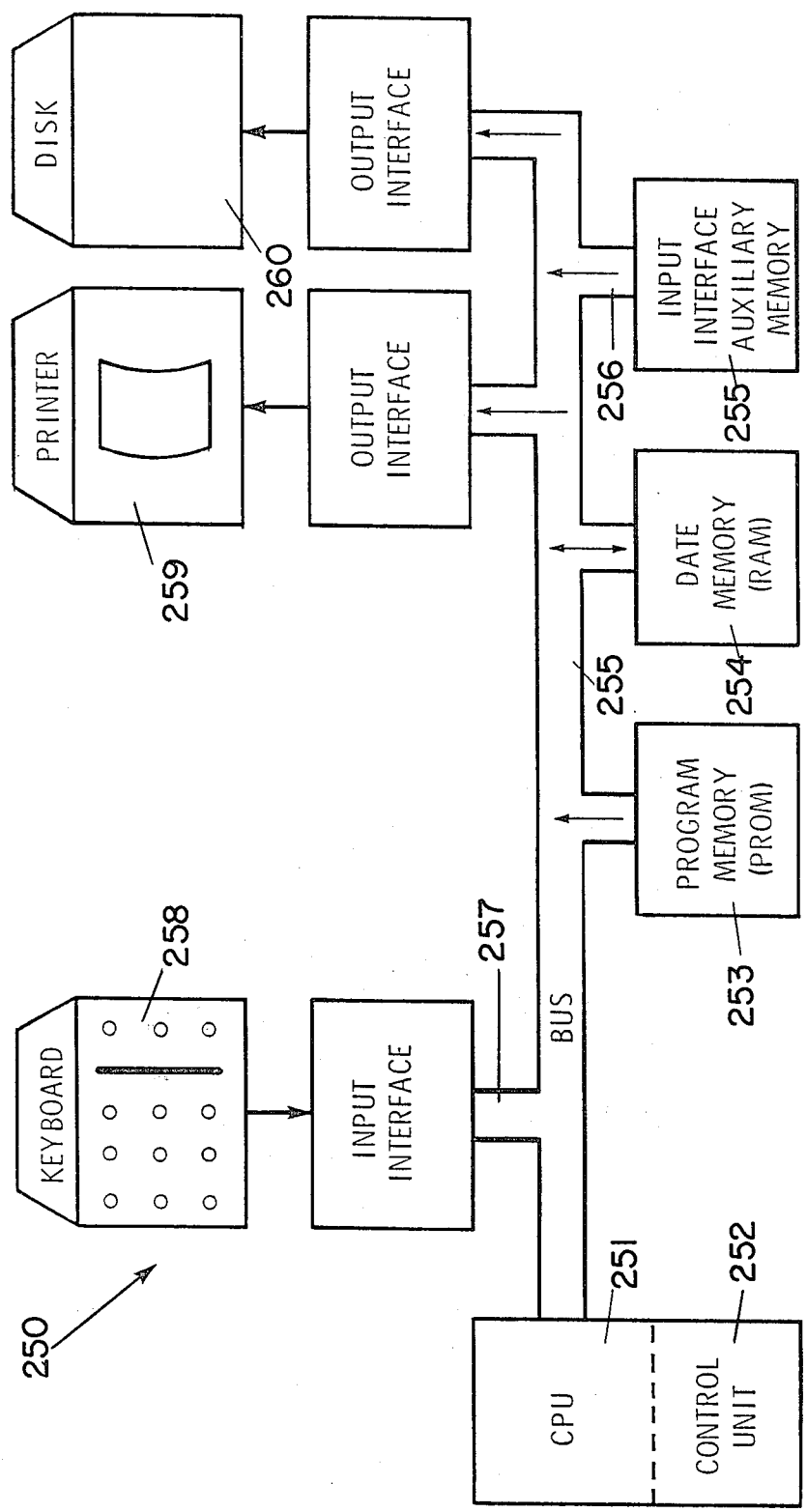

FIG. 12 illustrates CPU 251 and control unit 252 in more detail.

As shown, the CPU 251 includes an array of registers generally indicated at 262 tied to an ALU 263 through an internal data bus 264 under control of control unit 252. The registers 262 are temporary storage areas. Program counter 265 and instruction register 266 have dedicated uses; the other registers, such as accumulator 267, have more general uses.

The accumulator 267 usually stores one of the seismic operands to be manipulated by the ALU 263. For example, in the summation of traces, the instruction may direct the ALU 263 to not only add in sequence the contents of the temporary registers containing predetermined trace amplitudes together with an amplitude value in the accumulator, but also store the result in the accumulator itself. Hence, the accumulator 267 operates as both a source (operand) and a destination (result) register. The additional registers of the array 262 are useful in manipulation of seismic data, since they eliminate the need to shuffle results back and forth between the external memory units of FIG. 11 and accumulator 267. In practice, most ALU's also provide other built-in functions, including hardware subtraction, boolean logic operations, and shift capabilities. The ALU 263 also can utilize flag bits generated by FF unit 273 which specify certain conditions that arise in the course of arithmetical and logical manipulations. Flags typically include carry, zero, sign, and parity. It is possible to program jumps which are conditionally dependent on the status of one or more flags. Thus, for example, the program may be designed to jump to a special routine if the carry bit is set following an addition instruction.

Instructions making up the program for operations involving seismic data are stored in the program memory unit 253 of the CPU 251 of FIG. 11. The program is operated upon in a sequential manner except when instructions in the memory units 253, 254 call for special commands such as "jump" (or "call") instructions. While the program associated with the present invention is a relatively straightforward one, hence avoiding most "jump" and "call" instructions, "call" instructions for subroutines are common in the processing of seismic data and could be utilized, if desired. In "call" instructions, the CPU 251 has a special way of handling subroutines in order to insure an orderly return to the main program. When the processor receives a call instruction, it increments the program counter 265 and notes the counter's contents in a reserved memory area of the memory unit known as the "stack".

CPU's have different ways of maintaining stack contents. Some have facilities for the storage of return addresses built into the CPU itself. Other CPU's use a reserved area of external memory as the stack and simply maintain a "pointer" register, such as pointer register 270, FIG. 12, which contains the address of the most recent stack entry. The stack thus saves the address of the instruction to be executed after the subroutine is completed. Then the CPU 251 loads the address specified in the call into its program counter 265. The next instruction fetched will therefore be the first step of the subroutine. The last instruction in any subroutine is a "return". Such an instruction need specify no address.

Having now briefly described the operations of the CPU 251, Table I is presented below containing a full instruction set for its operations.

TABLE I

| | Summary of Processor Instructions by Alphabetical Order | | | | | | | | | |
|---|---|---|---|---|---|---|---|---|---|---|
| | | Instruction Code[1] | | | | | | | | Clock[2] |
| Mnemonic | Description | $D_7$ | $D_6$ | $D_5$ | $D_4$ | $D_3$ | $D_2$ | $D_1$ | $D_0$ | Cycles |
| ACI | Add immediate to A with carry | 1 | 1 | 0 | 0 | 1 | 1 | 1 | 0 | 7 |
| ADC M | Add memory to A with carry | 1 | 0 | 0 | 0 | 1 | 1 | 1 | 0 | 7 |
| ADC r | Add register to A with carry | 1 | 0 | 0 | 0 | 1 | S | S | S | 4 |
| ADD M | Add memory to A | 1 | 0 | 0 | 0 | 0 | 1 | 0 | 1 | 7 |
| ADD r | Add register to A | 1 | 0 | 0 | 0 | 0 | S | S | S | 4 |
| ADI | Add immediate to A | 1 | 1 | 0 | 0 | 0 | 1 | 1 | 0 | 7 |
| ANA M | And memory with A | 1 | 0 | 1 | 0 | 0 | 1 | 1 | 0 | 7 |
| ANA r | And register with A | 1 | 0 | 1 | 0 | 0 | S | S | S | 4 |
| ANI | And immediate with A | 1 | 1 | 1 | 0 | 0 | 1 | 1 | 0 | 7 |
| CALL | Call unconditional | 1 | 1 | 0 | 0 | 1 | 1 | 0 | 1 | 17 |
| CC | Call on carry | 1 | 1 | 0 | 1 | 1 | 1 | 0 | 0 | 11/17 |
| CM | Call on minus | 1 | 1 | 1 | 1 | 1 | 1 | 0 | 0 | 11/17 |
| CMA | Compliment A | 0 | 0 | 1 | 0 | 1 | 1 | 1 | 1 | 4 |
| CMC | Compliment carry | 0 | 0 | 1 | 1 | 1 | 1 | 1 | 1 | 4 |
| CMP M | Compare memory with A | 1 | 0 | 1 | 1 | 1 | 1 | 1 | 0 | 7 |
| CMP r | Compare register with A | 1 | 0 | 1 | 1 | 1 | S | S | S | 4 |
| CNC | Call on no carry | 1 | 1 | 0 | 1 | 0 | 1 | 0 | 0 | 11/17 |
| CNZ | Call on no zero | 1 | 1 | 0 | 0 | 0 | 1 | 0 | 0 | 11/17 |
| CP | Call on positive | 1 | 1 | 1 | 1 | 0 | 1 | 0 | 0 | 11/17 |
| CPE | Call on parity even | 1 | 1 | 1 | 0 | 1 | 1 | 0 | 0 | 11/17 |
| CPI | Compare immediate with A | 1 | 1 | 1 | 1 | 1 | 1 | 1 | 0 | 7 |
| CPO | Call on parity odd | 1 | 1 | 1 | 0 | 0 | 1 | 0 | 0 | 11/17 |
| CZ | Call on zero | 1 | 1 | 0 | 0 | 1 | 1 | 0 | 0 | 11/17 |

TABLE I-continued
Summary of Processor Instructions by Alphabetical Order

| Mnemonic | Description | $D_7$ | $D_6$ | $D_5$ | $D_4$ | $D_3$ | $D_2$ | $D_1$ | $D_0$ | Clock[2] Cycles |
|---|---|---|---|---|---|---|---|---|---|---|
| DAA | Decimal adjust A | 0 | 0 | 1 | 0 | 0 | 1 | 1 | 1 | 4 |
| DAD B | Add B&C to H&L | 0 | 0 | 0 | 0 | 1 | 0 | 0 | 1 | 10 |
| DAD D | Add D&E to H&L | 0 | 0 | 0 | 1 | 1 | 0 | 0 | 1 | 10 |
| DAD H | Add H&L to H&L | 0 | 0 | 1 | 0 | 1 | 0 | 0 | 1 | 10 |
| DAD SP | Add stack pointer to H&L | 0 | 0 | 1 | 1 | 1 | 0 | 0 | 1 | 10 |
| DCR M | Decrement memory | 0 | 0 | 1 | 1 | 0 | 1 | 0 | 1 | 10 |
| DCR r | Decrement register | 0 | 0 | D | D | D | 1 | 0 | 1 | 5 |
| DCX B | Decrement B&C | 0 | 0 | 0 | 0 | 1 | 0 | 1 | 1 | 5 |
| DCX D | Decrement D&E | 0 | 0 | 0 | 1 | 1 | 0 | 1 | 1 | 5 |
| DCX H | Decrement H&L | 0 | 0 | 1 | 0 | 1 | 0 | 1 | 1 | 5 |
| DCX SP | Decrement stack pointer | 0 | 0 | 1 | 1 | 1 | 0 | 1 | 1 | 5 |
| DI | Disable interrupt | 1 | 1 | 1 | 1 | 0 | 0 | 1 | 1 | 4 |
| EI | Enable interrupts | 1 | 1 | 1 | 1 | 1 | 0 | 1 | 1 | 4 |
| HLT | Halt | 0 | 1 | 1 | 1 | 0 | 1 | 1 | 0 | 7 |
| IN | Input | 1 | 1 | 0 | 1 | 1 | 0 | 1 | 1 | 10 |
| INR M | Increment memory | 0 | 0 | 1 | 1 | 0 | 1 | 0 | 0 | 10 |
| INR r | Increment register | 0 | 0 | D | D | D | 1 | 0 | 0 | 5 |
| INX B | Increment B&C registers | 0 | 0 | 0 | 0 | 0 | 0 | 1 | 1 | 5 |
| INX D | Increment D&E registers | 0 | 0 | 0 | 1 | 0 | 0 | 1 | 1 | 5 |
| JC | Jump on carry | 1 | 1 | 0 | 1 | 1 | 0 | 1 | 0 | 10 |
| JM | Jump on minus | 1 | 1 | 1 | 1 | 1 | 0 | 1 | 0 | 10 |
| JMP | Jump unconditional | 1 | 1 | 0 | 0 | 0 | 0 | 1 | 1 | 10 |
| JNC | Jump on no carry | 1 | 1 | 0 | 1 | 0 | 0 | 1 | 0 | 10 |
| JNZ | Jump on no zero | 1 | 1 | 0 | 0 | 0 | 0 | 1 | 0 | 10 |
| JP | Jump on positive | 1 | 1 | 1 | 1 | 0 | 0 | 1 | 0 | 10 |
| JPE | Jump on parity even | 1 | 1 | 1 | 0 | 1 | 0 | 1 | 0 | 10 |
| JPO | Jump on parity odd | 1 | 1 | 1 | 0 | 0 | 0 | 1 | 0 | 10 |
| JZ | Jump on zero | 1 | 1 | 0 | 0 | 1 | 0 | 1 | 0 | 10 |
| LDA | Load A direct | 0 | 0 | 1 | 1 | 1 | 0 | 1 | 0 | 13 |
| LDAX B | Load A indirect | 0 | 0 | 0 | 0 | 1 | 0 | 1 | 0 | 7 |
| LDAX D | Load A indirect | 0 | 0 | 0 | 1 | 1 | 0 | 1 | 0 | 7 |
| LHLD | Load H&L direct | 0 | 0 | 1 | 0 | 1 | 0 | 1 | 0 | 16 |
| LXI B | Load immediate register pair B&C | 0 | 0 | 0 | 0 | 0 | 0 | 0 | 1 | 10 |
| LXI D | Load immediate register pair D&E | 0 | 0 | 0 | 1 | 0 | 0 | 0 | 1 | 10 |
| LXI H | Load immediate register Pair H&L | 0 | 0 | 1 | 0 | 0 | 0 | 0 | 1 | 10 |
| LXI SP | Load immediate stack pointer | 0 | 0 | 1 | 1 | 0 | 0 | 0 | 1 | 10 |
| MVI M | Move immediate memory | 0 | 0 | 1 | 1 | 0 | 1 | 1 | 0 | 10 |
| MVI r | Move immediate register | 0 | 0 | D | D | D | 1 | 1 | 0 | 7 |
| MOV m,r | Move register to memory | 0 | 1 | 1 | 1 | 0 | S | S | S | 7 |
| MOV r,M | Move memory to register | 0 | 1 | D | D | D | 1 | 1 | 0 | 7 |
| MOV $r_1,r_2$ | Move register to register | 0 | 1 | D | D | D | S | S | S | 5 |
| NOP | No operation | 0 | 0 | 0 | 0 | 0 | 0 | 0 | 0 | 4 |
| ORA M | Or memory with A | 1 | 0 | 1 | 1 | 0 | 1 | 1 | 0 | 7 |
| ORA r | Or register with A | 1 | 0 | 1 | 1 | 0 | S | S | S | 4 |
| ORI | Or immediate with A | 1 | 1 | 1 | 1 | 0 | 1 | 1 | 0 | 7 |
| OUT | Output | 1 | 1 | 0 | 1 | 0 | 0 | 1 | 1 | 10 |
| PCHL | H&L to program counter | 1 | 1 | 1 | 0 | 1 | 0 | 0 | 1 | 5 |
| POP B | Pop register pair B&C off stack | 1 | 1 | 0 | 0 | 0 | 0 | 0 | 1 | 10 |
| POP D | Pop register pair D&E off stack | 1 | 1 | 0 | 1 | 0 | 0 | 0 | 1 | 10 |
| POP H | Pop register pair H&L off stack | 1 | 1 | 1 | 0 | 0 | 0 | 0 | 1 | 10 |
| POP PSW | Pop A and Flags off stack | 1 | 1 | 1 | 1 | 0 | 0 | 0 | 1 | 10 |
| PUSH B | Push register Pair B&C on stack | 1 | 1 | 0 | 0 | 0 | 1 | 0 | 1 | 11 |
| PUSH D | Push register Pair D&E on stack | 1 | 1 | 0 | 1 | 0 | 1 | 0 | 1 | 11 |
| PUSH H | Push register Pair H&L on stack | 1 | 1 | 1 | 0 | 0 | 1 | 0 | 1 | 11 |
| PUSH PSW | Push A and Flags on stack | 1 | 1 | 1 | 1 | 0 | 1 | 0 | 1 | 11 |
| RAL | Rotate A left through carry | 0 | 0 | 0 | 1 | 0 | 1 | 1 | 1 | 4 |
| RAR | Rotate A right through | | | | | | | | | |

TABLE I-continued
Summary of Processor Instructions by Alphabetical Order

| Mnemonic | Description | Instruction Code[1] | | | | | | | | Clock[2] Cycles |
|---|---|---|---|---|---|---|---|---|---|---|
| | | $D_7$ | $D_6$ | $D_5$ | $D_4$ | $D_3$ | $D_2$ | $D_1$ | $D_0$ | |
| | carry | 0 | 0 | 0 | 1 | 1 | 1 | 1 | 1 | 4 |
| RC | Return on carry | 1 | 1 | 0 | 1 | 1 | 0 | 0 | 0 | 5/11 |
| RET | Return | 1 | 1 | 0 | 0 | 1 | 0 | 0 | 1 | 10 |
| RLC | Rotate A Left | 0 | 0 | 0 | 0 | 0 | 1 | 1 | 1 | 4 |
| RM | Return on minus | 1 | 1 | 1 | 1 | 1 | 0 | 0 | 0 | 5/11 |
| RNC | Return on no carry | 1 | 1 | 0 | 1 | 0 | 0 | 0 | 0 | 5/11 |
| RNZ | Return on no zero | 1 | 1 | 0 | 0 | 0 | 0 | 0 | 0 | 5/11 |
| RP | Return on positive | 1 | 1 | 1 | 1 | 0 | 0 | 0 | 0 | 5/11 |
| RPE | Return on parity even | 1 | 1 | 1 | 0 | 1 | 0 | 0 | 0 | 5/11 |
| RPO | Return on parity odd | 1 | 1 | 1 | 0 | 0 | 0 | 0 | 0 | 5/11 |
| RRC | Rotate A right | 0 | 0 | 0 | 0 | 1 | 1 | 1 | 1 | 4 |
| RST | Restart | 1 | 1 | A | A | A | 1 | 1 | 1 | 11 |
| RZ | Return on zero | 1 | 1 | 0 | 0 | 1 | 0 | 0 | 0 | 5/11 |
| SBB M | Subtract memory from A with borrow | 1 | 0 | 0 | 1 | 1 | 1 | 1 | 0 | 7 |
| SBB r | Subtract register from A with borrow | 1 | 0 | 0 | 1 | 1 | S | S | S | 4 |
| SBI | Subtract immediate from A with borrow | 1 | 1 | 0 | 1 | 1 | 1 | 1 | 0 | 7 |
| SHLD | Store H&L direct | 0 | 0 | 1 | 0 | 0 | 0 | 1 | 0 | 16 |
| SPHL | H&L to stack pointer | 1 | 1 | 1 | 1 | 1 | 0 | 0 | 1 | 5 |
| STA | Store A direct | 0 | 0 | 1 | 1 | 0 | 0 | 1 | 0 | 13 |
| STAX B | Store A indirect | 0 | 0 | 0 | 0 | 0 | 0 | 1 | 0 | 7 |
| STAX D | Store A indirect | 0 | 0 | 0 | 1 | 0 | 0 | 1 | 0 | 7 |
| STC | Set carry | 0 | 0 | 1 | 1 | 0 | 1 | 1 | 1 | 4 |
| SUB M | Subtract memory from A | 1 | 0 | 0 | 1 | 0 | 1 | 1 | 0 | 7 |
| SUB r | Subtract register from A | 1 | 0 | 0 | 1 | 0 | S | S | S | 4 |
| SUI | Subtract immediate from A | 1 | 1 | 0 | 1 | 0 | 1 | 1 | 0 | 7 |
| XCHG | Exchange D&E, H&L Registers | 1 | 1 | 1 | 0 | 1 | 0 | 1 | 1 | 4 |
| XRA M | Exclusive Or memory with A | 1 | 0 | 1 | 0 | 1 | 1 | 1 | 0 | 7 |
| XRA r | Exclusive Or register with A | 1 | 0 | 1 | 0 | 1 | S | S | S | 4 |
| XRI | Exclusive Or immediate with A | 1 | 1 | 1 | 0 | 1 | 1 | 1 | 0 | 7 |
| XTHL | Exchange top of stack, H&L | 1 | 1 | 1 | 0 | 0 | 0 | 1 | 1 | 18 |

[1] DDD or SSS-000B-001C-010D-011E-100H-101L-110 Memory-111A.
[2] Two possible cycle times (5/11) indicate instruction cycles dependent on condition flags.

The method of the present invention provides a geophysicist with tools for determining shape of subsurface strata, elastic parameters of interest and lithology of the surveyed formation, to indicate likelihood of the formation containing ore, marker rock, economic minerals, and the like. With further regard to predicting lithology, further discussion referencing FIGS. 13-19 is in order and is presented below.

Lithology Prediction

In accordance with further aspects of the present invention, the lithology of the earth formation under survey is surprisingly predictable based on refracted P-wave and S-wave velocity information observed in the field. Such lithology predictions and estimations use a machine-implemented data processing method in which a multi-dimensional space is searched—in variable function steps ("delta step")—for all possible mineralogical combinations, with the requirement that the successful candidates must satisfy the observed P-wave and S-wave velocities within predetermined uncertainty limits. Constraints to that space can include estimates of P-wave and S-wave velocities (i.e., $V_p$ and $V_2$) derivable from three fundamental quantities of significance: The bulk modulus K, the shear modulus G, and bulk density P. The method of the present invention is surprisingly rapid—up to 20 mineralogical combinations can be examined in rapid succession and successful candidates displayed on a $V_p$ vs. $V_s$ plot. Additional geological constraints are possible based on special known mineralogical inputs of a particular fashion. Finally, an interpretor can examine each constrained combination to provide a most probable one based on various statistical methods.

Returning to FIG. 10, assume that the P-wave and S-wave velocities for the events of interest have been annotated for inline group receivers A(1)-A(M) and depth intervals N(1)-N(S), and that mineral compositions X(1)-X(n) have been selected, sorted, and arranged in association with the above-mentioned group and depth intervals. In the assignment of particular minerals to form such compositions, geological restraints of a preselected nature are often called into play, as described below. After, the computation of the compressional and shear wave velocities of such combinations of materials has occurred, P-wave and S-wave velocities of the computed combinations are compared with observed $V_P$ and $V_S$ values, with the successful candidates of such comparisons indicating the probable lithology of the formation of interest.

Now in more detail, reference should now be had to FIG. 13, where a lithology indicating system 150 is shown. In connection with FIG. 13, it is assumed that the field refraction velocity data have been entered via source line 160-A of system 150 after being digitized using a conventional A/D converter (not shown). From line 160-A, the data flow through buffer 161-A, memory-addresser 162-A and register 163-A to signal memory 164. Paralleling the input of the above information are digital data associated with: (1) physical parameters of know minerals which form the data base for operations to be described hereinafter and (2) an edit input file related to control functions for operation of the system 150 which is related, among other things, to designated user options.

As to (1) above, the digital data related to known field data are applied via source line 160-B and then passed through buffer 161-B, memory-addressor 162-B and register 163-B to signal memory 164.

As to (2) above, the digital information related to the edit input file is seen to flow via source line 160-C through buffer 162-c and register 163-C to the same signal memory 164. The edit input file correlates and identifies all user options and name files for use in later system operations.

The purpose of memory-addressors 162-A, -B, -C is to pack several digital words into one memory word, as well as to reduce data flow rates within the memory 164. Since it is recognized that the instantaneous flow rate into memory-addressors 162-A, -B, -C may be significantly higher than average flow rates, memory 164 can thus operate at a much slower and constant flow rate.

Next, after the data are normalized into depth and group intervals, the data are extracted from the memory 164 and passed through gate 165 to data processing circuit 166. Within data processing circuit 166, the data streams are manipulated to provide selected sorting, mathematical and associated operations, as explained below, whereby comparisons of data can be made, and ultimately lithology associated with the depth and group intervals of interest can be accurately predicted. As shown, the data are subsequently gated through buffer 169 to digital recorder-printer 170.

Control of operations is paced by timing and logic circuitry 171, which includes a program clock 172, programming timing counter 173, as well as decoding control circuit 174. To synchronize operations, a start signal is passed through buffer-amplifier 175 to the programming clock 172. Paralleling the start signal, is adjustment means 176, which allows flexibility in the sequence of operations. For example, the rate at which the system recycles, (i.e., iterates) can be changed by the operator by resetting adjustment means 176 to a new value. Program counter 173 is actuated by the program clock 172 which sequences the system through programs conventional in the arts within parameter limits of the method of the present invention. Such program counter 173 acts through the decoding and control unit 174 so as to provide sequential processing steps whereby data can be (i) extracted from memory 164; (ii) controllably gated through gate 165; (iii) recorded and-/or printed at recorder-printer 170 through action of buffer 169 and (iv) functionally operated upon prior to recordation within data processing circuit 166.

FIG. 14 illustrates schematically data processing circuit 166 in more detail.

In general, circuit 166 of FIG. 14 provides essential selection criteria for searching the multi-dimensional space—in steps—to determine if the mineral compositions meet screening tests, with two main iteration loops occurring: (i) a first loop 200 for providing for computation of velocities associated with different combinations of minerals followed by testing to determine which ones meet certain selection criteria, such loop 200 including composition generator 201, velocity annotator 202 and testing array 203, and (ii) a second loop 204 which controls the processing of the combinations of minerals, including, ultimately viewing of an interpretor, via display plotter-printer 205. The displays of the plotter-printer 205 occur after a determination has been made that no more combinations of minerals are to be screened and tested say via commands from controller 206 operating between compositions generator 201, velocity annotator 202, testing array 203 and the display plotter-printer 205.

Commands from controller 206 are keyed essentially to the searching of a multi-dimensional space—in variable function steps ("delta step")—for initially, (i) all possible mineralogical combinations, and then finally (ii) those combinations which satisfy the observed P-wave and S-wave velocities within predetermined uncertainty limits. Constraints to that space are provided via the controller 206 through the compositions generator 201, velocity annotation 202, testing array 203 or plotter-printer 205. Estimates of P-wave and S-wave velocities (i.e., $V_p$ and $V_s$) for each composition C(1)–C(S) are derived and annotated from three fundamental quantities of significance: the bulk modulus, K, the shear modulus G, and bulk density P. Selection and testing of the combinations at testing array 203 are surprisingly rapid—up to 20 mineralogical combinations can be examined in rapid succession and successful candidates displayed on a $V_p$ vs. $V_s$ plot in a matter of seconds. Additional geological constraints are also utilized say at compositions generator 201 based on special known mineralogical distributional patterns. Testing constraints are provided ultimately through testing array 203. Finally, an interpretor can examine each constrained combination to provide a most probable one based on various statistical methods, as by use of the controller 206 through plotter-printer 205.

FIG. 15 illustrates a flow chart of a general-purpose computer program which also may be used to carry out the method of the present invention.

As seen in FIG. 15, the program is basically a computation and compare scheme in accordance with the principals discussed above.

Disk files of the computing system are first called in. There are three such disks. One contains mineral data; another comprises velocity data associated with a series of depth intervals and receiver groups of the formation to be analyzed; and yet another contains edit input data for controlling the step-to-step operations of the system. After addresses for in-line groups of seismic receivers associated with given depth intervals, has been generated, mineral compositions X(1)–X(n) for a given in-line group A(1) of an interval of depth N(1), N(2) . . . N(s), are selected, sorted and arranged in a selected pattern. Compression and shear wave velocities, i.e., $V_p$ and $V_s$, associated with each composition X(1), X(2) . . . $X_n$ are next computed. If the velocities meet certain selection criteria, the mineral composition is stored, and the process is repeated from groups A(2), A(3) . . . A(M).

Otherwise iteration of groups A(2) occurs immediately.

Ultimately after the computations associated with intervals N(1) are completed, iteration for intervals N(2) . . . N(s) occurs in like manner.

An even more complex program of the present invention has been successfully undertaken and a listing thereof is presented below to be understood in conjunction with flow charts set forth in FIGS. 16-19. Note that the program listing sets forth the following subroutines and functions which should be read in conjunction with the flow chart of FIG. 16.

| Subroutine | Function |
| --- | --- |
| MINERAL EXEC | Attaches files and executes Mineral I EXEC |
| MINERAL I EXEC | Step (1): names input data file; |
| | Step (2): terminates interactive generation of file |
| | Step (3): Executes MNLPOST Program to analyze data. |
| MNLDATA | Stores desired input data file. |
| MINERALS | (1) finds valid sets of compositions; |
| | (2) stores sets of valid compositions in file form. |
| MNLPOST | Analyzes data associated with valid sets of compositions and presents results in various display forms. |

In FIG. 16, note that the MNLDATA subroutine occurs early in the program. The purpose of such subroutine: to build an input data file for use in controlling the operation of the total program.

In more detail, the MNLDATA subroutine allows for the setting of a certain number of geological constraints related to various physical parameters associated with the earth formation of interest including numbers and types of minerals to be present, the minimum and maximum amounts of each particular mineral composition, and special relationships associated with the interpretation of the results. In setting the number and types of minerals to be used for analysis purposes, the number of minerals should be kept as small as possible. Also, note that the searching of the multi-dimensional space is in increments, using a delta step whose step interval can be changed to accommodate wider or smaller screening parameters. Since the total program preferably operates in conjunction with a timeshare computer, the effect of the number and type of minerals to be used to form each set of mineral compositions, their relationship within the program and different delta-step functions, can be ascertained interactively prior to actually running the full program. To form the edit file disk interactively, a series of questions appears at the input of the MNLDATA subroutine. The answers form the edit data file and are formatted into use within the program itself.

Now reference should be had to FIG. 17 where the MINERALS subroutine is shown; note that valid combinations of mineral compositions are determined essentially using the answers to two questions:

(i) Does the composition satisfy geologic constraints of record, and if the answer to question (i) is yes, (ii) Does the velocity data of the chosen compositions satisfy the geophysical or observed field velocity data within particular error limits.

As to (i) supra, as previously indicated the total program allows a number of geologic constraints to be used, including the number and types of minerals to be formed into each set of compositions, their minimum-maximum percentage content, special relationships as well as special histograms which might describe the mineral composition for eaach mineral within a particular geologic location. Also in establishing geological restraints, certain aspects related to combinational statistics must be taken into account. Such factors relate to the fact that percentage ranges of minerals forming each set of compositions depend on the number of elements forming each composition. FIG. 18 didactically shows the relationship of combinational statistics and geologic constraints in detail.

As shown in FIG. 18, note that arrays of binomial coefficients are arranged as a segmented triangle to be coded by column, row and diagonal addresses. The binomial coefficients themselves establish along diagonal pathways, the number of times that succeedingly smaller percentages of a given mineral occur in relationship to other minerals of the combinations. Such progression is illustrated in FIG. 18 by a particular path in which binary coefficients outlined by phantom line 215 describes operation of a 4-component system searched in 20% incremental steps. Within the diagonal pathway outlined by line 215, the number designated "1" indicates the answer to the question "How many cases can A mineral (from among A, B, C and D minerals) represent 100% of the mineral content of the combination?" That is to say, i.e., if A mineral represents 100% of the total mineral content of the combination, then the content of the remaining minerals B, C, D is 0%. Next, when the A mineral represents 80% of the mineral content, the 20% mineral content that remains, can be filled by any one of the remaining components B, C, or D. Therefore, if A mineral represents 80% of the mineral content, there are three possible combinations which are satisfactory, i.e., the A-B, A-C, and A-D combinations. Proceeding along the diagonal of the coefficients surrounded by phantom line 215, then when the A mineral represents 60% of the mineral content of the composition, there are 6 possible combinations; likewise, when A mineral represents 40%, there are 10 possible combinations; when A mineral is 20% there are 15 alternate combinations; and when A mineral is 0% there are 21 possible alternate combinations. Note that the sum of all possible combinations within phantom line 215 is the number "56" found below the last coefficient, i.e., the "21" coefficient number. The individual combinations associated with each component of each composition are lastly stored within a storage area by the computing system through "counts" representing the number of times that the percentage appears as a function of the percent minerals; that is, for the example set forth above the values for the four component system would be stored, with proper annotation, as 1 count, 3 counts, 6 counts, 10 counts, 15 counts and 21 counts, respectively. Since the program preferably operates in conjunction with a timeshare computer, the effect of the number and type of materials and the combinational statistics provided by the binomial coefficients of FIG. 18 can be analyzed before a full run is undertaken.

In this regard, during calculations, the normal mode of operation is interactive, but for longer runs (12 or more minerals) batch-mode operation are preferred in which every conceivable rock composition can be generated and velocities compared at minimum cost.

As to (ii) supra, the geophysical constraints are provided to the system based on: a comparison of field compressional and shear wave velocities (annotated by depth interval and in-line position) to calculated values of the same parameters. For each of a group of compositions, such compositions estimate P-wave velocity ($V_p$) and shear wave velocity ($V_S$) and compare such values to observed values. There are two ways to do such calculations, and in the computer program of the present invention there are provided options for the user in this regard. However, for purposes of the present description, a description of only the simpler of the two methods is given, although details of the more complicated method can be obtained from the following literature reference: Hashin Z. and Shtrikman, S., J. Mech. Phys. Solids, 11, 127 (1963).

Background Considerations

P-wave velocity and shear wave velocities to be estimated based on rock composition, can themselves be considered derivable quantities from more fundamental physical significance, the bulk modulus K, the shear wave modulus, G, and the bulk density P. Bulk modulus K is, by definition, the ratio of the compressive stress to the fractional volumetric strain in the rock. Shear wave modulus, G is, by definition, the ratio of the shear stress to the fractional stress strain in the rock. Values of bulk and shear wave moduli for pure minerals are available in the literature, and illustrative field values are set forth hereinbelow in Table II.

TABLE II

Mineralogical Data

| Mineral | Density g/cm³ | Bulk Modulus (Kilobars) | Shear Modulus (Kilobars) |
| --- | --- | --- | --- |
| Quartz | 2.65 | 380 | 444 |
| Feldspar | 2.62 | 651 | 300 |
| Calcite | 2.71 | 701 | 320 |
| Mica | 2.86 | 518 | 278 |
| Magnetite | 5.18 | 1613 | 914 |
| Hematite | 5.24 | 9.78 | 931 |
| Dolomite | 2.87 | 820 | 384 |
| Alumina | 3.98 | 1840 | 1605 |
| Perlite | 2.35 | 378 | 293 |
| A-Brime | 1.17 | 25 | 293 |
| "Clay" | 2.68 | 500* | 150* |

*A best guess

It seems intuitively reasonable that either of the elastic moduli mentioned above, i.e., K or G could be approximated for any composition as an average of the individual elastic moduli of mineral components, with the average being weighted according to the individual volume fractions of the individual components.

Let $K^*$ = the desired bulk modulus of the composite rock;

$G^*$ = the desired shear modulus of the composite rock;

$K_i$ = the bulk modulus of mineral component i;

$G_i$ = the shear modulus of mineral component i;

$X_i$ = the volume fraction of mineral component i;

N = the number of mineral components in the rock.

Reasonable upper-limit approximations for the two desired moduli are given by the following equations:

$$K^* \simeq \sum_{i=1}^{N} x_i K_i \text{ and } G^* \simeq \sum_{i=1}^{N} x_i G_i$$

The right-hand sides of the above equations are appropriately called "arithmetic volume averages" of the individual mineral moduli.

Reasonable lower-limit approximations for the two desired moduli are given by "harmonic volume average" of the individual mineral moduli, as represented in the following equations:

$$\frac{1}{K^*} \simeq \sum_{i=1}^{xi} \frac{}{Ki} \text{ and } \frac{1}{G^*} \simeq \sum_{i=1}^{n} \frac{Xi}{Gi}$$

In the historical development of rock physics, arithmetic averages were first used by Voigt; harmonic averages were used by Reuss, and finally Hill (J. Mech. Phys. Solids, 11, 357 [1963]) suggested that better than either of those averages was the arithmetic average of the two: half of the sum of the arithmetic and harmonic averages. That average-average is the one used in accordance with this aspect of the present invention under the name "Voigt-Reuss-Hill" average or simply "VRH" average.

In the procedure described herein, the VRH average $K^*$ and the VRH average $G^*$ are used directly in the following equations to obtain finally desired quantities, viz., the P-wave velocity, $V_p$, and the shear wave velocity, $V_s$, using the following formulas:

$$V_p^2 \simeq \frac{K^*_{VRHaver} + (4/3) G^*_{VRHaver}}{\rho^*}$$

$$V_s^2 \simeq \frac{G^*_{VRHaver}}{\rho^*}$$

In these equations, the notation "rho*" (the density of the composite rock) is the arithmetic volume average of the densities of the mineral components; other terms are as set forth above.

With references to FIG. 17, after all combinations of minerals which satisfy initial selection criteria are generated, their P-wave and S-wave velocities are estimated based on the VRH averages of the bulk and shear moduli: The successful candidates are placed in a file called "COMBOS", the latter to be then used in a subroutine MNLPOST to be described below along with data related to geological counts per step percentage of each mineral. The example data annotated in units of counts percentage, are placed in another file labeled "EXAMPLE DATA" along with indications of total geological and total geophysical count units and the number of steps in the last mineral. Also, a composite report as seen in FIG. 17 can be generated in which the following are specified: the input data, total geophysical and geologic counts and spatial annotations for each valid composition in which RMS distance values associated with each composition are specified relative to the observed $V_p$-$V_s$ centroid. The files called "COMBOS" and "EXAMPLE DATA" are used in the subroutine MNLPOST wherein various statistical methods can be used to further constrain the result.

FIG. 19 illustrates MNLPOST in detail.

Generally, the subroutine MNLPOST provides a report or series of reports listing all combinations of minerals which fall within the error limits of the $V_p$-$V_s$ field data; $V_p$ vs. $V_s$ plots of valid combination; and reports indicating the combination closest to the $V_p/V_s$ centroid.

Now in more detail, it is assumed that the user has already answered initial questions concerning the type of analysis to be undetaken, and that the subroutine has read in EXAMPLE DATA and COMBOS files with user adjustments as desired. What is of some importance is the scaling of the resulting geological and geophysical counts based on (i) combinational statistics and (ii) distributional statistics, as explained below as well as hereinbefore.

As to (i) above, the requirement for scaling due to distributional statistics is seen by the example presented by the 4-component mineral composition recited above in which as previously discussed, there is a need for an appropriate scaling factor because of the obvious statistical bias of the data minerals whose content is zero percentage of the total.

As to (ii), distribution of the mineral content can be specified and then scaled, using triangular, square or other special type distributions as previously mentioned. Default distribution is a square one, i.e., to say, the percentage of mineral content is distributed equally over a range 0–100%.

The formula for the scaling factor based on the above is:

$$\text{Scaling factor } f = \frac{\text{\# of counts required for (i) (ii)}}{\text{\# of total counts at each \% of the mineral composition}}$$

Additional factors for analysis of some importance relates to the relative distances separating the observed $V_p/V_s$ centerpoint from that of the calculated $V_p/V_s$ information. Since RMS values (as to average distance separating the values of interest) had been previously provided, a bivarient approach is made available via the MNLPOST subroutine of FIG. 19. Furthermore, the range of error of the observed $V_p/V_s$ values, as well as changes in incremental error limits of the field $V_p/V_s$ centroid vis-a-vis its boundries, can be altered by the user on an interactive basis. Result: the series of successful candidates can be ranked in a range of most probable compositions to the least likely candidates as representing the lithology of the formation under survey.

Generally, the rating or weighing of any combination is based on how close the candidate $V_p/V_s$ centroid is to the observed $V_p/V_s$ centroid. Variation in result is possible, however, based on type of statistical formula chosen for analysis as well as the user function values used in these formulas as described above.

Now in more detail, the formulas for rating candidates based on bivarient statistics include the following:

$$X = \frac{V_{pcalcul} - V_{pobserv}}{\sigma V_p} \text{ and } Y = \frac{V_{scalcu} - V_{sobserv}}{\sigma V_s} \quad (1)$$

$$(P) = \frac{1}{2}\pi e^{-\frac{1}{2}(X^2 + Y^2)} \quad (2)$$

where aVp and aVp are standard deviations in which field error function $(\pm E_p) = (2\text{ aVp})$ or $(\pm E_s) = (2\text{ aVs})$ are used. (3) Probability value $$X = \frac{V_{pcalcul} - V_{pobserv}}{\sigma V_p} \text{ and } Y = \frac{V_{scalcu} - V_{sobserv}}{\sigma V_s} \quad (1)$$

$$(P) = \frac{1}{2}\pi e^{-\frac{1}{2}(X^2 + Y^2)} \quad (2)$$

The magnitude of P is not important but relative magnitudes are.

EXAMPLE I

Assume $$V_{pcalc} = V_{pobserv} \text{ and } V_{scalc} = V_{sobserv} \therefore P_I = \frac{1}{2P}$$

EXAMPLE II

Assume $$V_{pcal} - V_{pobserv} = \sigma vp \text{ and } V_{scalcul} - V_{sobserv} = \sigma vs$$

$$\therefore P_{II} = \frac{1}{2\pi} e^{-1} \text{ and } P_{II} = \frac{0.37}{2\pi}$$

$$\text{THUS } \frac{P_I}{P_{II}} = 2.72$$

In other words, the mineral combination set forth in Example I is 2.72 times more likely to occur as the mineral combination of Example II. So based on the above formulas (1)–(3), supra, there is added a qualitative basis for ranking each combination by the method of the present invention.

A program listing for carrying out the present invention on a general-purpose digital computer, including all the program statements, is set forth below.

It should be understood that the invention is not limited to any specific embodiments set forth herein, as variations are readily apparent, and thus the invention is to be given the broadest possible interpretation within the terms of the following claims.

```
MINERAL/CODE

100    ;
     200    ;
     300    ;
     400    ;
     500    ;
     600    ;
     700    ;
     800
     900    ; C      PROGRAM MINERAL                                    00000010
    1000    ; C                                                         00000020
    1100    ; C                                                         00000030
    1200    ; C                                                         00000040
    1300    ; C      GENERATE VALID COMBINATIONS OF VARIABLES           00000050
    1400    ; C      NAME(M) = NAME OF MINERAL AB                       00000060
```

```
1500    ; C         NUMBER(M) = MINERAL NUMBER                              00000070
1600    ; C         X(M) = VARIABLE M                                       00000080
1700    ; CC        XA(M) = MINIMUM OF VARIABLE X(M)                        00000090
1800    ; C         XB(M) = MAXIMUM OF VARIABLE X(M)                        00000100
1900    ; C         SX(M) = SUM OF VALUES OF X(1) TO X(M)                   00000110
2000    ; C         N = NUMBER OF VARIABLES PLUS 1                          00000120
2100    ; C         NZERO = NUMBER OF VARIABLES                             00000130
2200    ; C         M = CURRENT VARIABLE UNDER CONSIDERATION PLUS 1         00000140
2300    ; C         TOT = SCALING FACTOR (100)                              00000150
2400    ; C         XINC(M) = INCREMENT OF SCALING OF VARIABLE X(M)         00000160
2500    ; C         CNT = COUNT OF VALID COMBINATIONS                       00000170
2600    ; C         I = DUMMY INDEX                                         00000180
2700    ; C         RSF = RESIDUAL FRACTION NOT YET ALLOCATED               00000190
2800    ; C         MACNT = COUNT OF M=M+1 EXECUTIONS                       00000200
2900    ; C         MSCNT = COUNT OF M=M-1 (OR -2) EXECUTIONS               00000210
3000    ; C         VPMAX = MAXIMUM FOR VP                                  00000220
3100    ; C         VPMIN = MINIMUM FOR VP                                  00000230
3200    ; C         VSMAX = MAXIMUM FOR VS                                  00000240
3300    ; C         VSMIN = MINIMUM FOR VS                                  00000250
3400    ; C         AK = CONSTANT AK                                        00000260
3500    ; C         AG = CONSTANT AG                                        00000270
3600    ; C         K(M) = K OF VARIABLE X(M)                               00000280
3700    ; C         G(M) = G OF VARIABLE X(M)                               00000290
3800    ; C         P(M) = RHO OF VARIABLE X(M)                             00000300
3900    ; C         L(J) = LOWER BOUND ON CONSTRAINT J                      00000310
4000    ; C         U(J) = UPPER BOUND ON CONSTRAINT J                      00000320
4100    ; C         C(M,J) = COEFFICIENTS OF CONSTRAINT J                   00000330
4200    ; C         J = NUMBER OF LINEAR CONSTRAINTS                        00000340
4300    ; C         SUMC(M,J) = SUM OF C(M,J)*X(M)                          00000350
4400    ; C         RSC(J) = AMOUNT ALLOCATED TO CONSTRAINT J               00000360
4500    ; C         IVPVS = VP AND VS CONSTRAINT SWITCH                     00000370
4600    ; C               = 0 NO VP/VS CALCULATION                          00000380
4700    ; C               = 1 VOIGHT REUSS HILL AVERAGE                     00000390
4800    ; C               = 2 HASHIN SHTRIKMAN BOUNDS                       00000400
4900    ; C               = 3,4 UPPER,LOWER VOIGHT REUSS HILL               00000410
5000    ; C               = 5,6 UPPER,LOWER HASHIN SHTRIKMAN                00000420
5100    ;           PROGRAM MINRLS                                          00000429
5200    .PGMLOC     EQU   *
5300    MINRLS      EQU   *
5400    ;           INTEGER X(21),XA(21),XB(21),SX(21),TOT,RSF,XINC(21),HOLD,Z   00000430
5500    ;           INTEGER IRANGE(882),IOU(21),IRANG2(102)                 00000440
                                                                            00000450
5800    ;           INTEGER N,M,NZERO,CNT,I,MACNT,MSCNT,NUMBER(21),NUM(21)  00000470
5900    ;           INTEGER DSAVE(21)                                       00000480
6000    ;           REAL FLL,HMS,DATE                                       00000490
6100    ;           REAL YES                                                00000491
6200    ;           REAL*4 VPMAX,VPMIN,VSMAX,VSMIN,AK,AG,K(21),G(21),P(21)  00000500
6300    ;           REAL L(2),U(2),C1(21),C2(21),SUMC1(21),SUMC(42),RSC(2),VSOB,VPU00000510
6400    ;           REAL*4 PVP(20),PVS(20)                                  00000520
6500    ; C         COMMON /SPECS/ VMULT(20,2,6),NUMS(20,2,5),NUMSPC(20,2),TYPE(20)00000530
6600    ; C         1IMULT(20)                                              00000540
6700    ;           COMMON /SPECS/ VMULT(240),NUMS(240),NUMSPC(40),TYPE(20),IMULT(200000541
6800    ; C         DATA YES/'YES   '/                                      00000550
6900    ; C         DATA TYPMAS/'LE','GE','EQ','OR','AN','LN','GN','EN'/    00000560
7000    ; C         INITIALIZE                                              00000570
7100    ;           DO 10 I=1,21                                            00000580
7200                LDA   #0
7300                STA   I!!!!!01
7400                LDA   #1
7500                STA   I!!!!!01+1
7600                JMP   .L000006
7700    .L000003    EQU   *
7800                LDA   I!!!!!01+1
7900                CLC
8000                ADC   #1
8100                STA   I!!!!!01+1
8200                LDA   I!!!!!01
8300                ADC   #0
8400                STA   I!!!!!01
8500                LDA   #21
8600                CMP   I!!!!!01+1
8700                LDA   #0
8800                SBC   I!!!!!01
8900                BMI   .L000004
9000    .L000006    EQU   *
9100    ;           IHIST(I) = 0                                            00000590
9200                LDA   I!!!!!01+1
9300                ASL   A
9400                STA   .T000007
9500                LDA   #0
9600                LDX   .T000007
```

```
 9700              STA     IHIST!01-2,X
 9800              LDA     #0
 9900              STA     IHIST!01-1,X
10000       ;      DO 1010 I1 = 1,21                                      00000600
10100              LDA     #0
10200              STA     I1!!!!01
10300              LDA     #1
10400              STA     I1!!!!01+1
10500              JMP     .L000013
10600    .L000011 EQU     *
10700              LDA     I1!!!!01+1
10800              CLC
10900              ADC     #1
11000              STA     I1!!!!01+1
11100              LDA     I1!!!!01
11200              ADC     #0
11300              STA     I1!!!!01
11400              LDA     #21
11500              CMP     I1!!!!01+1
11600              LDA     #0
11800              BMI     .L000012
11900    .L000013 EQU     *
12000       ;  1010 HIST21(I1) = 0                                        00000610
12100    .L000015 EQU     *
12200              LDA     I1!!!!01+1
12300              ASL     A
12400              STA     .T000007
12500              LDA     #0
12600              LDX     .T000007
12700              STA     HIST2!01-2,X
12800              LDA     #0
12900              STA     HIST2!01-1,X
13000              JMP     .L000011
13100    .L000012 EQU     *
13200       ;      XA(I)=0                                                00000620
13300              LDA     I1!!!!01+1
13400              ASL     A
13500              STA     .T000007
13600              LDA     #0
13700              LDX     .T000007
13800              STA     XA!!!01-2,X
13900              LDA     #0
14000              STA     XA!!!01-1,X
14100       ;   10 XB(I)=0
14200    .L000009 EQU     *                                               00000630
14300       ; C   ************************READ DATA***********            00000640
14400       ; C   INPUT SECTION OF MINERALS PROGRAM                       00000650
14500              LDA     I1!!!!01+1
14600              ASL     A
14700              STA     .T000007
14800              LDA     #0
14900              LDX     .T000007
15000              STA     XB!!!01-2,X
15100              LDA     #0
15200              STA     XB!!!01-1,X
15300              JMP     .L000003
15400    .L000004 EQU     *
15500       ;      IDD = 7                                                00000660
15600              LDA     #0
15700              STA     IDD!!01
15800              LDA     #7
15900              STA     IDD!!01+1
16000       ;      IERFL = 1                                              00000670
16100              LDA     #0
16200              STA     IERFL!01
16300              LDA     #1
16400              STA     IERFL!01+1
16500       ;      USAV = 9.E23                                           00000680
16600    .MFLTASG SET     1
16700              JSR     .FLTASGN
16800              .BYTE   0
16900              .WORD   .C000017
17000              .WORD   USAV!01
17100       ;      VPERR = 0.0                                            00000690
17200    .MFLTASG SET     1
17300              JSR     .FLTASGN
17400              .BYTE   0
17500              .WORD   .C000020
17600              .WORD   VPERR!01
                                                                          00000700
```

```
17800      .MFLTASG  SET     1
17900                JSR     .FLTASGN
18000                .BYTE   0
18100                .WORD   .C000021
18200                .WORD   VSERR!!01
18300      ;         J = 0                                                      00000710
18400                LDA     #0
18500                STA     J!!!!01
18600                LDA     #0
18700                STA     J!!!!01+1
18800      ;         TOT = 100                                                  00000720
18900                LDA     #0
19000                STA     TOT!!!01
19100                LDA     #100
19200                STA     TOT!!!01+1
19300      ;         NUMSP = 0                                                  00000730
19400                LDA     #0
19500                STA     NUMSP!01
19600                LDA     #0
19700                STA     NUMSP!01+1
19800      ;         IVPVS = 1                                                  00000740
19900                LDA     #0
20000                STA     IVPVS!01
20100                LDA     #1
20200                STA     IVPVS!01+1
20300      ;         CALL GETPAR (FLL,1)                                        00000750
20400                LDA     #.C000002 MOD .M
20500                STA     GETPAR.2
20600                LDA     #.C000002/256
20700                STA     GETPAR.2+1
20800                LDA     #FLL!!!01 MOD .M
20900                STA     GETPAR.1
21000                LDA     #FLL!!!01/256
21100                STA     GETPAR.1+1
21200                JSR     GETPAR
21300      ;         IF (FLL .EQ. YES) GO TO 99                                 00000760
21400      .MFFEQ    SET     1
21500                JSR     .FFEQ
21600                .BYTE   0
21700                .WORD   FLL!!!01,YES!!!01
21800                ASL     A
21900                BCS     *+5
22000                JMP     .L000023
22100                JMP     .L000024
22200      .L000023  EQU     *
22300      ;         IDD = 8                                                    00000770
22400      ; C THIS SECTION ESTABLISHES FLAGS FOR THE PROGRAM                   00000780
22500      ; C       WRITE(9,145)                                               00000790
22600      ; C 145   FORMAT(' DO YOU WANT A PLOT (ENTER 1 FOR YES, 0 FOR NO)')  00000800
22700      ; C       READ(8,146) IPLOT                                          00000810
22800      ; C 146   FORMAT(I1)                                                 00000820
22900      ; C 1030  WRITE(9,147)                                               00000830
23000                LDA     #0
23100                STA     IDD!!!01
23200                LDA     #8
23300                STA     IDD!!!01+1
23400      ;    1030 CONTINUE                                                   00000831
23500      .L000026  EQU     *
23600      ; C 147   FORMAT(' ENTER NUMBER OF SPECIAL CONSTRAINTS')             00000840
23700      ; C       READ(8,146) ICONS                                          00000850
23800      ; C       IF (ICONS .LT. 21) GO TO 1029                              00000860
23900      ; C       WRITE(9,1028)                                              00000870
24000      ; C1028   FORMAT(' TOO MANY SPECIAL CONSTRAINTS')                    00000880
24100      ;         GO TO 1030                                                 00000890
24200                JMP     .L000026
24300      ; C1029   WRITE(9,1022)                                              00000900
24400      ; C 1022  FORMAT(' VOIGHT-REUSS-HILL(ENTER 1) OR HASHIN-SHTRIKMAN',  00000910
24500      ; C       1'(ENTER 2) BOUNDS'/'FOR CALCULATION OF VELOCITIES')      00000920
24600      ; C       READ(8,146) IVPVS                                          00000930
24700      ;         GO TO 97                                                   00000940
24800                JMP     .L000027
24900      ; C 99    READ(IDD,98) IPLOT,ICONS,IVPVS,TOT,J                       00000950
25000      ;    99   CONTINUE                                                   00000951
25100      .L000024  EQU     *
25200      ; C 98    FORMAT(20I4)                                               00000960
25300      ;         GO TO 91                                                   00000970
25400                JMP     .L000028
25500      ; C 97    WRITE(9,93)                                                00000980
25600      ;    97   CONTINUE                                                   00000981
25700      .L000027  EQU     *
25800      ; C 93    FORMAT (' TITLE FOR THIS CASE')                            00000990
```

```
25900       ; C 91    READ(IDD,101) (TITLE)                                   00001000
26000       ;   91    CONTINUE                                                00001001
26100       .L000028 EQU   *
26200       ; C 101   FORMAT(40A2)                                            00001010
26300       ;         NUMSP = ICONS                                           00001020
26400                 LDA    ICONS!01
26500                 STA    NUMSP!01
26600                 LDA    ICONS!01+1
26700                 STA    NUMSP!01+1
26800       ;         IF (FLL .EQ. YES) GO TO 112                             00001030
26900       .MFFEQ    SET    1
27000                 JSR    .FFEQ
27100                 .BYTE  0
27200                 .WORD  FLL!!!01,YES!!!01
27300                 ASL    A
27400                 BCS    *+5
27500                 JMP    .L000029
27600                 JMP    .L000030
27700       .L000029 EQU   *
27800       ; C       WRITE(9,102)
27900       ; C 102   FORMAT(' GIVE P-WAVE VELOCITY(FT/SEC) AND ERROR EST. ') 00001040
28000       ; C 102   READ(IDD,103) VELP, VELPD                               00001050
28100       ;    112 CONTINUE                                                 00001060
28200       .L000030 EQU   *                                                  00001061
28300       ;         VPMAX = (VELP + VELPD) * 30.48                          00001070
28400       .MFFADD   SET    1
28500                 JSR    .FFADD
28600                 .BYTE  0
28700                 .WORD  VELP!!01,VELPD!01
28800                 .WORD  .T000031
28900       .MFFMUL   SET    1
29000                 JSR    .FFMUL
29100                 .BYTE  0
29200                 .WORD  .T000031,.C000032
29300                 .WORD  VPMAX!01
29400       ;         VPMIN = (VELP - VELPD) * 30.48                          00001080
29500       .MFFSUB   SET    1
29600                 JSR    .FFSUB
29700                 .BYTE  0
29800                 .WORD  VELP!!01,VELPD!01
29900                 .WORD  .T000031
30000       .MFFMUL   SET    1
30100                 JSR    .FFMUL
30200                 .BYTE  0
30300                 .WORD  .T000031,.C000035
30400                 .WORD  VPMIN!01
30500       ;         VPUB = VELP * 30.48                                     00001090
30600       .MFFMUL   SET    1
30700                 JSR    .FFMUL
30800                 .BYTE  0
30900                 .WORD  VELP!!01,.C000036
31000                 .WORD  VPUB!01
31100       ;         IF (FLL .EQ. YES) GO TO 114                             00001100
31200       .MFFEQ    SET    1
31300                 JSR    .FFEQ
31400                 .BYTE  0
31500                 .WORD  FLL!!!01,YES!!!01
31600                 ASL    A
31700                 BCS    *+5
31800                 JMP    .L000037
31900                 JMP    .L000038
32000       .L000037 EQU   *
32100       ; C       WRITE(9,104)                                            00001110
32200       ; C 104   FORMAT(' GIVE S-WAVE VELOCITY(FT/SEC) AND ERROR EST. ') 00001120
32300       ; C 114   READ(IDD,103) VELS, VELSD                               00001130
32400       ;    114 CONTINUE                                                 00001131
32500       .L000038 EQU   *
32600       ;         VSMAX = (VELS + VELSD) * 30.48                          00001140
32700       .MFFADD   SET    1
32800                 JSR    .FFADD
32900                 .BYTE  0
33000                 .WORD  VELS!!01,VELSD!01
33100                 .WORD  .T000031
33200       .MFFMUL   SET    1
33300                 JSR    .FFMUL
33400                 .BYTE  0
33500                 .WORD  .T000031,.C000039
33600                 .WORD  VSMAX!01
33700       ;         VSMIN = (VELS - VELSD) * 30.48                          00001150
33800       .MFFSUB   SET    1
33900                 JSR    .FFSUB
```

```
34000                .BYTE   0
34100                .WORD   VELS!!01,VELSD!01
34200                .WORD   .T000031
34300    .MFFMUL     SET     1
34400                JSR     .FFMUL
34500                .BYTE   0
34600                .WORD   .T000031,.C000040
34700                .WORD   VSMIN!01
34800    ;           VSUB = VELS * 30.48                                        00001160
34900    ; C 103     FORMAT(2F99.0)                                             00001170
35000    .MFFMUL     SET     1
35100                JSR     .FFMUL
35200                .BYTE   0
35300                .WORD   VELS!!01,.C000041
35400                .WORD   VSUB!01
35500    ;           IF (FLL .EQ. YES) GO TO 116                                00001180
35600    .MFFEQ      SET     1
35700                JSR     .FFEQ
35800                .BYTE   0
35900                .WORD   FLL!!01,YES!!01
36000                ASL     A
36100                BCS     *+5
36200                JMP     .L000042
36300                JMP     .L000043
36400    .L000042 EQU  *
36500    ; C         WRITE(9,106)                                               00001190
36600    ; C 106     FORMAT(' GIVE DENSITY (G/CC) AND ERROR EST.'/              00001200
36700    ; C        1' IF DENSITY IS UNKNOWN ENTER 0.0 0.0')                    00001210
36800    ; C 116     READ(IDD,105) DEN, DEND                                    00001220
36900    ;       116 CONTINUE                                                   00001221
37000    .L000043 EQU  *
37100    ; C 105     FORMAT(2F99.3)                                             00001230
37200    ;           IDEN = 0                                                   00001240
37300                LDA     #0
37400                STA     IDEN!!01
37500                LDA     #0
37600                STA     IDEN!!01+1
37700    ;           DENMAX = DEN + DEND                                        00001250
37800    .MFFADD     SET     1
37900                JSR     .FFADD
38000                .BYTE   0
38100                .WORD   DEN!!01,DEND!!01
38200                .WORD   DENMAX01
38300    ;           DENMIN = DEN - DEND                                        00001260
38400    .MFFSUB     SET     1
38500                JSR     .FFSUB
38600                .BYTE   0
38700                .WORD   DEN!!01,DEND!!01
38800                .WORD   DENMIN01
38900    ;           IF(DEN .GT. 0.1) IDEN = 1                                  00001270
39000    .MFFGT      SET     1
39100                JSR     .FFGT
39200                .BYTE   0
39300                .WORD   DEN!!01,.C000044
39400                ASL     A
39500                BCS     *+5
39600                JMP     .L000045
39700                LDA     #0
39800                STA     IDEN!!01
39900                LDA     #1
40000                STA     IDEN!!01+1
40100    .L000045 EQU  *
40200    ;           IF (FLL .EQ. YES) GO TO 107                                00001280
40300    .MFFEQ      SET     1
40400                JSR     .FFEQ
40500                .BYTE   0
40600                .WORD   FLL!!01,YES!!01
40700                ASL     A
40800                BCS     *+5
40900                JMP     .L000046
41000                JMP     .L000047
41100    .L000046 EQU  *
41200    ; C         WRITE(9,108)                                               00001290
41300    ; C 108     FORMAT(' GIVE AK AND AG, THE CORRECTIONS FOR SURFACE EFFECTS', 00001300
41400    ; C        1' FOR BULK AND SHEAR MODULI.'/                             00001310
41500    ; C        2'    SURFACE VALUES: FOR SEDIMENTARIES AK=.950, AG=.803'/  00001320
41600    ; C        3'                    FOR BASEMENT ROCKS AK=.954, AG=.88')  00001330
41700    ; C 107     READ(IDD,105) AK,AG                                        00001340
```

```
41800   ;   107 CONTINUE                                                        00001341
41900   .L000047 EQU    *
42000   ;       IF (FLL .EQ. YES) GO TO 113                                     00001350
42100   .MFFEQ  SET     1
42200           JSR     .FFEQ
42300           .BYTE   0
42400           .WORD   FLL!!!01,YES!!!01
42500           ASL     A
42600           BCS     *+5
42700           JMP     .L000048
42800           JMP     .L000049
42900   .L000048 EQU    *
43000   ; C             WRITE(9,111)                                            00001360
43100   ; C 111 FORMAT(' GIVE NUMBER OF POSSIBLE MINERALS ')                    00001370
43200   ; C 113 READ(IDD,115) NZERO                                             00001380
43300   ;       113 CONTINUE                                                    00001381
43400   .L000049 EQU    *
43500   ;       N = NZERO + 1                                                   00001390
43600   ; C 115 FORMAT(I99)                                                     00001400
43700           LDA     NZERO!01+1
43800           CLC
43900           ADC     #1
44000           STA     N!!!!01+1
44100           LDA     NZERO!01
44200           ADC     #0
44300           STA     N!!!!01
44400   ;       IF (FLL .EQ. YES) GO TO 118                                     00001410
44500   .MFFEQ  SET     1
44600           JSR     .FFEQ
44700           .BYTE   0
44800           .WORD   FLL!!!01,YES!!!01
44900           ASL     A
45000           BCS     *+5
45100           JMP     .L000050
45200           JMP     .L000051
45300   .L000050 EQU    *
45400   ; C             WRITE(9,117)                                            00001420
45500   ; C 117 FORMAT(' LIST NUMBERS FOR EACH MINERAL WITH SMALLEST'/          00001430
45600   ; C             1' INCREMENTED MINERALS FIRST ')                        00001440
45700   ; C 118 READ(IDD,119) (NUM(I),I=2,N)                                    00001450
45800   ;       118 CONTINUE                                                    00001451
45900   .L000051 EQU    *
46000   ; C 119 FORMAT(2I99)                                                    00001460
46100   ;       YMAX=VELP + 3.0*VELPD                                           00001470
46200   .MFFMUL SET     1
46300           JSR     .FFMUL
46400           .BYTE   0
46500           .WORD   .C000052,VELPD!01
46600           .WORD   .T000031
46700   .MFFADD SET     1
46800           JSR     .FFADD
46900           .BYTE   0
47000           .WORD   VELP!!01,.T000031
47100           .WORD   YMAX!!01
47200   ;       YMIN=VELP - 3.0*VELPD                                           00001480
47300   .MFFMUL SET     1
47400           JSR     .FFMUL
47500           .BYTE   0
47600           .WORD   .C000053,VELPD!01
47700           .WORD   .T000031
47800   .MFFSUB SET     1
47900           JSR     .FFSUB
48000           .BYTE   0
48100           .WORD   VELP!!01,.T000031
48200           .WORD   YMIN!!01
48300   ;       XMAX=VELS + 3.0*VELSD                                           00001490
48400   .MFFMUL SET     1
48500           JSR     .FFMUL
48600           .BYTE   0
48700           .WORD   .C000054,VELSD!01
48800           .WORD   .T000031
48900   .MFFADD SET     1
49000           JSR     .FFADD
49100           .BYTE   0
49200           .WORD   VELS!!01,.T000031
49300           .WORD   XMAX!!01
49400   ;       XMIN=VELS - 3.0*VELSD                                           00001500
49500   .MFFMUL SET     1
49600           JSR     .FFMUL
49700           .BYTE   0
49800           .WORD   .C000055,VELSD!01
```

```
49900                  .WORD  .T000031
50000   .MFFSUB   SET    1
50100             JSR    .FFSUB
50200             .BYTE  0
50300             .WORD  VELS!!01,.T000031
50400             .WORD  XMIN!!01
50500   ;       DO 123 IJ = 2,N                                                      00001510
50600             LDA    #0
50700             STA    IJ!!!01
50800             LDA    #2
50900             STA    IJ!!!!01+1
51000   ; C     REWIND 10
51100   ; C 121 READ(10,92,END=129) MNM,(MNAM(II),II=1,8),VKI,VGI,DENS                00001520
51200             JMP    .L000059                                                     00001530
51300   .L000057 EQU    *
51400             LDA    IJ!!!!01+1
51500             CLC
51600             ADC    #1
51700             STA    IJ!!!!01+1
51800             LDA    IJ!!!!01
51900             ADC    #0
52000             STA    IJ!!!!01
52100             LDA    N!!!!!01+1
52200             CMP    IJ!!!!01+1
52300             LDA    N!!!!!01
52400             SBC    IJ!!!!01
52500             BMI    .L000058
52600   .L000059 EQU    *
52700   ;    121 CONTINUE                                                             00001531
52800   .L000062 EQU    *
52900   ; C  92  FORMAT(I3,2X,8A2,3X,2F6.0,F6.3)                                      00001540
53000   ;       IF (MNM .EQ. NUM(IJ)) GO TO 122                                       00001550
53100             LDA    IJ!!!!01+1
53200             ASL    A
53300             STA    .T000018
53400             LDA    MNM!!01+1
53500             LDX    .T000018
53600             CMP    NUM!!01-1,X
53700             BNE    .L000065
53800             LDA    MNM!!01
53900             CMP    NUM!!01-2,X
54000             BNE    .L000063
54100             JMP    .L000065
54200   .L000063 EQU    *
54300   ;       GO TO 121
54400             JMP    .L000062                                                     00001560
54500   ;   122  DO 1221 II=1,8                                                       00001570
54600   .L000065 EQU    *
54700             LDA    #0
54800             STA    II!!!!01
54900             LDA    #1
55000             STA    II!!!!01+1
55100             JMP    .L000068
55200   .L000066 EQU    *
55300             LDA    II!!!!01+1
55400             CLC
55500             ADC    #1
55600             STA    II!!!!01+1
55700             LDA    II!!!!01
55800             ADC    #0
55900             STA    II!!!!01
56000             LDA    #8
56100             CMP    II!!!!01+1
56200             LDA    #0
56300             SBC    II!!!!01
56400             BMI    .L000067
56500   .L000068 EQU    *
56600   ;   1221 NAME8(IJ) = MNAM(II)                                                 00001580
56700   .L000070 EQU    *
56800             LDA    IJ!!!!01+1
56900             ASL    A
57000             STA    .T000007
57100             LDA    II!!!!01+1
57200             ASL    A
57300             TAX
57400             LDA    MNAM!!01-2,X
57500             LDY    .T000007
57600             STA    NAME8!01-2,Y
57700             LDA    MNAM!!01-1,X
57800             STA    NAME8!01-1,Y
57900             JMP    .L000066
```

```
58000        .L000067 EQU    *
58100        ;            K(IJ) = VKI                                           00001590
58200                     LDA    IJ!!!!01+1
58300                     ASL    A
58400                     ASL    A
58500                     CLC
58600                     ADC    #(K!!!!!01-4) MOD .M
58700                     STA    .T000019
58800                     LDA    #0
58900                     ADC    #(K!!!!!01-4)/256
59000                     STA    .T000019+1
59100        .MFLTASG SET    1
59200                     JSR    .FLTASGN
59300                     .BYTE  0
59400                     .WORD  VKI!!!01
59500                     .WORD  -.T000019
59600        ;            G(IJ) = VGI                                           00001600
59700                     LDA    IJ!!!!01+1
59800                     ASL    A
59900                     ASL    A
60000                     CLC
60100                     ADC    #(G!!!!!01-4) MOD .M
60200                     STA    .T000019
60300                     LDA    #0
60400                     ADC    #(G!!!!!01-4)/256
60500                     STA    .T000019+1
60600        .MFLTASG SET    1
60700                     JSR    .FLTASGN
60800                     .BYTE  0
60900                     .WORD  VGI!!!01
61000                     .WORD  -.T000019
61100        ;            P(IJ) = DENS                                          00001610
61200                     LDA    IJ!!!!01+1
61300                     ASL    A
61400                     ASL    A
61500                     CLC
61600                     ADC    #(P!!!!!01-4) MOD .M
61700                     STA    .T000019
61800                     LDA    #0
61900                     ADC    #(P!!!!!01-4)/256
62000                     STA    .T000019+1
62100        .MFLTASG SET    1
62200                     JSR    .FLTASGN
62300                     .BYTE  0
62400                     .WORD  DENS!!01
62500                     .WORD  -.T000019
62600        ;            TEMP=AG*G(IJ) * 10.0 ** 9.0/DENS                      00001620
62700        .MFFMUL  SET    1
62800                     JSR    .FFMUL
62900                     .BYTE  0
63000                     .WORD  .C000071,.C000072
63100                     .WORD  .T000034
63200                     LDA    IJ!!!!01+1
63300                     ASL    A
63400                     ASL    A
63500                     CLC
63600                     ADC    #(G!!!!!01-4) MOD .M
63700                     STA    .T000073
63800                     LDA    #0
63900                     ADC    #(G!!!!!01-4)/256
64000                     STA    .T000073+1
64100        .MFFMUL  SET    1
64200                     JSR    .FFMUL
64300                     .BYTE  0
64400                     .WORD  AG!!!01,-.T000073
64500                     .WORD  .T000031
64600        .MFFDIV  SET    1
64700                     JSR    .FFDIV
64800                     .BYTE  0
64900                     .WORD  .T000034,DENS!!01
65000                     .WORD  .T000031
65100        ;            PVS(IJ-1)=SQRT(TEMP)/30.48                             00001630
65200                     LDA    IJ!!!!01+1
65300                     SEC
65400                     SBC    #1
65500                     STA    .T000018
65600                     LDA    #TEMP!!01 MOD .M
65700                     STA    SQRT.001
65800                     LDA    #TEMP!!01/256
65900                     STA    SQRT.001+1
66000                     LDA    #.T000034 MOD .M
```

```
66100            STA     SQRT.000
66200            LDA     #.T000034/256
66300            STA     SQRT.000+1
66400            JSR     SQRT
66500            LDA     .T000018
66600            ASL     A
66700            ASL     A
66800            CLC
66900            ADC     #(PVS!!!01-4) MOD .M
67000            STA     .T000073
67100            LDA     #0
67200            ADC     #(PVS!!!01-4)/256
67300            STA     .T000073+1
67400  .MFFDIV   SET     1
67500            JSR     .FFDIV
67600            .BYTE   0
67700            .WORD   .T000034,.C000076
67800            .WORD   -.T000073
67900  ;         TEMP=AK*K(IJ) * 10.0 ** 9.0/DENS+1.3333*TEMP         00001640
68000  .MFFMUL   SET     1
68100            JSR     .FFMUL
68200            .BYTE   0
68300            .WORD   .C000077,.C000078
68400            .WORD   .T000073
68500  .MFFMUL   SET     1
68600            JSR     .FFMUL
68700            .BYTE   0
68800            .WORD   .C000080,TEMP!!01
68900            .WORD   .T000081
69000  .MFFDIV   SET     1
69100            JSR     .FFDIV
69200            .BYTE   0
69300            .WORD   .T000073,DENS!!01
69400            .WORD   .T000079
69500            LDA     IJ!!!!01+1
69600            ASL     A
69700            ASL     A
69800            CLC
69900            ADC     #(K!!!!01-4) MOD .M
70000            STA     .T000073
70100            LDA     #0
70200            ADC     #(K!!!!01-4)/256
70300            STA     .T000073+1
70400  .MFFMUL   SET     1
70500            JSR     .FFMUL
70600            .BYTE   0
70700            .WORD   AK!!!01,-.T000073
70800            .WORD   .T000034
70900  .MFFADD   SET     1
71000            JSR     .FFADD
71100            .BYTE   0
71200            .WORD   .T000079,.T000081
71300            .WORD   .T000034
71400  ;         PVP(IJ-1)=SQRT(TEMP)/30.48                            00001650
71500            LDA     IJ!!!!01+1
71600            SEC
71700            SBC     #1
71800            STA     .T000018
71900            LDA     #TEMP!!01 MOD .M
72000            STA     SQRT.001
72100            LDA     #TEMP!!01/256
72200            STA     SQRT.001+1
72300            LDA     #.T000073 MOD .M
72400            STA     SQRT.000
72500            LDA     #.T000073/256
72600            STA     SQRT.000+1
72700            JSR     SQRT
72800            LDA     .T000018
72900            ASL     A
73000            ASL     A
73100            CLC
73200            ADC     #(PVP!!!01-4) MOD .M
73300            STA     .T000074
73400            LDA     #0
73500            ADC     #(PVP!!!01-4)/256
73600            STA     .T000074+1
73700  .MFFDIV   SET     1
73800            JSR     .FFDIV
73900            .BYTE   0
74000            .WORD   .T000073,.C000082
74100            .WORD   -.T000074
```

```
74200   ;         IF (PVS(IJ-1) .LT. XMIN) XMIN=PVS(IJ-1)                    00001660
74300             LDA    IJ!!!!01+1
74400             SEC
74500             SBC    #1
74600             STA    .T000018
74700             LDA    .T000018
74800             ASL    A
74900             ASL    A
75000             CLC
75100             ADC    #(PVS!!!01-4) MOD .M
75200             STA    .T000033
75300             LDA    #0
75400             ADC    #(PVS!!!01-4)/256
75500             STA    .T000033+1
75600   .MFFLT    SET    1
75700             JSR    .FFLT
75800             .BYTE  0
75900             .WORD  -.T000033,XMIN!!01
76000             ASL    A
76100             BCS    *+5
76200             JMP    .L000083
76300             LDA    IJ!!!!01+1
76400             SEC
76500             SBC    #1
76600             STA    .T000018
76700             LDA    .T000018
76800             ASL    A
76900             ASL    A
77000             CLC
77100             ADC    #(PVS!!!01-4) MOD .M
77200             STA    .T000019
77300             LDA    #0
77400             ADC    #(PVS!!!01-4)/256
77500             STA    .T000019+1
77600   .MFLTASG  SET    1
77700             JSR    .FLTASGN
77800             .BYTE  0
77900             .WORD  -.T000019
78000             .WORD  XMIN!!01
78100   .L000083  EQU    *
78200   ;         IF (PVS(IJ-1) .GT. XMAX) XMAX=PVS(IJ-1)                    00001670
78300             LDA    IJ!!!!01+1
78400             SEC
78500             SBC    #1
78600             STA    .T000018
78700             LDA    .T000018
78800             ASL    A
78900             ASL    A
79000             CLC
79100             ADC    #(PVS!!!01-4) MOD .M
79200             STA    .T000033
79300             LDA    #0
79400             ADC    #(PVS!!!01-4)/256
79500             STA    .T000033+1
79600   .MFFGT    SET    1
79700             JSR    .FFGT
79800             .BYTE  0
79900             .WORD  -.T000033,XMAX!!01
80000             ASL    A
80100             BCS    *+5
80200             JMP    .L000084
80300             LDA    IJ!!!!01+1
80400             SEC
80500             SBC    #1
80600             STA    .T000018
80700             LDA    .T000018
80800             ASL    A
80900             ASL    A
81000             CLC
81100             ADC    #(PVS!!!01-4) MOD .M
81200             STA    .T000019
81300             LDA    #0
81400             ADC    #(PVS!!!01-4)/256
81500             STA    .T000019+1
81600   .MFLTASG  SET    1
81700             JSR    .FLTASGN
81800             .BYTE  0
81900             .WORD  -.T000019
82000             .WORD  XMAX!!01
82100   .L000084  EQU    *
82200   ;         IF(PVP(IJ-1) .LT. YMIN) YMIN=PVP(IJ-1)                     00001680
```

```
82300            LDA     IJ!!!!01+1
82400            SEC
82500            SBC     #1
82600            STA     .T000018
82700            LDA     .T000018
82800            ASL     A
82900            ASL     A
83000            CLC
83100            ADC     #(PVP!!!01-4) MOD .M
83200            STA     .T000033
83300            LDA     #0
83400            ADC     #(PVP!!!01-4)/256
83500            STA     .T000033+1
83600   .MFFLT   SET     1
83700            JSR     .FFLT
83800            .BYTE   0
83900            .WORD   -.T000033,YMIN!!01
84000            ASL     A
84100            BCS     *+5
84200            JMP     .L000085
84300            LDA     IJ!!!!01+1
84400            SEC
84500            SBC     #1
84600            STA     .T000018
84700            LDA     .T000018
84800            ASL     A
84900            ASL     A
85000            CLC
85100            ADC     #(PVP!!!01-4) MOD .M
85200            STA     .T000019
85300            LDA     #0
85400            ADC     #(PVP!!!01-4)/256
85500            STA     .T000019+1
85600   .MFLTASG SET     1
85700            JSR     .FLTASGN
85800            .BYTE   0
85900            .WORD   -.T000019
86000            .WORD   YMIN!!01
86100   .L000085 EQU     *
86200   ;        IF (PVP(IJ-1) .GT. YMAX) YMAX=PVP(IJ-1)                    00001690
86300            LDA     IJ!!!!01+1
86400            SEC
86500            SBC     #1
86600            STA     .T000018
86700            LDA     .T000018
86800            ASL     A
86900            ASL     A
87000            CLC
87100            ADC     #(PVP!!!01-4) MOD .M
87200            STA     .T000033
87300            LDA     #0
87400            ADC     #(PVP!!!01-4)/256
87500            STA     .T000033+1
87600   .MFFGT   SET     1
87700            JSR     .FFGT
87800            .BYTE   0
87900            .WORD   -.T000033,YMAX!!01
88000            ASL     A
88100            BCS     *+5
88200            JMP     .L000086
88300            LDA     IJ!!!!01+1
88400            SEC
88500            SBC     #1
88600            STA     .T000018
88700            LDA     .T000018
88800            ASL     A
88900            ASL     A
89000            CLC
89100            ADC     #(PVP!!!01-4) MOD .M
89200            STA     .T000019
89300            LDA     #0
89400            ADC     #(PVP!!!01-4)/256
89500            STA     .T000019+1
89600   .MFLTASG SET     1
89700            JSR     .FLTASGN
89800            .BYTE   0
89900            .WORD   -.T000019
90000            .WORD   YMAX!!01
90100   .L000086 EQU     *
90200   ;        NUMBER(IJ) = IJ                                            00001700
90300            LDA     IJ!!!!01+1
```

```
90400             ASL     A
90500             STA     .T000007
90600             LDA     IJ!!!!01
90700             LDX     .T000007
90800             STA     NUMBER01-2,X
90900             LDA     IJ!!!!01+1
91000             STA     NUMBER01-1,X
91100   ;         GO TO 123                                                  00001710
91200             JMP     .L000061
91300   ; C 129   WRITE(9,144) MNM                                           00001720
91400   ; C 144   FORMAT(' MINERAL NUMBER ',I3,' NOT IN DATABASE')           00001730
91500   ;         STOP 90                                                    00001740
91600   .MSTOP    SET     1
91700             JSR     .STOP
91800             .BYTE   90
91900   ; 123     CONTINUE                                                   00001750
92000   .L000061  EQU     *
92100             JMP     .L000057
92200   .L000058  EQU     *
92300   ;         IF (IPLOT .EQ. 0) GO TO 88                                 00001760
92400             LDA     IPLOT!01+1
92500             CMP     #0
92600             BNE     .L000087
92700             LDA     IPLOT!01
92800             CMP     #0
92900             BNE     .L000087
93000             JMP     .L000089
93100   .L000087  EQU     *
93200   ; C       PLOTTING SECTION                                           00001770
93300   ;         PMIN=VELP-VELPD                                            00001780
93400   .MFFSUB   SET     1
93500             JSR     .FFSUB
93600             .BYTE   0
93700             .WORD   VELP!!01,VELPD!01
93800             .WORD   PMIN!!01
93900   ;         PMAX=VELP+VELPD                                            00001790
94000   .MFFADD   SET     1
94100             JSR     .FFADD
94200             .BYTE   0
94300             .WORD   VELP!!01,VELPD!01
94400             .WORD   PMAX!!01
94500   ;         SMIN=VELS-VELSD                                            00001800
94600   .MFFSUB   SET     1
94700             JSR     .FFSUB
94800             .BYTE   0
94900             .WORD   VELS!!01,VELSD!01
95000             .WORD   SMIN!!01
95100   ;         SMAX=VELS+VELSD                                            00001810
95200   .MFFADD   SET     1
95300             JSR     .FFADD
95400             .BYTE   0
95500             .WORD   VELS!!01,VELSD!01
95600             .WORD   SMAX!!01
95700   ;         YMAX=YMAX+VELPD                                            00001820
95800   .MFFADD   SET     1
95900             JSR     .FFADD
96000             .BYTE   0
96100             .WORD   YMAX!!01,VELPD!01
96200             .WORD   YMAX!!01
96300   ;         YMIN=YMIN-VELPD                                            00001830
96400   .MFFSUB   SET     1
96500             JSR     .FFSUB
96600             .BYTE   0
96700             .WORD   YMIN!!01,VELPD!01
96800             .WORD   YMIN!!01
96900   ;         XMAX=XMAX+VELSD                                            00001840
97000   .MFFADD   SET     1
97100             JSR     .FFADD
97200             .BYTE   0
97300             .WORD   XMAX!!01,VELSD!01
97400             .WORD   XMAX!!01
97500   ;         XMIN=XMIN-VELSD                                            00001850
97600   .MFFSUB   SET     1
97700             JSR     .FFSUB
97800             .BYTE   0
97900             .WORD   XMIN!!01,VELSD!01
98000             .WORD   XMIN!!01
98100   ;         CALL PLOTX(NZERO,PVP,PVS,YMIN,YMAX,XMIN,XMAX,NUM,PMIN,PMAX, 00001860
98200   ;      X    SMIN,SMAX)                                               00001870
98300             LDA     #SMAX!!01 MOD .M
98400             STA     PLOTX.12
```

```
 98500          LDA     #SMAX!!01/256
 98600          STA     PLOTX.12+1
 98700          LDA     #SMIN!!01 MOD .M
 98800          STA     PLOTX.11
 98900          LDA     #SMIN!!01/256
 99000          STA     PLOTX.11+1
 99100          LDA     #PMAX!!01 MOD .M
 99200          STA     PLOTX.10
 99300          LDA     #PMAX!!01/256
 99400          STA     PLOTX.10+1
 99500          LDA     #PMIN!!01 MOD .M
 99600          STA     PLOTX.09
 99700          LDA     #PMIN!!01/256
 99800          STA     PLOTX.09+1
 99900          LDA     #NUM!!01 MOD .M
100000          STA     PLOTX.08
100100          LDA     #NUM!!01/256
100200          STA     PLOTX.08+1
100300          LDA     #XMAX!!01 MOD .M
100400          STA     PLOTX.07
100500          LDA     #XMAX!!01/256
100600          STA     PLOTX.07+1
100700          LDA     #XMIN!!01 MOD .M
100800          STA     PLOTX.06
100900          LDA     #XMIN!!01/256
101000          STA     PLOTX.06+1
101100          LDA     #YMAX!!01 MOD .M
101200          STA     PLOTX.05
101300          LDA     #YMAX!!01/256
101400          STA     PLOTX.05+1
101500          LDA     #YMIN!!01 MOD .M
101600          STA     PLOTX.04
101700          LDA     #YMIN!!01/256
101800          STA     PLOTX.04+1
101900          LDA     #PVS!!01 MOD .M
102000          STA     PLOTX.03
102100          LDA     #PVS!!01/256
102200          STA     PLOTX.03+1
102300          LDA     #PVP!!01 MOD .M
102400          STA     PLOTX.02
102500          LDA     #PVP!!01/256
102600          STA     PLOTX.02+1
102700          LDA     #NZERO!01 MOD .M
102800          STA     PLOTX.01
102900          LDA     #NZERO!01/256
103000          STA     PLOTX.01+1
103100          JSR     PLOTX
103200  ; 88    IF (FLL .EQ. YES) GO TO 128                          00001880
103300  .L000089 EQU    *
103400  .MFFEQ   SET    1
103500          JSR     .FFEQ
103600          .BYTE   0
103700          .WORD   FLL!!!01,YES!!!01
103800          ASL     A
103900          BCS     *+5
104000          JMP     .L000090
104100          JMP     .L000091
104200  .L000090 EQU    *
104300  ; C      WRITE(9,127)                                         00001890
104400  ; C 127  FORMAT(' GIVE MINIMUMS,MAXIMUM,INCREMENTS IN PERCENTS AND'/  00001900
104500  ; C      1'WHETHER A HISTOGRAM IS PRESENT (1 FOR YES, 0 FOR NO)'/    00001910
104600  ; C      2' FOR EACH MINERAL IN TURN (ENTER INCR. FOR LAST MINERAL=')7 00001920
104700  ; C      3' NOTE THAT C OF LAST MINERAL WILL BE 100 MINUS SUM OF OTHER '00001930
104800  ; C      4'MINERALS)')                                        00001940
104900  ; 128    DO 143 IJ = 2,N                                      00001950
105000  .L000091 EQU    *
105100          LDA     #0
105200          STA     IJ!!!01
105300          LDA     #2
105400          STA     IJ!!!01+1
105500          JMP     .L000094
105600  .L000092 EQU    *
105700          LDA     IJ!!!01+1
105800          CLC
105900          ADC     #1
106000          STA     IJ!!!01+1
106100          LDA     IJ!!!01
106200          ADC     #0
106300          STA     IJ!!!01
106400          LDA     N!!!01+1
106500          CMP     IJ!!!01+1
```

```
106600              LDA     N!!!!!01
106700              SBC     IJ!!!!01
106800              BMI     .L000093
106900   .L000094 EQU      *
107000   ;          IF (FLL .EQ. YES) GO TO 125                              00001960
107100   .MFFEQ     SET     1
107200              JSR     .FFEQ
107300              .BYTE   0
107400              .WORD   FLL!!!01,YES!!!01
107500              ASL     A
107600              BCS     *+5
107700              JMP     .L000097
107800              JMP     .L000098
107900   .L000097 EQU      *
108000   ; C         WRITE(9,124) (NAME(II,IJ),II=1,8)                       00001970
108100   ; C 124     FORMAT(8A2)                                             00001980
108200   ; C 125     READ(IDD,126) XA(IJ),XB(IJ),XINC(IJ),IHIST(IJ)          00001990
108300   ;   125 CONTINUE                                                    00001991
108400   .L000098 EQU      *
108500   ; C 126     FORMAT(4I99)                                            00002000
108600   ;          IF (IHIST(IJ) .EQ. 0) GO TO 143                          00002010
108700              LDA     IJ!!!!01+1
108800              ASL     A
108900              TAX
109000              LDA     IHIST!01-1,X
109100              CMP     #0
109200              BNE     .L000099
109300              LDA     IHIST!01-2,X
109400              CMP     #0
109500              BNE     .L000099
109600              JMP     .L000096
109700   .L000099 EQU      *
109800   ;          TEMP = 0.0                                               00002020
109900   .MFLIASG  SET     1
110000              JSR     .FLTASGN
110100              .BYTE   0
110200              .WORD   .C000101
110300              .WORD   TEMP!!01
110400   ;          IF (XINC(IJ).NE.0)TEMP=FLOAT(XB(IJ)-XA(IJ))/FLOAT(XINC(IJ))  00002030
110500              LDA     IJ!!!!01+1
110600              ASL     A
110700              TAX
110800              LDA     XINC!!01-1,X
110900              CMP     #0
111000              BNE     .L000103
111100              LDA     XINC!!01-2,X
111200              CMP     #0
111300              BEQ     .L000102
111400   .L000103 EQU      *
111500              LDA     IJ!!!!01+1
111600              ASL     A
111700              STA     .T000007
111800              LDA     IJ!!!!01+1
111900              ASL     A
112000              TAX
112100              LDA     XB!!!01-1,X
112200              SEC
112300              LDY     .T000007
112400              SBC     XA!!!01-1,Y
112500              STA     .T000018+1
112600              LDA     XB!!!01-2,X
112700              SBC     XA!!!01-2,Y
112800              STA     .T000018
112900              LDA     IJ!!!!01+1
113000              ASL     A
113100              CLC
113200              ADC     #(XINC!!01-2) MOD .M
113300              STA     .T000019
113400              LDA     #0
113500              ADC     #(XINC!!01-2)/256
113600              STA     .T000019+1
113700   .MFFLOAT  SET     1
113800              JSR     .FFLOAT
113900              .BYTE   1
114000              .WORD   -.T000019
114100              .WORD   .T000079
114200   .MFFLOAT  SET     1
114300              JSR     .FFLOAT
114400              .BYTE   1
114500              .WORD   .T000018
114600              .WORD   .T000073
```

```
114700   .MFFDIV    SET    1
114800              JSR    .FFDIV
114900              .BYTE  0
115000              .WORD  .T000073,.T000079
115100              .WORD  TEMP!!01
115200   .L000102 EQU      *
115300   ;          NUMBX(IJ) = INT(TEMP+1.0)                                           00002040
115400   .MFFADD    SET    1
115500              JSR    .FFADD
115600              .BYTE  0
115700              .WORD  TEMP!!01,.C000104
115800              .WORD  .T000073
115900              LDA    #.T000073 MOD .M
116000              STA    INT.0001
116100              LDA    #.T000073/256
116200              STA    INT.0001+1
116300              LDA    #.T000018 MOD .M
116400              STA    INT.0000
116500              LDA    #.T000018/256
116600              STA    INT.0000+1
116700              JSR    INT
116800              LDA    IJ!!!!01+1
116900              ASL    A
117000              STA    .T000007
117100              LDA    .T000018
117200              LDX    .T000007
117300              STA    NUMBX!01-2,X
117400              LDA    .T000018+1
117500              STA    NUMBX!01-1,X
117600   ;          NTEMP=NUMBX(IJ)                                                     00002050
117700              LDA    IJ!!!!01+1
117800              ASL    A
117900              TAX
118000              LDA    NUMBX!01-2,X
118100              STA    NTEMP!01
118200              LDA    NUMBX!01-1,X
118300              STA    NTEMP!01+1
118400   ;          IF (NTEMP .GT. 21) GO TO 1433                                       00002060
118500              LDA    #21
118600              CMP    NTEMP!01+1
118700              LDA    #0
118800              SBC    NTEMP!01
118900              BMI    .L000106
119000              JMP    .L000105
119100   .L000106 EQU      *
119200              JMP    .L000107
119300   .L000105 EQU      *
119400   ;          IF (FLL .EQ. YES) GO TO 1251                                        00002070
119500   .MFFEQ     SET    1
119600              JSR    .FFEQ
119700              .BYTE  0
119800              .WORD  FLL!!!01,YES!!!01
119900              ASL    A
120000              BCS    *+5
120100              JMP    .L000108
120200              JMP    .L000109
120300   .L000108 EQU      *
120400   ; C        WRITE(9,1252) NUMBX(IJ)                                             00002080
120500   ; C 1252 FORMAT(' ENTER THE RELATIVE HISTOGRAM DATA (',I4,' NUMBERS)')         00002090
120600   ; CC READ IN HISTOGRAM                                                         00002100
120700   ; C 1251 READ(IDD,1253) (HIST(IJ,I),I=1,NTEMP)                                 00002110
120800   ;    1251 CONTINUE                                                             00002111
120900   .L000109 EQU      *
121000   ; C 1253 FORMAT(21I99)                                                         00002120
121100   ;          GO TO 143                                                           00002130
121200              JMP    .L000096
121300   ; C 1433 WRITE(9,1934) NTEMP                                                   00002140
121400   ;    1433 CONTINUE                                                             00002141
121500   .L000107 EQU      *
121600   ; C 1434 FORMAT(' TOO MANY STEPS!!',I5)                                        00002150
121700   ;    143 CONTINUE                                                              00002160
121800   .L000096 EQU      *
121900              JMP    .L000092
122000   .L000093 EQU      *
122100   ;          IF (ICONS .EQ. 0) GO TO 149                                         00002170
122200              LDA    ICONS!01+1
122300              CMP    #0
122400              BNE    .L000110
122500              LDA    ICONS!01
122600              CMP    #0
122700              BNE    .L000110
```

```
122800              JMP     .L000112
122900   .L000110 EQU       *
123000   ; C   SPECIAL CONSTRAINTS SECTION                                          00002180
123100   ;         DO 157 IQJ = 1,NUMSP                                             00002190
123200              LDA     #0
123300              STA     IQJ!!101
123400              LDA     #1
123500              STA     IQJ!!101+1
123600              JMP     .L000115
123700   .L000113 EQU       *
123800              LDA     IQJ!!101+1
123900              CLC
124000              ADC     #1
124100              STA     IQJ!!101+1
124200              LDA     IQJ!!101
124300              ADC     #0
124400              STA     IQJ!!101
124500              LDA     NUMSP!01+1
124600              CMP     IQJ!!101+1
124700              LDA     NUMSP!01
124800              SBC     IQJ!!101
124900              BMI     .L000114
125000   .L000115 EQU       *
125100   ;         DO 1435 IIJJ = 1,6                                               00002200
125200              LDA     #0
125300              STA     IIJJ!101
125400              LDA     #1
125500              STA     IIJJ!101+1
125600              JMP     .L000121
125700   .L000118 EQU       *
125800              LDA     IIJJ!101+1
125900              CLC
126000              ADC     #1
126100              STA     IIJJ!101+1
126200              LDA     IIJJ!101
126300              ADC     #0
126400              STA     IIJJ!101
126500              LDA     #6
126600              CMP     IIJJ!101+1
126700              LDA     #0
126800              SBC     IIJJ!101
126900              BMI     .L000119
127000   .L000121 EQU       *
127100   ;         IDX=IQJ*12+IIJJ                                                  00002209
127200   .MIMUL   SET     1
127300              JSR     .IMUL
127400              .BYTE 5
127500              .WORD IQJ!!101,.C000124
127600              .WORD .T000018
127700              LDA     .T000018+1
127800              CLC
127900              ADC     IIJJ!101+1
128000              STA     IDX!!101+1
128100              LDA     .T000018
128200              ADC     IIJJ!101
128300              STA     IDX!!101
128400   ;         VMULT(IDX)=1.0                                                   00002210
128500              LDA     IDX!!101+1
128600              ASL     A
128700              ASL     A
128800              CLC
128900              ADC     #(VMULT!01-4) MOD .M
129000              STA     .T000019
129100              LDA     #0
129200              ADC     #(VMULT!01-4)/256
129300              STA     .T000019+1
129400   .MFLTASG SET     1
129500              JSR     .FLTASGN
129600              .BYTE 0
129700              .WORD .C000125
129800              .WORD .T000019
129900   ;         IDX=IQJ*12+6+IIJJ                                                00002219
130000   .MIMUL   SET     1
130100              JSR     .IMUL
130200              .BYTE 5
130300              .WORD IQJ!!101,.C000124
130400              .WORD .T000018
130500              LDA     .T000018+1
130600              CLC
130700              ADC     #6
130800              STA     .T000019+1
```

```
130900            LDA    .T000018
131000            ADC    #0
131100            STA    .T000019
131200            LDA    .T000019+1
131300            CLC
131400            ADC    IIJJ!!01+1
131500            STA    IDX!!!01+1
131600            LDA    .T000019
131700            ADC    IIJJ!!01
131800            STA    IDX!!!01
131900     ; 1435 VMULT(IDX)=1.0                                           00002220
132000     .L000123 EQU   *
132100            LDA    IDX!!!01+1
132200            ASL    A
132300            ASL    A
132400            CLC
132500            ADC    #(VMULT!01-4) MOD .M
132600            STA    .T000019
132700            LDA    #0
132800            ADC    #(VMULT!01-4)/256
132900            STA    .T000019+1
133000     .MFLTASG SET   1
133100            JSR    .FLTASGN
133200            .BYTE  0
133300            .WORD  .C000126
133400            .WORD  -.T000019
133500            JMP    .L000118
133600     .L000119 EQU   *
133700     ;      IF (FLL .EQ. YES) GO TO 154                              00002230
133800     .MFFEQ  SET    1
133900            JSR    .FFEQ
134000            .BYTE  0
134100            .WORD  FLL!!!01,YES!!!01
134200            ASL    A
134300            BCS    *+5
134400            JMP    .L000127
134500            JMP    .L000128
134600     .L000127 EQU   *
134700     ; C 1592 WRITE(9,155)                                           00002240
134800     ;  1592 CONTINUE                                                00002241
134900     .L000129 EQU   *
135000     ; C 155 FORMAT(' ENTER TYPE OF CONSTRAINT - LE GE EQ OR AN LN GN EN'/ 00002250
135100     ; C    1'AND IF NON-UNITY MULTIPLIERS ARE TO BE USED (0=NO, 1=YES)') 00002260
135200     ;      IMULT(IOJ) = 0                                           00002270
135300     ; C 154 READ(IDD,156) TYPE(IOJ),IMULT(IOJ)                      00002280
135400            LDA    IOJ!!!01+1
135500            ASL    A
135600            STA    .T000007
135700            LDA    #0
135800            LDX    .T000007
135900            STA    IMULT!01-2,X
136000            LDA    #0
136100            STA    IMULT!01-1,X
136200     ;  154 CONTINUE                                                 00002281
136300     .L000128 EQU   *
136400     ; C 156 FORMAT(A2,1X,I1)                                        00002290
136500     ;      IF (FLL .EQ. YES) GO TO 158                              00002300
136600     .MFFEQ  SET    1
136700            JSR    .FFEQ
136800            .BYTE  0
136900            .WORD  FLL!!!01,YES!!!01
137000            ASL    A
137100            BCS    *+5
137200            JMP    .L000130
137300            JMP    .L000131
137400     .L000130 EQU   *
137500     ; C     WRITE(9,159)                                            00002310
137600     ; C 159 FORMAT(' ENTER NUMBER OF ITEMS & THE MINERAL NUMBERS FOR L.H.$00002320
137700     ; C 158 READ(IDD,161) NMN,(NUMS(IOJ,1,I),I=1,NMN)                .00002330
137800     ;  158 CONTINUE                                                 00002331
137900     .L000131 EQU   *
138000     ; C 161 FORMAT(7I99)                                            00002340
138100     ;      IDX=IOJ*2                                                00002349
138200     .MIMUL  SET    1
138300            JSR    .IMUL
138400            .BYTE  5
138500            .WORD  IOJ!!!01,.C000056
138600            .WORD  IDX!!!01
138700     ;      NUMSPC(IDX) = NMN                                        00002350
138800            LDA    IDX!!!01+1
138900            ASL    A
```

```
139000            STA    .T000007
139100            LDA    NMN!!!01
139200            LDX    .T000007
139300            STA    NUMSPC01-2,X
139400            LDA    NMN!!!01+1
139500            STA    NUMSPC01-1,X
139600     ;         ITYPEF = 0                                               00002360
139700            LDA    #0
139800            STA    ITYPEF01
139900            LDA    #0
140000            STA    ITYPEF01+1
140100     ;      IF(TYPE(IQJ) .EQ. TYPMAS(6) .OR. TYPE(IQJ) .EQ. TYPMAS(7)   00002370
140200     ;   1 .OR. TYPE(IQJ) .EQ. TYPMAS(8)) ITYPEF = 1                    00002380
140300            LDA    #7
140400            ASL    A
140500            STA    .T000019
140600            LDA    IQJ!!!01+1
140700            ASL    A
140800            TAX
140900            LDA    TYPE!!01-1,X
141000            LDY    .T000019
141100            CMP    TYPMAS01-1,Y
141200            BNE    .L000132
141300            LDA    TYPE!!01-2,X
141400            CMP    TYPMAS01-2,Y
141500            BNE    .L000132
141600  .L000133  LDA    #80H
141700            BNE    *+4
141800  .L000132  LDA    #0
141900            STA    .T000018
142000            LDA    #6
142100            ASL    A
142200            STA    .T000019
142300            LDA    IQJ!!!01+1
142400            ASL    A
142500            TAX
142600            LDA    TYPE!!01-1,X
142700            LDY    .T000019
142800            CMP    TYPMAS01-1,Y
142900            BNE    .L000134
143000            LDA    TYPE!!01-2,X
143100            CMP    TYPMAS01-2,Y
143200            BNE    .L000134
143300  .L000135  LDA    #80H
143400            BNE    *+4
143500  .L000134  LDA    #0
143600            STA    .T000007
143700            LDA    #8
143800            ASL    A
143900            STA    .T000073
144000            LDA    IQJ!!!01+1
144100            ASL    A
144200            TAX
144300            LDA    TYPE!!01-1,X
144400            LDY    .T000073
144500            CMP    TYPMAS01-1,Y
144600            BNE    .L000136
144700            LDA    TYPE!!01-2,X
144800            CMP    TYPMAS01-2,Y
144900            BNE    .L000136
145000  .L000137  LDA    #80H
145100            BNE    *+4
145200  .L000136  LDA    #0
145300            STA    .T000033
145400            LDA    .T000007
145500            ORA    .T000018
145600            ORA    .T000033
145700            ASL    A
145800            BCS    *+5
145900            JMP    .L000138
146000            LDA    #0
146100            STA    ITYPEF01
146200            LDA    #1
146300            STA    ITYPEF01+1
146400  .L000138  EQU    *
146500     ;      IF (NMN .GT. 6) GO TO 1599                                  00002390
146600            LDA    #6
146700            CMP    NMN!!!01+1
146800            LDA    #0
146900            SBC    NMN!!!01
147000            BMI    .L000140
```

```
147100              JMP      .L000139
147200    .L000140  EQU      *
147300              JMP      .L000141
147400    .L000139  EQU      *
147500    ;              IF (IMULT(IQJ) .LT. 1) GO TO 1631                          00002400
147600              LDA      IQJ!!!01+1
147700              ASL      A
147800              TAX
147900              LDA      IMULT!01-1,X
148000              CMP      #1
148100              LDA      IMULT!01-2,X
148200              SBC      #0
148300              BMI      .L000143
148400              JMP      .L000142
148500    .L000143  EQU      *
148600              JMP      .L000144
148700    .L000142  EQU      *
148800    ;              IF (FLL .EQ. YES) GO TO 1620                               00002410
148900    .MFFEQ    SET      1
149000              JSR      .FFEQ
149100              .BYTE    0
149200              .WORD    FLL!!!01,YES!!!01
149300              ASL      A
149400              BCS      *+5
149500              JMP      .L000145
149600              JMP      .L000146
149700    .L000145  EQU      *
149800    ; C           WRITE(9,1590) NMN                                           00002420
149900    ; C 1590 FORMAT(' ENTER MULT. CONSTANTS (WITH DECIMAL) FOR EACH OF',I4,   00002430
150000    ; C      1' L.H.S. MINERALS')                                             00002440
150100    ; C 1620 READ(IDD,1630) (VMULT(IQJ,1,I),I=1,NMN)                          00002450
150200    ;      1620 CONTINUE                                                      00002451
150300    .L000146  EQU      *
150400    ; C 1630 FORMAT( 6F99.3)                                                  00002460
150500    ;      1631 IF (FLL .EQ. YES) GO TO 162                                   00002470
150600    .L000144  EQU      *
150700    .MFFEQ    SET      1
150800              JSR      .FFEQ
150900              .BYTE    0
151000              .WORD    FLL!!!01,YES!!!01
151100              ASL      A
151200              BCS      *+5
151300              JMP      .L000147
151400              JMP      .L000148
151500    .L000147  EQU      *
151600    ;              IF (ITYPEF .EQ. 0) GO TO 1641                              00002480
151700              LDA      ITYPEF01+1
151800              CMP      #0
151900              BNE      .L000149
152000              LDA      ITYPEF01
152100              CMP      #0
152200              BNE      .L000149
152300              JMP      .L000151
152400    .L000149  EQU      *
152500    ;              NMN = 1                                                    00002490
152600    ; C           WRITE(9,1638) TYPE(IQJ)                                     00002500
152700    ; C 1638 FORMAT(' ENTER A NUMERIC NUMBER (NO DECIMAL) FOR ',A2,           00002510
152800    ; C      1' TYPE CONSTRAINT')                                             00002520
152900    ; C           READ(IDD,161) (NUMS(IQJ,2,I),I=1,NMN)                       00002530
153000              LDA      #0
153100              STA      NMN!!!01
153200              LDA      #1
153300              STA      NMN!!!01+1
153400    ;              GO TO 1642                                                 00002540
153500              JMP      .L000152
153600    ; C 1641 WRITE(9,163)                                                     00002550
153700    ;      1641 CONTINUE                                                      00002551
153800    .L000151  EQU      *
153900    ; C 163  FORMAT(' ENTER NUMBER OF ITEMS & THE MINERAL NUMBERS FOR R.H.S   00002560
154000    ; C  162 READ(IDD,161) NMN,(NUMS(IQJ,2,I),I=1,NMN)                        00002570
154100    ;       162 CONTINUE                                                      00002571
154200    .L000148  EQU      *
154300    ;      1642 IDX=IQJ*2+1                                                   00002579
154400    .L000152  EQU      *
154500    .MIMUL    SET      1
154600              JSR      .IMUL
154700              .BYTE    5
154800              .WORD    IQJ!!!01,.C000056
154900              .WORD    .T000018
155000              LDA      .T000018+1
155100              CLC
```

```
155200              ADC     #1
155300              STA     IDX!!!01+1
155400              LDA     .T000015
155500              ADC     #0
155600              STA     IDX!!!01
155700       ;      NUMSPC(IDX) = NMN                                           00002580
155800              LDA     IDX!!!01+1
155900              ASL     A
156000              STA     .T000007
156100              LDA     NMN!!!01
156200              LDX     .T000007
156300              STA     NUMSPC01-2,X
156400              LDA     NMN!!!01+1
156500              STA     NUMSPC01-1,X
156600       ;      IF (NMN .GT. 6) GO TO 1599                                  00002590
156700              LDA     #6
156800              CMP     NMN!!!01+1
156900              LDA     #0
157000              SBC     NMN!!!01
157100              BMI     .L000154
157200              JMP     .L000153
157300      .L000154 EQU    *
157400              JMP     .L000141
157500      .L000153 EQU    *
157600       ;      IF (IMULT(IQJ) .LT. 1) GO TO 157                            00002600
157700              LDA     IQJ!!!01+1
157800              ASL     A
157900              TAX
158000              LDA     IMULT!01-1,X
158100              CMP     #1
158200              LDA     IMULT!01-2,X
158300              SBC     #0
158400              BMI     .L000156
158500              JMP     .L000155
158600      .L000156 EQU    *
158700              JMP     .L000117
158800      .L000155 EQU    *
158900       ;      IF (FLL .EQ. YES) GO TO 1621                                00002610
159000      .MFFEQ  SET     1
159100              JSR     .FFEQ
159200              .BYTE   0
159300              .WORD   FLL!!!01,YES!!!01
159400              ASL     A
159500              BCS     *+5
159600              JMP     .L000157
159700              JMP     .L000158
159800      .L000157 EQU    *
159900       ; C            WRITE(9,1591) NMN                                   00002620
160000       ; C    1591 FORMAT(' ENTER MULT. CONSTANTS (WITH DECIMAL) FOR EACH OF',I4,00002630
160100       ; C         1' R.H.S. ELEMENTS')                                   00002640
160200       ; C    1621 READ(IOD,1630) (VMULT(IQJ,2,I),I=1,NMN)                00002650
160300       ;      1621 CONTINUE                                               00002651
160400      .L000158 EQU    *
160500       ;      GO TO 157                                                   00002660
160600              JMP     .L000117
160700       ; C    1599 WRITE(9,1593)                                          00002670
160800       ;      1599 CONTINUE                                               00002671
160900      .L000141 EQU    *
161000       ; C    1593 FORMAT(' TOO MANY MINERAL NUMBERS (6 IS MAX)')         00002680
161100       ;      IF (FLL .NE. YES) GO TO 1592                                00002690
161200      .MFFNE  SET     1
161300              JSR     .FFNE
161400              .BYTE   0
161500              .WORD   FLL!!!01,YES!!!01
161600              ASL     A
161700              BCS     *+5
161800              JMP     .L000159
161900              JMP     .L000129
162000      .L000159 EQU    *
162100       ;      157  CONTINUE                                               00002700
162200      .L000117 EQU    *
162300              JMP     .L000113
162400      .L000114 EQU    *
162500       ;      149  IF (FLL .EQ. YES) GO TO 94                             00002710
162600      .L000112 EQU    *
162700      .MFFEQ  SET     1
162800              JSR     .FFEQ
162900              .BYTE   0
163000              .WORD   FLL!!!01,YES!!!01
163100              ASL     A
163200              BCS     *+5
```

```
163300            JMP      .L000160
163400            JMP      .L000161
163500  .L000160  EQU      *
163600  ; C       REWIND   7                                                      00002720
163700  ; C       WRITE(7,98) IPLOT,ICONS,IVPVS,TOT,J                              00002730
163800  ; C       WRITE(7,101) TITLE                                               00002740
163900  ; C       WRITE(7,133) VELP, VELPD                                         00002750
164000  ; C       WRITE(7,133) VELS, VELSD                                         00002760
164100  ; C       WRITE(7,85) DEN, DEND                                            00002770
164200  ; C       WRITE(7,85) AK,AG                                                00002780
164300  ; C       WRITE(7,136) NZERO                                               00002790
164400  ; C       WRITE(7,136) (NUM(I),I=2,N)                                      00002800
164500  ;         DO 142 IJ = 2,N                                                  00002810
164600            LDA      #0
164700            STA      IJ!!!!01
164800            LDA      #2
164900            STA      IJ!!!!01+1
165000  ; C       WRITE(7,87) XA(IJ),XB(IJ),XINC(IJ),IHIST(IJ),NUM(IJ),            00002820
165100  ; C      1(NAME(II,IJ),II=1,8)                                             00002830
165200            JMP      .L000164
165300  .L000162  EQU      *
165400            LDA      IJ!!!!01+1
165500            CLC
165600            ADC      #1
165700            STA      IJ!!!!01+1
165800            LDA      IJ!!!!01
165900            ADC      #0
166000            STA      IJ!!!!01
166100            LDA      N!!!!01+1
166200            CMP      IJ!!!!01+1
166300            LDA      N!!!!01
166400            SBC      IJ!!!!01
166500            BMI      .L000163
166600  .L000164  EQU      *
166700  ;         IF (IHIST(IJ) .EQ. 0) GO TO 142                                  00002840
166800            LDA      IJ!!!!01+1
166900            ASL      A
167000            TAX
167100            LDA      IHIST!01-1,X
167200            CMP      #0
167300            BNE      .L000167
167400            LDA      IHIST!01-2,X
167500            CMP      #0
167600            BNE      .L000167
167700            JMP      .L000166
167800  .L000167  EQU      *
167900  ;         NTEMP=NUMBX(IJ)
168000  ; C       WRITE(7,887) (HIST(IJ,I),I=1,NTEMP)                              00002850
168100  ; C 887   FORMAT(2I13)                                                     00002860
                                                                                   00002870
168200            LDA      IJ!!!!01+1
168300            ASL      A
168400            TAX
168500            LDA      NUMBX!01-2,X
168600            STA      NTEMP!01
168700            LDA      NUMBX!01-1,X
168800            STA      NTEMP!01+1
168900  ;   142   CONTINUE
169000  .L000166  EQU      *                                                       00002880
169100            JMP      .L000162
169200  .L000163  EQU      *
169300  ;         IF (ICONS .EQ. 0) GO TO 169                                      00002890
169400            LDA      ICONS!01+1
169500            CMP      #0
169600            BNE      .L000169
169700            LDA      ICONS!01
169800            CMP      #0
169900            BNE      .L000169
170000            JMP      .L000171
170100  .L000169  EQU      *
170200  ;         DO 177 IQJ = 1,NUMSP
170300            LDA      #0                                                      00002900
170400            STA      IQJ!!!01
170500            LDA      #1
170600            STA      IQJ!!!01+1
170700  ; C       WRITE(7,156) TYPE(IQJ),IMULT(IQJ)
170800            JMP      .L000174                                                00002910
170900  .L000172  EQU      *
171000            LDA      IQJ!!!01+1
171100            CLC
171200            ADC      #1
171300            STA      IQJ!!!01+1
```

```
171400              LDA     IOJ!!!01
171500              ADC     #0
171600              STA     IOJ!!!01
171700              LDA     NUMSP!01+1
171800              CMP     IOJ!!!01+1
171900              LDA     NUMSP!01
172000              SBC     IOJ!!!01
172100              BMI     .L000173
172200      .L000174 EQU    *
172300      ;       IDX=IOJ*2                                        00002919
172400      .MIMUL  SET     1
172500              JSR     .IMUL
172600              .BYTE   5
172700              .WORD   IOJ!!!01,.C000056
172800              .WORD   IDX!!!01
172900      ;       NM1 = NUMSPC(IDX)                                00002920
173000      ; C     WRITE(7,171) NM1,(NUMS(IOJ,1,I),I=1,NM1)         00002930
173100      ; C 171 FORMAT(7(I3,1X))                                 00002940
173200      ; C     IF (IMULT(IOJ) .GT. 0) WRITE(7,1655) (VMULT(IOJ,1,I),I=1,NM1)  00002950
173300      ; C 1655 FORMAT( 6F6.3)                                  00002960
173400              LDA     IDX!!!01+1
173500              ASL     A
173600              TAX
173700              LDA     NUMSPC01-2,X
173800              STA     NM1!!!01
173900              LDA     NUMSPC01-1,X
174000              STA     NM1!!!01+1
174100      ;       IDX=IOJ*2+1                                      00002969
174200      .MIMUL  SET     1
174300              JSR     .IMUL
174400              .BYTE   5
174500              .WORD   IOJ!!!01,.C000056
174600              .WORD   .T000018
174700              LDA     .T000018+1
174800              CLC
174900              ADC     #1
175000              STA     IDX!!!01+1
175100              LDA     .T000018
175200              ADC     #0
175300              STA     IDX!!!01
175400      ;       NM2 = NUMSPC(IDX)                                00002970
175500      ; C     WRITE(7,171) NM2,(NUMS(IOJ,2,I),I=1,NM2)         00002980
175600      ; C     IF (IMULT(IOJ) .GT. 0) WRITE(7,1655) (VMULT(IOJ,2,I),I=1,NM2)  00002990
175700              LDA     IDX!!!01+1
175800              ASL     A
175900              TAX
176000              LDA     NUMSPC01-2,X
176100              STA     NM2!!!01
176200              LDA     NUMSPC01-1,X
176300              STA     NM2!!!01+1
176400      ;   177 CONTINUE                                         00003000
176500      .L000176 EQU    *
176600              JMP     .L000172
176700      .L000173 EQU    *
176800      ;   169 CONTINUE                                         00003010
176900      .L000171 EQU    *
177000      ; C 87  FORMAT(5(I3,1X),8A2)                             00003020
177100      ; C 136 FORMAT(21(I3,1X))                                00003030
177200      ; C 133 FORMAT(2(F7.0,1X))                               00003040
177300      ; C 85  FORMAT(2(F7.3,1X))                               00003050
177400      ;       ICSSFL = 0                                       00003060
177500      ; C     WRITE(9,79)                                      00003070
177600      ; C 79  FORMAT(' DO YOU WISH TO RUN CASE NOW? ENTER 1 FOR YES, 0 FOR N00003080
177700      ; C     READ(8,78) ICSSFL                                00003090
177800      ; C 78  FORMAT(I1)                                       00003100
177900              LDA     #0
178000              STA     ICSSFL01
178100              LDA     #0
178200              STA     ICSSFL01+1
178300      ;       IF (ICSSFL .EQ. 1) GO TO 94                      00003110
178400              LDA     ICSSFL01+1
178500              CMP     #1
178600              BNE     .L000177
178700              LDA     ICSSFL01
178800              CMP     #0
178900              BNE     .L000177
179000              JMP     .L000161
179100      .L000177 EQU    *
179200      ; C     WRITE(9,77)
179300      ; C 77  FORMAT(/' DATA STORED ON A FILE. YOU MAY RE-ENTER FILENAME AND00003130
179400      ; C     1'EDIT THIS FILE'//)                             00003140
```

```
179500    ;         RETURN                                                    00003150
179600    ;         JMP       .R000001
179700    ;    90   CONTINUE                                                  00003160
179800    .L000161 EQU        *
179900    ; C           ***************LINEAR CONSTRAINTS***************     00003170
180000    ; C       IF (J .EQ. 0) GO TO 70                                    00003180
180100    ; C       DO 60 J2 = 1,J                                            00003190
180200    ; CC      READ(IDD,50) L(J2),U(J2)                                  00003200
180300    ; CC  50  FORMAT(2F99.2)                                            00003210
180400    ; C   60  CONTINUE                                                  00003220
180500    ; C   70  CONTINUE                                                  00003230
180600    ; C       REWIND 8                                                  00003240
180700    ; C           REPLACE MAXIMUMS WITH ENVIRONMENTAL MAXIMUMS          00003250
180800    ; CC      WRITE(9,80) (XB(I),I=2,N)                                 00003260
180900    ; C   80  FORMAT(1X,'OLD MAXIMUMS ',2(10I8/13X))                    00003270
181000    ;         HOLD=0                                                    00003280
181100              LDA       #0
181200              STA       HOLD!!01
181300              LDA       #0
181400              STA       HOLD!!01+1
181500    ;         DO 90 I=2,N                                               00003290
181600              LDA       #0
181700              STA       I!!!!!01
181800              LDA       #2
181900              STA       I!!!!!01+1
182000              JMP       .L000181
182100    .L000179 EQU        *
182200              LDA       I!!!!!01+1
182300              CLC
182400              ADC       #1
182500              STA       I!!!!!01+1
182600              LDA       I!!!!!01
182700              ADC       #0
182800              STA       I!!!!!01
182900              LDA       N!!!!!01+1
183000              CMP       I!!!!!01+1
183100              LDA       N!!!!!01
183200              SBC       I!!!!!01
183300              BMI       .L000180
183400    .L000181 EQU        *
183500    ;    90   HOLD=HOLD+XA(I)                                           00003300
183600    .L000183 EQU        *
183700              LDA       I!!!!!01+1
183800              ASL       A
183900              STA       .T000007
184000              LDA       HOLD!!01+1
184100              CLC
184200              LDX       .T000007
184300              ADC       XA!!!!01-1,X
184400              STA       HOLD!!01+1
184500              LDA       HOLD!!01
184600              ADC       XA!!!!01-2,X
184700              STA       HOLD!!01
184800              JMP       .L000179
184900    .L000180 EQU        *
185000    ;         DO 100 I=2,N                                              00003310
185100              LDA       #0
185200              STA       I!!!!!01
185300              LDA       #2
185400              STA       I!!!!!01+1
185500              JMP       .L000186
185600    .L000184 EQU        *
185700              LDA       I!!!!!01+1
185800              CLC
185900              ADC       #1
186000              STA       I!!!!!01+1
186100              LDA       I!!!!!01
186200              ADC       #0
186300              STA       I!!!!!01
186400              LDA       N!!!!!01+1
186500              CMP       I!!!!!01+1
186600              LDA       N!!!!!01
186700              SBC       I!!!!!01
186800              BMI       .L000185
186900    .L000186 EQU        *
187000    ;         Z=TOT-HOLD+XA(I)                                          00003320
187100              LDA       TOT!!!01+1
187200              SEC
187300              SBC       HOLD!!01+1
187400              STA       .T000018+1
187500              LDA       TOT!!!01
```

```
187600              SBC     HOLD!!01
187700              STA     .T000018
187800              LDA     I!!!!!01+1
187900              ASL     A
188000              STA     .T000007
188100              LDA     .T000018+1
188200              CLC
188300              LDX     .T000007
188400              ADC     XA!!!!01-1,X
188500              STA     Z!!!!01+1
188600              LDA     .T000018
188700              ADC     XA!!!!01-2,X
188800              STA     Z!!!!01
188900      ;   100 XB(I)=MINO(XB(I),Z)                              00003330
189000      .L000188 EQU   *
189100              LDA     #Z!!!!!01 MOD .M
189200              STA     MINO.002
189300              LDA     #Z!!!!!01/256
189400              STA     MINO.002+1
189500              LDA     I!!!!!01+1
189600              ASL     A
189700              CLC
189800              ADC     #(XB!!!!01-2) MOD .M
189900              STA     MINO.001
190000              LDA     #0
190100              ADC     #(XB!!!!01-2)/256
190200              STA     MINO.001+1
190300              LDA     #.T000018 MOD .M
190400              STA     MINO.000
190500              LDA     #.T000018/256
190600              STA     MINO.000+1
190700              JSR     MINO
190800      ; CC    WRITE(9,110) (XB(I),I=2,N)                       00003340
190900      ; C  110 FORMAT(1X,'NEW MAXIMUMS ',2(10I8/13X))          00003350
191000      ; C    CHECK VALIDITY OF DATA                            00003360
191100              LDA     I!!!!!01+1
191200              ASL     A
191300              STA     .T000007
191400              LDA     .T000018
191500              LDX     .T000007
191600              STA     XB!!!!01-2,X
191700              LDA     .T000018+1
191800              STA     XB!!!!01-1,X
191900              JMP     .L000184
192000      .L000185 EQU   *
192100      ;       IF (NZERO .GE. 2 .AND. NZERO .LE. 20) GO TO 130  00003370
192200              LDA     #20
192300              CMP     NZERO!01+1
192400              LDA     #0
192500              SBC     NZERO!01
192600              BMI     .L000190
192700              LDA     #80H
192800              BNE     *+4
192900      .L000190 LDA   #0
193000              STA     .T000018
193100              LDA     NZERO!01+1
193200              CMP     #2
193300              LDA     NZERO!01
193400              SBC     #0
193500              BMI     .L000192
193600              LDA     #80H
193700              BNE     *+4
193800      .L000192 LDA   #0
193900              AND     .T000018
194000              ASL     A
194100              BCS     *+5
194200              JMP     .L000194
194300              JMP     .L000195
194400      .L000194 EQU   *
194500      ; C    WRITE(9,120) NZERO                                00003380
194600      ; C  120 FORMAT(1X,'N OUT OF RANGE ',I3)                 00003390
194700      ;     GO TO 400                                          00003400
194800              JMP     .L000196
194900      ;   130 IF (IVPVS .EQ. 0) GO TO 135                      00003410
195000      .L000195 EQU   *
195100              LDA     IVPVS!01+1
195200              CMP     #0
195300              BNE     .L000197
195400              LDA     IVPVS!01
195500              CMP     #0
195600              BNE     .L000197
```

```
195700              JMP     .L000199
195800    .L000197  EQU     *
195900    ;            IF (AK .NE. 0.0 .AND. AG .NE. 0.0) GO TO 137        00003420
196000    .MFFNE    SET     1
196100              JSR     .FFNE
196200              .BYTE   0
196300              .WORD   AG!!!!01,.C000201
196400              STA     .T000018
196500    .MFFNE    SET     1
196600              JSR     .FFNE
196700              .BYTE   0
196800              .WORD   AK!!!!01,.C000200
196900              AND     .T000018
197000              ASL     A
197100              BCS     *+5
197200              JMP     .L000202
197300              JMP     .L000203
197400    .L000202  EQU     *
197500    ; C          WRITE(9,132)                                         00003430
197600    ; C      132 FORMAT(1X,'AK OR AG = 0.0')                          00003440
197700    ;            GO TO 400                                            00003450
197800              JMP     .L000196
197900    ;       137 DO 138 I=2,N                                          00003460
198000    .L000203  EQU     *
198100              LDA     #0
198200              STA     I!!!!!01
198300              LDA     #2
198400              STA     I!!!!!01+1
198500              JMP     .L000206
198600    .L000204  EQU     *
198700              LDA     I!!!!!01+1
198800              CLC
198900              ADC     #1
199000              STA     I!!!!!01+1
199100              LDA     I!!!!!01
199200              ADC     #0
199300              STA     I!!!!!01
199400              LDA     N!!!!!01+1
199500              CMP     I!!!!!01+1
199600              LDA     N!!!!!01
199700              SBC     I!!!!!01
199800              BMI     .L000205
199900    .L000206  EQU     *
200000    ;            IF (P(I) .NE. 0.0) GO TO 138                         00003470
200100              LDA     I!!!!!01+1
200200              ASL     A
200300              ASL     A
200400              CLC
200500              ADC     #(P!!!!!01-4) MOD .M
200600              STA     .T000019
200700              LDA     #0
200800              ADC     #(P!!!!!01-4)/256
200900              STA     .T000019+1
201000    .MFFNE    SET     1
201100              JSR     .FFNE
201200              .BYTE   0
201300              .WORD   -.T000019,.C000209
201400              ASL     A
201500              BCS     *+5
201600              JMP     .L000210
201700              JMP     .L000208
201800    .L000210  EQU     *
201900    ; C          WRITE(9,139)                                         00003480
202000    ; C      139 FORMAT(1X,'RHO VALUE = 0.0')                         00003490
202100    ;            GO TO 400                                            00003500
202200              JMP     .L000196
202300    ;       138 CONTINUE                                              00003510
202400    .L000208  EQU     *
202500              JMP     .L000204
202600    .L000205  EQU     *
202700    ;       135 IF (IOI .LT. 0) GO TO 150                             00003520
202800    .L000199  EQU     *
202900              LDA     TOT!!!01+1
203000              CMP     #0
203100              LDA     TOT!!!01
203200              SBC     #0
203300              BMI     .L000212
203400              JMP     .L000211
203500    .L000212  EQU     *
203600              JMP     .L000213
203700    .L000211  EQU     *
```

```
203800  ;       XBSUM=0.0                                              00003530
203900  .MFLTASG SET    1
204000          JSR    .FLTASGN
204100          .BYTE  0
204200          .WORD  .C000214
204300          .WORD  XBSUM!01
204400  ;       DO 140 I=2,N                                           00003540
204500          LDA    #0
204600          STA    I!!!!!01
204700          LDA    #2
204800          STA    I!!!!!01+1
204900          JMP    .L000217
205000  .L000215 EQU   *
205100          LDA    I!!!!!01+1
205200          CLC
205300          ADC    #1
205400          STA    I!!!!!01+1
205500          LDA    I!!!!!01
205600          ADC    #0
205700          STA    I!!!!!01
205800          LDA    N!!!!!01+1
205900          CMP    I!!!!!01+1
206000          LDA    N!!!!!01
206100          SBC    I!!!!!01
206200          BMI    .L000216
206300  .L000217 EQU   *
206400  ;       IF (XINC(I) .GT. TOT) GO TO 150                        00003550
206500          LDA    I!!!!!01+1
206600          ASL    A
206700          STA    .T000018
206800          LDA    TOT!!!01+1
206900          LDX    .T000018
207000          CMP    XINC!!01-1,X
207100          LDA    TOT!!!01
207200          SBC    XINC!!01-2,X
207300          BMI    .L000221
207400          JMP    .L000220
207500  .L000221 EQU   *
207600          JMP    .L000213
207700  .L000220 EQU   *
207800  ;       XBSUM=XBSUM+FLOAT(XB(I))                               00003560
207900          LDA    I!!!!!01+1
208000          ASL    A
208100          CLC
208200          ADC    #(XB!!!01-2) MOD .M
208300          STA    .T000018
208400          LDA    #0
208500          ADC    #(XB!!!01-2)/256
208600          STA    .T000018+1
208700  .MFFLOAT SET   1
208800          JSR    .FFLOAT
208900          .BYTE  1
209000          .WORD  -.T000018
209100          .WORD  .T000073
209200  .MFFADD  SET   1
209300          JSR    .FFADD
209400          .BYTE  0
209500          .WORD  XBSUM!01,.T000073
209600          .WORD  XBSUM!01
209700  ;       140 CONTINUE                                           00003570
209800  .L000219 EQU   *
209900          JMP    .L000215
210000  .L000216 EQU   *
210100  ;       IF (XBSUM .GE. FLOAT(TOT)) GO TO 170                   00003580
210200  .MFFLOAT SET   1
210300          JSR    .FFLOAT
210400          .BYTE  1
210500          .WORD  TOT!!!01
210600          .WORD  .T000073
210700  .MFFGE   SET   1
210800          JSR    .FFGE
210900          .BYTE  0
211000          .WORD  XBSUM!01,.T000073
211100          ASL    A
211200          BCS    *+5
211300          JMP    .L000222
211400          JMP    .L000223
211500  .L000222 EQU   *
211600  ; C 150 WRITE(9,160)
211700  ;       150 CONTINUE                                           00003590
211800  .L000213 EQU   *                                               00003591
```

```
211900    ; C   160 FORMAT(1X,'MAX VALUES,SCALING, OR INC INVALID')        00003600
212000    ;         GO TO 400                                              00003610
212100              JMP      .L000196
212200    ;     170 DO 190 I=2,N                                           00003620
212300    .L000223 EQU      *
212400              LDA      #0
212500              STA      I!!!!!01
212600              LDA      #2
212700              STA      I!!!!!01+1
212800              JMP      .L000226
212900    .L000224 EQU      *
213000              LDA      I!!!!!01+1
213100              CLC
213200              ADC      #1
213300              STA      I!!!!!01+1
213400              LDA      I!!!!!01
213500              ADC      #0
213600              STA      I!!!!!01
213700              LDA      N!!!!!01+1
213800              CMP      I!!!!!01+1
213900              LDA      N!!!!!01
214000              SBC      I!!!!!01
214100              BMI      .L000225
214200    .L000226 EQU      *
214300    ;         IF (XA(I) .GE. 0 .AND. XB(I) .GE. XA(I)) GO TO 200     00003630
214400              LDA      I!!!!!01+1
214500              ASL      A
214600              STA      .T000019
214700              LDA      I!!!!!01+1
214800              ASL      A
214900              TAX
215000              LDA      XB!!!!01-1,X
215100              LDY      .T000019
215200              CMP      XA!!!!01-1,Y
215300              LDA      XB!!!!01-2,X
215400              SBC      XA!!!!01-2,Y
215500              BMI      .L000229
215600              LDA      #80H
215800    .L000229 LDA      #0
215900              STA      .T000018
216000              LDA      I!!!!!01+1
216100              ASL      A
216200              TAX
216300              LDA      XA!!!!01-1,X
216400              CMP      #0
216500              LDA      XA!!!!01-2,X
216600              SBC      #0
216700              BMI      .L000231
216800              LDA      #80H
216900              BNE      *+4
217000    .L000231 LDA      #0
217100              AND      .T000018
217200              ASL      A
217300              BCS      *+5
217400              JMP      .L000233
217500              JMP      .L000234
217600    .L000233 EQU      *
217700    ;         J=I-1                                                  00003640
217800    ; C       WRITE(9,180) J,XA(I),XB(I)                             00003650
217900    ; C   180 FORMAT(1X,'INVALID DATA ',I5,2I8)                      00003660
218000              LDA      I!!!!!01+1
218100              SEC
218200              SBC      #1
218300              STA      J!!!!!01+1
218400              LDA      I!!!!!01
218500              SBC      #0
218600              STA      J!!!!!01
218700    ;         GO TO 400                                              00003670
218800              JMP      .L000196
218900    ;     190 CONTINUE                                               00003680
219000    .L000228 EQU      *
219100              JMP      .L000224
219200    .L000225 EQU      *
219300    ; C            INITIALIZE COMPUTATIONS                           00003690
219400    ;     200 DO 210 I=1,N                                           00003700
219500    .L000234 EQU      *
219600              LDA      #0
219700              STA      I!!!!!01
219800              LDA      #1
219900              STA      I!!!!!01+1
220000              JMP      .L000237
```

```
220100        .L000235 EQU    *
220200                 LDA    I!!!!!01+1
220300                 CLC
220400                 ADC    #1
220500                 STA    I!!!!!01+1
220600                 LDA    I!!!!!01
220700                 ADC    #0
220800                 STA    I!!!!!01
220900                 LDA    N!!!!!01+1
221000                 CMP    I!!!!!01+1
221100                 LDA    N!!!!!01
221200                 SBC    I!!!!!01
221300                 BMI    .L000236
221400        .L000237 EQU    *
221500        ;        X(I)=0                                                              00003710
221600                 LDA    I!!!!!01+1
221700                 ASL    A
221800                 STA    .T000007
221900                 LDA    #0
222000                 LDX    .T000007
222100                 STA    X!!!!!01-2,X
222200                 LDA    #0
222300                 STA    X!!!!!01-1,X
222400        ;        SX(I)=0                                                             00003720
222500                 LDA    I!!!!!01+1
222600                 ASL    A
222700                 STA    .T000007
222800                 LDA    #0
222900                 LDX    .T000007
223000                 STA    SX!!!!!01-2,X
223100                 LDA    #0
223200                 STA    SX!!!!!01-1,X
223300        ;  210   IQQ(I) = 0                                                          00003730
223400        .L000239 EQU    *
223500                 LDA    I!!!!!01+1
223600                 ASL    A
223700                 STA    .T000007
223800                 LDA    #0
223900                 LDX    .T000007
224000                 STA    IQQ!!!!!01-2,X
224100                 LDA    #0
224200                 STA    IQQ!!!!!01-1,X
224300                 JMP    .L000235
224400        .L000236 EQU    *
224500        ;        DO 2102 IJJ2=1,2                                                    00003740
224600                 LDA    #0
224700                 STA    IJJ2!!01
224800                 LDA    #1
224900                 STA    IJJ2!!01+1
225000                 JMP    .L000242
225100        .L000240 EQU    *
225200                 LDA    IJJ2!!01+1
225300                 CLC
225400                 ADC    #1
225500                 STA    IJJ2!!01+1
225600                 LDA    IJJ2!!01
225700                 ADC    #0
225800                 STA    IJJ2!!01
225900                 LDA    #2
226000                 CMP    IJJ2!!01+1
226100                 LDA    #0
226200                 SBC    IJJ2!!01
226300                 BMI    .L000241
226400        .L000242 EQU    *
226500        ;        DO 2100 I = 1,21                                                    00003750
226600                 LDA    #0
226700                 STA    I!!!!!01
226800                 LDA    #1
226900                 STA    I!!!!!01+1
227000                 JMP    .L000247
227100        .L000245 EQU    *
227200                 LDA    I!!!!!01+1
227300                 CLC
227400                 ADC    #1
227500                 STA    I!!!!!01+1
227600                 LDA    I!!!!!01
227700                 ADC    #0
227800                 STA    I!!!!!01
227900                 LDA    #21
228000                 CMP    I!!!!!01+1
228100                 LDA    #0
228200                 SBC    I!!!!!01
```

```
228300          BMI      .L000246
228400  .L000247 EQU      *
228500  ;        DO 2100 IJJ1=1,21                              00003760
228600          LDA      #0
228700          STA      IJJ1!!01
228800          LDA      #1
228900          STA      IJJ1!!01+1
229000          JMP      .L000252
229100  .L000250 EQU      *
229200          LDA      IJJ1!!01+1
229300          CLC
229400          ADC      #1
229500          STA      IJJ1!!01+1
229600          LDA      IJJ1!!01
229700          ADC      #0
229800          STA      IJJ1!!01
229900          LDA      #21
230000          CMP      IJJ1!!01+1
230100          LDA      #0
230200          SBC      IJJ1!!01
230300          BMI      .L000251
230400  .L000252 EQU      *
230500  ;   2100 IDX=IJJ1*21+IJJ2+1                             00003769
230600  .L000249 EQU      *
230700  .MIMUL   SET      1
230800          JSR      .IMUL
230900          .BYTE    5
231000          .WORD    IJJ1!!01,.C000005
231100          .WORD    .T000018
231200  .MIMUL   SET      1
231300          JSR      .IMUL
231400          .BYTE    7
231500          .WORD    .T000018,IJJ2!!01
231600          .WORD    .T000019
231700          LDA      .T000019+1
231800          CLC
231900          ADC      I!!!!!!01+1
232000          STA      IDX!!01+1
232100          LDA      .T000019
232200          ADC      I!!!!!01
232300          STA      IDX!!01
232400          JMP      .L000250
232500  .L000251 EQU      *
232600          JMP      .L000245
232700  .L000246 EQU      *
232800  ;        IRANGE(IDX)=0                                  00003770
232900          LDA      IDX!!!01+1
233000          ASL      A
233100          STA      .T000007
233200          LDA      #0
233300          LDX      .T000007
233400          STA      IRANGE01-2,X
233500          LDA      #0
233600          STA      IRANGE01-1,X
233700  ;       DO 2101 IJJ1=1,51                               00003780
233800          LDA      #0
233900          STA      IJJ1!!01
234000          LDA      #1
234100          STA      IJJ1!!01+1
234200          JMP      .L000257
234300  .L000254 EQU      *
234400          LDA      IJJ1!!01+1
234500          CLC
234600          ADC      #1
234700          STA      IJJ1!!01+1
234800          LDA      IJJ1!!01
234900          ADC      #0
235000          STA      IJJ1!!01
235100          LDA      #51
235200          CMP      IJJ1!!01+1
235300          LDA      #0
235400          SBC      IJJ1!!01
235500          BMI      .L000255
235600  .L000257 EQU      *
235700  ;   2101 IRANG2(IJJ1*2+IJJ2)=0                          00003790
235800  .L000259 EQU      *
235900  .MIMUL   SET      1
236000          JSR      .IMUL
236100          .BYTE    5
236200          .WORD    IJJ1!!01,.C000056
236300          .WORD    .T000018
```

```
236400              LDA     .T000018+1
236500              CLC
236600              ADC     IJJ2!!01+1
236700              ASL     A
236800              STA     .T000007
236900              LDA     #0
237000              LDX     .T000007
237100              STA     IRANG201-2,X
237200              LDA     #0
237300              STA     IRANG201-1,X
237400              JMP     .L000254
237500     .L000255 EQU     *
237600     ;   2102 CONTINUE                                    00003800
237700     .L000244 EQU     *
237800              JMP     .L000240
237900     .L000241 EQU     *
238000     ;        DO 220 J2=1,J                               00003810
238100              LDA     #0
238200              STA     J2!!!01
238300              LDA     #1
238400              STA     J2!!!01+1
238500              JMP     .L000262
238600     .L000260 EQU     *
238700              LDA     J2!!!01+1
238800              CLC
238900              ADC     #1
239000              STA     J2!!!01+1
239100              LDA     J2!!!01
239200              ADC     #0
239300              STA     J2!!!01
239400              LDA     J!!!!01+1
239500              CMP     J2!!!01+1
239600              LDA     J!!!!01
239700              SBC     J2!!!01
239800              BMI     .L000261
239900     .L000262 EQU     *
240000     ;        DO 220 I=1,21                               00003820
240100              LDA     #0
240200              STA     I!!!!!01
240300              LDA     #1
240400              STA     I!!!!!01+1
240500              JMP     .L000267
240600     .L000265 EQU     *
240700              LDA     I!!!!!01+1
240800              CLC
240900              ADC     #1
241000              STA     I!!!!!01+1
241100              LDA     I!!!!!01
241200              ADC     #0
241300              STA     I!!!!!01
241400              LDA     #21
241500              CMP     I!!!!!01+1
241600              LDA     #0
241700              SBC     I!!!!!01
241800              BMI     .L000266
241900     .L000267 EQU     *
242000     ;        SUMC(I*2+J2)=0.0                            00003830
242100     .MIMUL   SET     1
242200              JSR     .IMUL
242300              .BYTE   5
242400              .WORD   I!!!!!01,.C000056
242500              .WORD   .T000018
242600              LDA     .T000018+1
242700              CLC
242800              ADC     J2!!!01+1
242900              STA     .T000019
243000              LDA     .T000019
243100              ASL     A
243200              ASL     A
243300              CLC
243400              ADC     #(SUMC!!01-4) MOD .M
243500              STA     .T000033
243600              LDA     #0
243700              ADC     #(SUMC!!01-4)/256
243800              STA     .T000033+1
243900     .MFLTASG SET     1
244000              JSR     .FLTASGN
244100              .BYTE   0
244200              .WORD   .C000269
244300              .WORD   -.T000033
244400     ;   220 CONTINUE                                     00003840
```

```
244500          .L000264 EQU    *
244600                   JMP    .L000265
244700          .L000266 EQU    *
244800                   JMP    .L000260
244900          .L000261 EQU    *
245000          ;        CNT=0                                                                              00003850
245100                   LDA    #0
245200                   STA    CNT!!!01
245300                   LDA    #0
245400                   STA    CNT!!!01+1
245500          ;        MACNT=0                                                                            00003860
245600                   LDA    #0
245700                   STA    MACNT!01
245800                   LDA    #0
245900                   STA    MACNT!01+1
246000          ;        MSCNT=0                                                                            00003870
246100                   LDA    #0
246200                   STA    MSCNT!01
246300                   LDA    #0
246400                   STA    MSCNT!01+1
246500          ;        MTCNT=0                                                                            00003880
246600                   LDA    #0
246700                   STA    MTCNT!01
246800                   LDA    #0
246900                   STA    MTCNT!01+1
247000          ;        M=1                                                                                00003890
247100                   LDA    #0
247200                   STA    M!!!!01
247300                   LDA    #1
247400                   STA    M!!!!01+1
247500          ;    230 M=M+1                                                                              00003900
247600          .L000270 EQU    *
247700                   LDA    M!!!!01+1
247800                   CLC
247900                   ADC    #1
248000                   STA    M!!!!01+1
248100                   LDA    M!!!!01
248200                   ADC    #0
248300                   STA    M!!!!01
248400          ;        MACNT=MACNT+1                                                                      00003910
248500                   LDA    MACNT!01+1
248600                   CLC
248700                   ADC    #1
248800                   STA    MACNT!01+1
248900                   LDA    MACNT!01
249000                   ADC    #0
249100                   STA    MACNT!01
249200          ;        RSF=TOT-SX(M-1)                                                                    00003920
249300                   LDA    M!!!!01+1
249400                   SEC
249500                   SBC    #1
249600          ; C      CHECK REMAINING FRACTION IS AT LEAST MINIMUM VALUE FOR X(M00003930
249700                   ASL    A
249800                   STA    .T000007
249900                   LDA    TOT!!!01+1
250000                   SEC
250100                   LDX    .T000007
250200                   SBC    SX!!!01-1,X
250300                   STA    RSF!!!01+1
250400                   LDA    TOT!!!01
250500                   SBC    SX!!!01-2,X
250600                   STA    RSF!!!01
250700          ;        IF (XA(M) .GT. RSF) GO TO 310                                                      00003940
250800                   LDA    M!!!!01+1
250900                   ASL    A
251000                   STA    .T000018
251100                   LDA    RSF!!!01+1
251200                   LDX    .T000018
251300                   CMP    XA!!!01-1,X
251400                   LDA    RSF!!!01
251500                   SBC    XA!!!01-2,X
251600                   BMI    .L000272
251700                   JMP    .L000271
251800          .L000272 EQU    *
251900                   JMP    .L000273
252000          ..L000271 EQU   *
252100          ; C      *************LINEAR CONSTRAINTS*************                                      00003950
252200          ; C      IF (J .EQ. 0) GO TO 250                                                            00003960
252300          ; C      DO 240 J2=1,J                                                                      00003970
252400          ; C      RSC(J2)=SUMC(M-1,J2)+C(M,J2)*XA(M)                                                 00003980
252500          ; C      IF (RSC(J2) .GT. U(J2)) GO TO 310                                                  00003990
```

```
252600    ; C 240 CONTINUE                                                          00004000
252700    ; C 250 CONTINUE                                                          00004010
252800    ; C           *****************************************                   00004020
252900    ; C           MINIMUM VALUE LESS THAN RESIDUAL FRACTION - CHECK FOR        00004030
253000    ; C           LAST VARIABLE                                                00004040
253100    ;         IF (M .GE. N) GO TO 270                                          00004050
253200              LDA     M!!!!!01+1
253300              CMP     N!!!!!01+1
253400              LDA     M!!!!!01
253500              SBC     N!!!!!01
253600              BMI     .L000274
253700              JMP     .L000276
253800    .L000274  EQU     *
253900    ;         X(M)=XA(M)                                                       00004060
254000              LDA     M!!!!!01+1
254100              ASL     A
254200              STA     .T000007
254300              LDA     M!!!!!01+1
254400              ASL     A
254500              TAX
254600              LDA     XA!!!!01-2,X
254700              LDY     .T000007
254800              STA     X!!!!!01-2,Y
254900              LDA     XA!!!!01-1,X
255000              STA     X!!!!!01-1,Y
255100    ;         SX(M)=X(M)+SX(M-1)                                               00004070
255200              LDA     M!!!!!01+1
255300              SEC
255400              SBC     #1
255500    ; C           ***************LINEAR CONSTRAINTS***************             00004080
255600    ; C       IF (J .EQ. 0) GO TO 230                                          00004090
255700    ; C       DO 260 J2=1,J                                                    00004100
255800    ; C           SUMC(M,J2)=RSC(J2)                                           00004110
255900    ; C 260 CONTINUE                                                           00004120
256000    ; C           *****************************************                   00004130
256100              STA     .T000018
256200              LDA     M!!!!!01+1
256300              ASL     A
256400              STA     .T000007
256500              LDA     .T000018
256600              ASL     A
256700              STA     .T000018
256800              LDA     M!!!!!01+1
256900              ASL     A
257000              TAX
257100              LDA     X!!!!!01-1,X
257200              CLC
257300              LDY     .T000018
257400              ADC     SX!!!!01-1,Y
257500              STX     .T000018
257600              LDX     .T000007
257700              STA     SX!!!!01-1,Y
257800              STX     .T000007
257900              LDX     .T000018
258000              LDA     X!!!!!01-2,X
258100              ADC     SX!!!!01-2,Y
258200              LDX     .T000007
258300              STA     SX!!!!01-2,X
258400    ;         GO TO 230                                                        00004140
258500              JMP     .L000270
258600    ; C           LAST VARIABLE - CHECK MAXIMUM VALUE                          00004150
258700    ;     270 IF (RSF .GT. XB(M)) GO TO 300                                    00004160
258800    .L000276  EQU     *
258900              LDA     M!!!!!01+1
259000              ASL     A
259100              TAX
259200              LDA     XB!!!!01-1,X
259300              CMP     RSF!!!01+1
259400              LDA     XB!!!!01-2,X
259500              SBC     RSF!!!01
259600              BMI     .L000278
259700              JMP     .L000277
259800    .L000278  EQU     *
259900              JMP     .L000279
260000    .L000277  EQU     *
260100    ; C           ***************LINEAR CONSTRAINTS***************             00004170
260200    ; C       IF (J .EQ. 0) GO TO 290                                          00004180
260300    ; C       DO 280 J2=1,J                                                    00004190
260400    ; C       IF (SUMC(M-1,J2)+RSF*C(M,J2) .LT. L(J2)) GO TO 300               00004200
260500    ; C 280 CONTINUE                                                           00004210
260600    ; C 290 CONTINUE                                                           00004220
```

```
260700    ; C         ************************************************      00004230
260800    ; C             MAXIMUM VALUE NOT EXCEEDED - SET ACTUAL VALUE       00004240
260900    ;           X(M)=RSF                                                00004250
261000                LDA    M!!!!!01+1
261100                ASL    A
261200                STA    .T000007
261300                LDA    RSF!!!01
261400                LDX    .T000007
261500                STA    X!!!!!01-2,X
261600                LDA    RSF!!!01+1
261700                STA    X!!!!!01-1,X
261800    ;           GO TO 370                                               00004260
261900                JMP    .L000280
262000    ; C             MAXIMUM VALUE EXCEEDED - DROP BACK TO INCREMENT PREVIOUS  00004270
262100    ; C             VARIABLE                                            00004280
262200    ;           300 GO TO 320                                           00004290
262300    .L000279 EQU   *
262400                JMP    .L000281
262500    ; C             REMAINING FRACTION LESS THAN MINIMUM VALUE OF VARIABLE   00004300
262600    ; C             DROP BACK TO SECOND PREVIOUS VARIABLE FOR POSSIBLE INCREME 00004310
262700    ;           310 M=M-2                                               00004320
262800    .L000273 EQU   *
262900                LDA    M!!!!!01+1
263000                SEC
263100                SBC    #2
263200                STA    M!!!!!01+1
263300                LDA    M!!!!!01
263400                SBC    #0
263500                STA    M!!!!!01
263600    ;           GO TO 330                                               00004330
263700                JMP    .L000282
263800    ;           320 M=M-1                                               00004340
263900    .L000281 EQU   *
264000                LDA    M!!!!!01+1
264100                SEC
264200                SBC    #1
264300                STA    M!!!!!01+1
264400                LDA    M!!!!!01
264500                SBC    #0
264600                STA    M!!!!!01
264700    ;           330 MSCNT=MSCNT+1                                       00004350
264800    .L000282 EQU   *
264900    ; C             CHECK FOR COMPLETION                                00004360
265000                LDA    MSCNT!01+1
265100                CLC
265200                ADC    #1
265300                STA    MSCNT!01+1
265400                LDA    MSCNT!01
265500                ADC    #0
265600                STA    MSCNT!01
265700    ;           IF (M .LE. 1) GO TO 400                                 00004370
265800                LDA    #1
265900                CMP    M!!!!!01+1
266000                LDA    #0
266100                SBC    M!!!!!01
266200                BMI    .L000283
266300                JMP    .L000196
266400    .L000283 EQU   *
266500    ; C             INCREMENT PREVIOUS VARIABLES                        00004380
266600    ;           RSF=TOT-SX(M-1)                                         00004390
266700                LDA    M!!!!!01+1
266800                SEC
266900                SBC    #1
267000                ASL    A
267100                STA    .T000007
267200                LDA    TOT!!!01+1
267300                SEC
267400                LDX    .T000007
267500                SBC    SX!!!!01-1,X
267600                STA    RSF!!!01+1
267700                LDA    TOT!!!01
267800                SBC    SX!!!!01-2,X
267900                STA    RSF!!!01
268000    ;           HOLD=X(M)+XINC(M)                                       00004400
268100    ; C             CAN VARIABLES BE INCREMENTED                        00004410
268200                LDA    M!!!!!01+1
268300                ASL    A
268400                STA    .T000007
268500                LDA    M!!!!!01+1
268600                ASL    A
268700                TAX
```

```
268800              LDA    X!!!!!01-1,X
268900              CLC
269000              LDY    .T000007
269100              ADC    XINC!!01-1,Y
269200              STA    HOLD!!01+1
269300              LDA    X!!!!!01-2,X
269400              ADC    XINC!!01-2,Y
269500              STA    HOLD!!01
269600        ;     IF (HOLD .GT. MIN0(XB(M),RSF)) GO TO 320        00004420
269700              LDA    #RSF!!01 MOD .M
269800              STA    MIN0.002
269900              LDA    #RSF!!01/256
270000              STA    MIN0.002+1
270100              LDA    M!!!!!01+1
270200              ASL    A
270300              CLC
270400              ADC    #(XB!!!01-2) MOD .M
270500              STA    MIN0.001
270600              LDA    #0
270700              ADC    #(XB!!!01-2)/256
270800              STA    MIN0.001+1
270900              LDA    #.T000018 MOD .M
271000              STA    MIN0.000
271100              LDA    #.T000018/256
271200              STA    MIN0.000+1
271300              JSR    MIN0
271400              LDA    .T000018+1
271500              CMP    HOLD!!01+1
271600              LDA    .T000018
271700              SBC    HOLD!!01
271800              BMI    .L000286
271900              JMP    .L000285
272000       .L000286 EQU   *
272100              JMP    .L000281
272200       .L000285 EQU   *
272300        ; C  *************LINEAR CONSTRAINTS**************   00004430
272400        ; C   IF (J .EQ. 0) GO TO 350                         00004440
272500        ; C   DO 340 J2=1,J                                   00004450
272600        ; C   RSC(J2)=SUMC(M-1,J2)+C(M,J2)*HOLD               00004460
272700        ; C   IF (RSC(J2) .GT. U(J2)) GO TO 320               00004470
272800        ; C 340 CONTINUE                                      00004480
272900        ; C 350 CONTINUE                                      00004490
273000        ; C                                                   00004500
273100        ; C      DOES NOT EXCEED MAXIMUM VALUE OR REMAINING FRACTION  00004510
273200        ;      X(M)=HOLD                                      00004520
273300              LDA    M!!!!!01+1
273400              ASL    A
273500              STA    .T000007
273600              LDA    HOLD!!01
273700              LDX    .T000007
273800              STA    X!!!!!01-2,X
273900              LDA    HOLD!!01+1
274000              STA    X!!!!!01-1,X
274100        ;      SX(M)=SX(M)+XINC(M)                            00004530
274200        ; C  *************LINEAR CONSTRAINTS**************   00004540
274300        ; C   IF (J .EQ. 0) GO TO 230                         00004550
274400        ; C   DO 360 J2=1,J                                   00004560
274500        ; C   SUMC(M,J2)=RSC(J2)                              00004570
274600        ; C 360 CONTINUE                                      00004580
274700              LDA    M!!!!!01+1
274800              ASL    A
274900              STA    .T000007
275000              LDA    M!!!!!01+1
275100              ASL    A
275200              STA    .T000018
275300              LDA    M!!!!!01+1
275400              ASL    A
275500              TAX
275600              LDA    SX!!!01-1,X
275800              LDY    .T000018
275900              ADC    XINC!!01-1,Y
276000              STX    .T000018
276100              LDX    .T000007
276200              STA    SX!!!01-1,X
276300              STX    .T000007
276400              LDX    .T000018
276500              LDA    SX!!!01-2,X
276600              ADC    XINC!!01-2,Y
276700              LDX    .T000007
276800              STA    SX!!!01-2,X
276900        ;      GO TO 230                                      00004590
```

```
277000              JMP     .L000270
277100      ; C         DISPLAY COMBINATION                              00004600
277200      ;     370 CONTINUE                                           00004610
277300      .L000280 EQU    *
277400      ;       IER=0                                                00004620
277500              LDA     #0
277600              STA     IER!!!01
277700              LDA     #0
277800              STA     IER!!!01+1
277900      ;       IF(ICONS .EQ. 0) GO TO 371                           00004630
278000              LDA     ICONS!01+1
278100              CMP     #0
278200              BNE     .L000287
278300              LDA     ICONS!01
278400              CMP     #0
278500              BNE     .L000287
278600              JMP     .L000289
278700      .L000287 EQU    *
278800      ;       ISP = 0                                              00004640
278900      ; C   SPECIAL CONSTRAINT TESTING SECTION                     00004650
279000              LDA     #0
279100              STA     ISP!!!01
279200              LDA     #0
279300              STA     ISP!!!01+1
279400      ;       CALL SPEC(X,NUM,ISP,NUMSP,N)                         00004660
279500              LDA     #N!!!!!01 MOD .M
279600              STA     SPEC.005
279700              LDA     #N!!!!!01/256
279800              STA     SPEC.005+1
279900              LDA     #NUMSP!01 MOD .M
280000              STA     SPEC.004
280100              LDA     #NUMSP!01/256
280200              STA     SPEC.004+1
280300              LDA     #ISP!!!01 MOD .M
280400              STA     SPEC.003
280500              LDA     #ISP!!!01/256
280600              STA     SPEC.003+1
280700              LDA     #NUM!!!01 MOD .M
280800              STA     SPEC.002
280900              LDA     #NUM!!!01/256
281000              STA     SPEC.002+1
281100              LDA     #X!!!!!01 MOD .M
281200              STA     SPEC.001
281300              LDA     #X!!!!!01/256
281400              STA     SPEC.001+1
281500              JSR     SPEC
281600      ;       IF(ISP .NE. 0) GO TO 320                             00004670
281800              CMP     #0
281900              BNE     .L000291
282000              LDA     ISP!!!01
282100              CMP     #0
282200              BEQ     .L000290
282300      .L000291 EQU    *
282400              JMP     .L000281
282500      .L000290 EQU    *
282600      ;     371 CONTINUE                                           00004680
282700      .L000289 EQU    *
282800      ;       MTCNT=MTCNT + 1                                      00004690
282900              LDA     MTCNT!01+1
283000              CLC
283100              ADC     #1
283200              STA     MTCNT!01+1
283300              LDA     MTCNT!01
283400              ADC     #0
283500              STA     MTCNT!01
283600      ;       DO 198 MM = 2,NZERO                                  00004700
283700              LDA     #0
283800              STA     MM!!!01
283900              LDA     #2
284000              STA     MM!!!01+1
284100              JMP     .L000294
284200      .L000292 EQU    *
284300              LDA     MM!!!01+1
284400              CLC
284500              ADC     #1
284600              STA     MM!!!01+1
284700              LDA     MM!!!01
284800              ADC     #0
284900              STA     MM!!!01
285000              LDA     NZERO!01+1
285100              CMP     MM!!!01+1
285200              LDA     NZERO!01
```

```
285300           SBC    MM!!!!01
285400           BMI    .L000293
285500  .L000294 EQU    *
285600  ;        IQ = IQQ(MM)                                          00004710
285700           LDA    MM!!!!01+1
285800           ASL    A
285900           TAX
286000           LDA    IQQ!!!01-2,X
286100           STA    IQ!!!!01
286200           LDA    IQQ!!!01-1,X
286300           STA    IQ!!!!01+1
286400  ;        IF (IQ .EQ. 0) GO TO 194                              00004720
286500           LDA    IQ!!!!01+1
286600           CMP    #0
286700           BNE    .L000297
286800           LDA    IQ!!!!01
286900           CMP    #0
287000           BNE    .L000297
287100           JMP    .L000299
287200  .L000297 EQU    *
287300  ;        DO 197 IQM = 1,IQ                                     00004730
287400           LDA    #0
287500           STA    IQM!!!01
287600           LDA    #1
287700           STA    IQM!!!01+1
287800           JMP    .L000302
287900  .L000300 EQU    *
288000           LDA    IQM!!!01+1
288100           CLC
288200           ADC    #1
288300           STA    IQM!!!01+1
288400           LDA    IQM!!!01
288500           ADC    #0
288600           STA    IQM!!!01
288700           LDA    IQ!!!!01+1
288800           CMP    IQM!!!01+1
288900           LDA    IQ!!!!01
289000           SBC    IQM!!!01
289100           BMI    .L000301
289200  .L000302 EQU    *
289300  ;        IDX=IQM*21+MM                                         00004739
289400  .MIMUL   SET    1
289500           JSR    .IMUL
289600           .BYTE  5
289700           .WORD  IQM!!!01,.C000005
289800           .WORD  .T000018
289900           LDA    .T000018+1
290000           CLC
290100           ADC    MM!!!!01+1
290200           STA    IDX!!!01+1
290300           LDA    .T000018
290400           ADC    MM!!!!01
290500           STA    IDX!!!01
290600  ;        MQ=IRANGE(IDX)                                        00004740
290700           LDA    IDX!!!01+1
290800           ASL    A
290900           TAX
291000           LDA    IRANGE01-2,X
291100           STA    MQ!!!!01
291200           LDA    IRANGE01-1,X
291300           STA    MQ!!!!01+1
291400  ;        IF (X(MM) .EQ. MQ) GO TO 195                          00004750
291500           LDA    MM!!!!01+1
291600           ASL    A
291700           TAX
291800           LDA    X!!!!!01-1,X
291900           CMP    MQ!!!!01+1
292000           BNE    .L000305
292100           LDA    X!!!!!01-2,X
292200           CMP    MQ!!!!01
292300           BNE    .L000305
292400           JMP    .L000307
292500  .L000305 EQU    *
292600  ;   197  CONTINUE                                              00004760
292700  .L000304 EQU    *
292800           JMP    .L000300
292900  .L000301 EQU    *
293000  ;   194  IQ = IQ + 1                                           00004770
293100  .L000299 EQU    *
293200           LDA    IQ!!!!01+1
293300           CLC
```

```
293400             ADC     #1
293500             STA     IQ!!!!01+1
293600             LDA     IQ!!!!01
293700             ADC     #0
293800             STA     IQ!!!!01
293900      ;      IQQ(MM) = IQ                                              00004780
294000             LDA     MM!!!!01+1
294100             ASL     A
294200             STA     .T000007
294300             LDA     IQ!!!!01
294400             LDX     .T000007
294500             STA     IQQ!!!01-2,X
294600             LDA     IQ!!!!01+1
294700             STA     IQQ!!!01-1,X
294800      ;      IQM = IQ                                                  00004790
294900             LDA     IQ!!!!01
295000             STA     IQM!!!01
295100             LDA     IQ!!!!01+1
295200             STA     IQM!!!01+1
295300      ;      IDX=IQ*21+MM                                              00004799
295400   .MIMUL    SET     1
295500             JSR     .IMUL
295600             .BYTE   5
295700             .WORD   IQ!!!!01,.C000005
295800             .WORD   .T000018
295900             LDA     .T000018+1
296000             CLC
296100             ADC     MM!!!!01+1
296200             STA     IDX!!!01+1
296300             LDA     .T000018
296400             ADC     MM!!!01
296500             STA     IDX!!!01
296600      ;      IRANGE(IDX)=X(MM)                                         00004800
296700             LDA     IDX!!!01+1
296800             ASL     A
296900             STA     .T000007
297000             LDA     MM!!!!01+1
297100             ASL     A
297200             TAX
297300             LDA     X!!!!!01-2,X
297400             LDY     .T000007
297500             STA     IRANGE01-2,Y
297600             LDA     X!!!!!01-1,X
297700             STA     IRANGE01-1,Y
297800      ;  195 IDX=IQM*2+MM                                              00004809
297900   .L000307 EQU      *
298000   .MIMUL    SET     1
298100             JSR     .IMUL
298200             .BYTE   5
298300             .WORD   IQM!!!01,.C000308
298400             .WORD   .T000018
298500             LDA     .T000018+1
298600             CLC
298700             ADC     MM!!!!01+1
298800             STA     IDX!!!01+1
298900             LDA     .T000018
299000             ADC     MM!!!01
299100             STA     IDX!!!01
299200      ;      IRANGE(IDX)=IRANGE(IDX)+1                                 00004810
299300             LDA     IDX!!!01+1
299400             ASL     A
299500             STA     .T000007
299600             LDA     IDX!!!01+1
299700             TAX
299900             LDA     IRANGE01-1,X
300000             CLC
300100             ADC     #1
300200             LDY     .T000007
300300             STA     IRANGE01-1,Y
300400             LDA     IRANGE01-2,X
300500             ADC     #0
300600             STA     IRANGE01-2,Y
300700      ;  198 CONTINUE                                                  00004820
300800   .L000296 EQU      *
300900             JMP     .L000292
301000   .L000293 EQU      *
301100      ;      IQ = IQQ(N)                                               00004830
301200             LDA     N!!!!!01+1
301300             ASL     A
301400             TAX
301500             LDA     IQQ!!!01-2,X
301600             STA     IQ!!!01
```

```
301700            LDA     IQ!!!!01-1,X
301800            STA     IQ!!!!01+1
301900    ;       IF (IQ .EQ. 0) GO TO 1944                        00004840
302000            LDA     IQ!!!!01+1
302100            CMP     #0
302200            BNE     .L000309
302300            LDA     IQ!!!!01
302400            CMP     #0
302500            BNE     .L000309
302600            JMP     .L000311
302700    .L000309 EQU    *
302800    ;       DO 1945 IQM = 1,IQ                               00004850
302900            LDA     #0
303000            STA     IQM!!!01
303100            LDA     #1
303200            STA     IQM!!!01+1
303300            JMP     .L000314
303400    .L000312 EQU    *
303500            LDA     IQM!!!01+1
303600            CLC
303700            ADC     #1
303800            STA     IQM!!!01+1
303900            LDA     IQM!!!01
304000            ADC     #0
304100            STA     IQM!!!01
304200            LDA     IQ!!!!01+1
304300            CMP     IQM!!!01+1
304400            LDA     IQ!!!!01
304500            SBC     IQM!!!01
304600            BMI     .L000313
304700    .L000314 EQU    *
304800    ;       MQ=IRANG2(IQM*2+1)                               00004860
304900    .MIMUL  SET     1
305000            JSR     .IMUL
305100            .BYTE   5
305200            .AORD   IQM!!!01,.C000056
305300            .AORD   .T000018
305400            LDA     .T000018+1
305500            CLC
305600            ADC     #1
305800            TAX
305900            LDA     IRANG201-2,X
306000            STA     MQ!!!!01
306100            LDA     IRANG201-1,X
306200            STA     MQ!!!!01+1
306300    ;       IF (X(N) .EQ. MQ) GO TO 1946                     00004870
306400            LDA     N!!!!01+1
306500            ASL     A
306600            TAX
306700            LDA     X!!!!01-1,X
306800            CMP     MQ!!!!01+1
306900            BNE     .L000317
307000            LDA     X!!!!01-2,X
307100            CMP     MQ!!!!01
307200            BNE     .L000317
307300            JMP     .L000319
307400    .L000317 EQU    *
307500    ;       1945 CONTINUE                                    00004880
307600    .L000316 EQU    *
307700            JMP     .L000312
307800    .L000313 EQU    *
307900    ;       1944 IQ = IQ + 1                                 00004890
308000    .L000311 EQU    *
308100            LDA     IQ!!!!01+1
308200            CLC
308300            ADC     #1
308400            STA     IQ!!!!01+1
308500            LDA     IQ!!!!01
308600            ADC     #0
308700            STA     IQ!!!!01
308800    ;       IQQ(N) = IQ                                      00004900
308900            LDA     N!!!!01+1
309000            ASL     A
309100            STA     .T000007
309200            LDA     IQ!!!!01
309300            LDX     .T000007
309400            STA     IQQ!!01-2,X
309500            LDA     IQ!!!!01+1
309600            STA     IQQ!!01-1,X
309700    ;       IQM = IQ                                         00004910
309800            LDA     IQ!!!!01
```

```
309900            STA    IQM!!!01
310000            LDA    IQ!!!!01+1
310100            STA    IQM!!!01+1
310200     ;      IRANG2(IQ*2+1)=X(N)                              00004920
310300   .MIMUL   SET    1
310400            JSR    .IMUL
310500            .BYTE  5
310600            .WORD  IQ!!!!01,.C000056
310700            .WORD  .T000018
310800            LDA    .T000018+1
310900            CLC
311000            ADC    #1
311100            ASL    A
311200            STA    .T000007
311300            LDA    N!!!!01+1
311400            ASL    A
311500            TAX
311600            LDA    X!!!!01-2,X
                  LDY    .T000007
311800            STA    IRANG201-2,Y
311900            LDA    X!!!!01-1,X
312000            STA    IRANG201-1,Y
312100   ;   1946 IRANG2(IQM*2+2)=IRANG2(IQM*2+2)+1                0000493C
312200   .L000319 EQU    *
312300   .MIMUL   SET    1
312400            JSR    .IMUL
312500            .BYTE  5
312600            .WORD  IQM!!!01,.C000056
312700            .WORD  .T000018
312800            LDA    .T000018+1
312900            CLC
313000            ADC    #2
313100            STA    .T000019
313200   .MIMUL   SET    1
313300            JSR    .IMUL
313400            .BYTE  5
313500            .WORD  IQM!!!01,.C000056
313600            .WORD  .T000018
313700            LDA    .T000018+1
313800            CLC
313900            ADC    #2
314000            STA    .T000033
314100            LDA    .T000019
314200            ASL    A
314300            STA    .T000007
314400            LDA    .T000033
314500            ASL    A
314600            TAX
314700            LDA    IRANG201-1,X
314800            CLC
314900            ADC    #1
315000            LDY    .T000007
315100            STA    IRANG201-1,Y
315200            LDA    IRANG201-2,X
315300            ADC    #0
315400            STA    IRANG201-2,Y
315500     ;      IF (IVPVS .EQ. 0) GO TO 380                      00004940
315600            LDA    IVPVS!01+1
315700            CMP    #0
315800            BNE    .L000320
315900            LDA    IVPVS!01
316000            CMP    #0
316100            BNE    .L000320
316200            JMP    .L000322
316300   .L000320 EQU    *
316400     ;      IF (IVPVS .EQ. 2 .OR. IVPVS .GT. 4) GO TO 2851   00004950
316500            LDA    #4
316600            CMP    IVPVS!01+1
316700            LDA    #0
316800            SBC    IVPVS!01
316900            BMI    .L000325
317000            LDA    #0
317100            BEQ    *+4
317200   .L000325 LDA    #80H
317300            STA    .T000018
317400            LDA    IVPVS!01+1
317500            CMP    #2
317600            BNE    .L000326
                  LDA    IVPVS!01
317800            CMP    #0
317900            BNE    .L000326
```

```
318000       .L000327 LDA     #80H
318100                BNE     *+4
318200       .L000326 LDA     #0
318300                ORA     .T000018
318400                ASL     A
318500                BCS     *+5
318600                JMP     .L000328
318700                JMP     .L000329
318800       .L000328 EQU     *
318900       ; C VOIGHT REUSS HILL BOUNDS                                                    00004960
319000       ;        CALL VPVS(N,X,K,G,P,AK,AG,VP,VS,RHO,VPUP,VPLO,VSUP,VSLO)                00004970
319100                LDA     #VSLO!!01 MOD .M
319200                STA     VPVS.014
319300                LDA     #VSLO!!01/256
319400                STA     VPVS.014+1
319500                LDA     #VSUP!!01 MOD .M
319600                STA     VPVS.013
319700                LDA     #VSUP!!01/256
319800                STA     VPVS.013+1
319900                LDA     #VPLO!!01 MOD .M
320000                STA     VPVS.012
320100                LDA     #VPLO!!01/256
320200                STA     VPVS.012+1
320300                LDA     #VPUP!!01 MOD .M
320400                STA     VPVS.011
320500                LDA     #VPUP!!01/256
320600                STA     VPVS.011+1
320700                LDA     #RHO!!01 MOD .M
320800                STA     VPVS.010
320900                LDA     #RHO!!01/256
321000                STA     VPVS.010+1
321100                LDA     #VS!!!01 MOD .M
321200                STA     VPVS.009
321300                LDA     #VS!!!01/256
321400                STA     VPVS.009+1
321500                LDA     #VP!!!01 MOD .M
321600                STA     VPVS.008
321700                LDA     #VP!!!01/256
321800                STA     VPVS.008+1
321900                LDA     #AG!!!01 MOD .M
322000                STA     VPVS.007
322100                LDA     #AG!!!01/256
322200                STA     VPVS.007+1
322300                LDA     #AK!!!01 MOD .M
322400                STA     VPVS.006
322500                LDA     #AK!!!01/256
322600                STA     VPVS.006+1
322700                LDA     #P!!!!01 MOD .M
322800                STA     VPVS.005
322900                LDA     #P!!!!01/256
323000                STA     VPVS.005+1
323100                LDA     #G!!!!01 MOD .M
323200                STA     VPVS.004
323300                LDA     #G!!!!01/256
323400                STA     VPVS.004+1
323500                LDA     #K!!!!01 MOD .M
323600                STA     VPVS.003
                      LDA     #K!!!!01/256
323800                STA     VPVS.003+1
323900                LDA     #X!!!!01 MOD .M
324000                STA     VPVS.002
324100                LDA     #X!!!!01/256
324200                STA     VPVS.002+1
324300                LDA     #N!!!!01 MOD .M
324400                STA     VPVS.001
324500                LDA     #N!!!!01/256
324600                STA     VPVS.001+1
324700                JSR     VPVS
324800       ;        GO TO 2854                                                              00004980
324900                JMP     .L000330
325000       ; C HASHIN SHTRIKMAN BOUNDS                                                      00004990
325100       ;   2851 CALL HASHIN(N,X,K,G,P,AK,AG,VP,VS,RHO,VPUP,VPLO,VSUP,VSLO)               00005000
325200       .L000329 EQU     *
325300                LDA     #VSLO!!01 MOD .M
325400                STA     HASHIN.4
325500                LDA     #VSLO!!01/256
325600                STA     HASHIN.4+1
325700                LDA     #VSUP!!01 MOD .M
325800                STA     HASHIN.3
325900                LDA     #VSUP!!01/256
326000                STA     HASHIN.3+1
```

```
326100          LDA     #VPLU!!01 MOD .M
326200          STA     HASHIN.2
326300          LDA     #VPLU!!01/256
326400          STA     HASHIN.2+1
326500          LDA     #VPUP!!01 MOD .M
326600          STA     HASHIN.1
326700          LDA     #VPUP!!01/256
326800          STA     HASHIN.1+1
326900          LDA     #RHO!!!01 MOD .M
327000          STA     HASHIN.0
327100          LDA     #RHO!!!01/256
327200          STA     HASHIN.0+1
327300          LDA     #VS!!!!01 MOD .M
327400          STA     HASHIN.9
327500          LDA     #VS!!!!01/256
327600          STA     HASHIN.9+1
327700          LDA     #VP!!!!01 MOD .M
327800          STA     HASHIN.8
327900          LDA     #VP!!!!01/256
328000          STA     HASHIN.8+1
328100          LDA     #AG!!!!01 MOD .M
328200          STA     HASHIN.7
328300          LDA     #AG!!!!01/256
328400          STA     HASHIN.7+1
328500          LDA     #AK!!!!01 MOD .M
328600          STA     HASHIN.6
328700          LDA     #AK!!!!01/256
328800          STA     HASHIN.6+1
328900          LDA     #P!!!!!01 MOD .M
329000          STA     HASHIN.5
329100          LDA     #P!!!!!01/256
329200          STA     HASHIN.5+1
329300          LDA     #G!!!!!01 MOD .M
329400          STA     HASHIN.4
329500          LDA     #G!!!!!01/256
329600          STA     HASHIN.4+1
329700          LDA     #K!!!!!01 MOD .M
329800          STA     HASHIN.3
329900          LDA     #K!!!!!01/256
330000          STA     HASHIN.3+1
330100          LDA     #X!!!!!01 MOD .M
330200          STA     HASHIN.2
330300          LDA     #X!!!!!01/256
330400          STA     HASHIN.2+1
330500          LDA     #N!!!!!01 MOD .M
330600          STA     HASHIN.1
330700          LDA     #N!!!!!01/256
330800          STA     HASHIN.1+1
330900          JSR     HASHIN
331000     ;    2854 IF (IVPVS .LT. 3) GO TO 2853                    00005010
331100  .L000330 EQU    *
331200          LDA     IVPVS!01+1
331300          CMP     #3
331400          LDA     IVPVS!01
331500          SBC     #0
331600          BMI     .L000333
331700          JMP     .L000332
331800  .L000333 EQU    *
331900          JMP     .L000334
332000  .L000332 EQU    *
332100     ;    IF (IVPVS .EQ. 3 .OR. IVPVS .EQ. 5 ) GO TO 2852      00005020
332200          LDA     IVPVS!01+1
332300          CMP     #5
332400          BNE     .L000336
332500          LDA     IVPVS!01
332600          CMP     #0
332700          BNE     .L000336
332800  .L000337 LDA    #80H
332900          BNE     *+4
333000  .L000336 LDA    #0
333100          STA     .T000018
333200          LDA     IVPVS!01+1
333300          CMP     #3
333400          BNE     .L000338
333500          LDA     IVPVS!01
333600          CMP     #0
333700          BNE     .L000338
333800  .L000339 LDA    #80H
333900          BNE     *+4
334000  .L000338 LDA    #0
334100          ORA     .T000018
```

```
334200              ASL   A
334300              BCS   *+5
334400              JMP   .L000340
334500              JMP   .L000341
334600    .L000340 EQU   *
334700    ;         VP = VPLO                                                    00005030
334800    .MFLTASG SET   1
334900              JSR   .FLTASGN
335000              .BYTE 0
335100              .WORD VPLO!!01
335200              .WORD VP!!!01
335300    ;         VS = VSLO                                                    00005040
335400    .MFLTASG SET   1
335500              JSR   .FLTASGN
335600              .BYTE 0
335700              .WORD VSLO!!01
335800              .WORD VS!!!01
335900    ;         GO TO 2853                                                   00005050
336000              JMP   .L000334
336100    ;   2852 VP = VPUP                                                     00005060
336200    .L000341 EQU   *
336300    .MFLTASG SET   1
336400              JSR   .FLTASGN
336500              .BYTE 0
336600              .WORD VPUP!!01
336700              .WORD VP!!!01
336800    ;         VS = VSLO                                                    00005070
336900    .MFLTASG SET   1
337000              JSR   .FLTASGN
337100              .BYTE 0
337200              .WORD VSLO!!01
337300              .WORD VS!!!01
337400    ;  2853 IF (VP .LT. VPMIN .OR. VP .GT. VPMAX) IER=1                    00005080
337500    .L000334 EQU   *
337600    .MFFGT   SET   1
337700              JSR   .FFGT
337800              .BYTE 0
337900              .WORD VP!!!01,VPMAX!01
338000              STA   .T000018
338100    .MFFLT   SET   1
338200              JSR   .FFLT
338300              .BYTE 0
338400              .WORD VP!!!01,VPMIN!01
338500              ORA   .T000018
338600              ASL   A
338700              BCS   *+5
338800              JMP   .L000342
338900              LDA   #0
339000              STA   IER!!!01
339100              LDA   #1
339200              STA   IER!!!01+1
339300    .L000342 EQU   *
339400    ;        IF (VS .LT. VSMIN .OR. VS .GT. VSMAX) IER=1                   00005090
339500    .MFFGT   SET   1
339600              JSR   .FFGT
339700              .BYTE 0
339800              .WORD VS!!!01,VSMAX!01
339900              STA   .T000018
340000    .MFFLT   SET   1
340100              JSR   .FFLT
340200              .BYTE 0
340300              .WORD VS!!!01,VSMIN!01
340400              ORA   .T000018
340500              ASL   A
340600              BCS   *+5
340700              JMP   .L000343
340800              LDA   #0
340900              STA   IER!!!01
341000              LDA   #1
341100              STA   IER!!!01+1
341200    .L000343 EQU   *
341300    ;        IF (IDEN .EQ. 1 .AND. (RHO .LT. DENMIN .OR. RHO .GT. DENMAX)) 00005100
341400    .MFFGT   SET   1
341500              JSR   .FFGT
341600              .BYTE 0
341700              STA   .T000019
341800              
341900    .MFFLT   SET   1
342000              JSR   .FFLT
342100              .BYTE 0
342200              .WORD RHO!!!01,DENMIN01
342300              ORA   .T000019
342400              STA   .T000033
```

```
342500            LDA   IDEN!!01+1
342600            CMP   #1
342700            BNE   .L000344
342800            LDA   IDEN!!01
342900            CMP   #0
343000            BNE   .L000344
343100   .L000345 LDA   #80H
343200            BNE   *+4
343300   .L000344 LDA   #0
343400   ;     1  IER = 1                                           00005110
343500            AND   .T000033
343600            ASL   A
343700            BCS   *+5
343800            JMP   .L000346
343900            LDA   #0
344000            STA   IER!!01
344100            LDA   #1
344200            STA   IER!!01+1
344300   .L000346 EQU   *
344400   ;        IF (IER .EQ. 1 .AND. IERFL .EQ. 0) GO TO 320      00005120
344500            LDA   IERFL!01+1
344600            CMP   #0
344700            BNE   .L000347
344800            LDA   IERFL!01
344900            CMP   #0
345000            BNE   .L000347
345100   .L000348 LDA   #80H
345200            BNE   *+4
345300   .L000347 LDA   #0
345400            STA   .T000018
345500            LDA   IER!!01+1
345600            CMP   #1
345700            BNE   .L000349
345800            LDA   IER!!01
345900            CMP   #0
346000            BNE   .L000349
346100   .L000350 LDA   #80H
346200            BNE   *+4
346300   .L000349 LDA   #0
346400            AND   .T000018
346500            ASL   A
346600            BCS   *+5
346700            JMP   .L000351
346800            JMP   .L000281
346900   .L000351 EQU   *
347000   ;        VP=VP/30.48                                        00005130
347100   .MFFDIV  SET   1
347200            JSR   .FFDIV
347300            .BYTE 0
347400            .WORD VP!!!01,.C000352
347500            .WORD VP!!!01
347600   ;        VS=VS/30.48                                        00005140
347700   .MFFDIV  SET   1
347800            JSR   .FFDIV
347900            .BYTE 0
348000            .WORD VS!!!01,.C000353
348100            .WORD VS!!!01
348200   ;        VPERR = (VPUP-VPLO)/60.96                          00005150
348300   .MFFSUB  SET   1
348400            JSR   .FFSUB
348500            .BYTE 0
348600            .WORD VPUP!!01,VPLO!!01
348700            .WORD .T000073
348800   .MFFDIV  SET   1
348900            JSR   .FFDIV
349000            .BYTE 0
349100            .WORD .T000073,.C000354
349200            .WORD VPERR!01
349300   ;        VSERR = (VSUP-VSLO)/60.96                          00005160
349400   .MFFSUB  SET   1
349500            JSR   .FFSUB
349600            .BYTE 0
349700            .WORD VSUP!!01,VSLO!!01
349800            .WORD .T000073
349900   .MFFDIV  SET   1
350000            JSR   .FFDIV
350100            .BYTE 0
350200            .WORD .T000073,.C000355
350300            .WORD VSERR!01
350400   ;        DVS=VS-VELS                                        00005170
350500   .MFFSUB  SET   1
```

```
350600              JSR     .FFSUB
350700              .BYTE   0
350800              .WORD   VS!!!!01,VELS!!01
350900              .WORD   DVS!!!01
351000      ;       DVP=VP-VELP                                                 00005180
351100      .MFFSUB SET     1
351200              JSR     .FFSUB
351300              .BYTE   0
351400              .WORD   VP!!!!01,VELP!!01
351500              .WORD   DVP!!!01
351600      ;       D=DVS*DVS+DVP*DVP                                           00005190
351700      .MFFMUL SET     1
351800              JSR     .FFMUL
351900              .BYTE   0
352000              .WORD   DVP!!!01,DVP!!!01
352100              .WORD   .T000079
352200      .MFFMUL SET     1
352300              JSR     .FFMUL
352400              .BYTE   0
352500              .WORD   DVS!!!01,DVS!!!01
352600              .WORD   .T000073
352700      .MFFADD SET     1
352800              JSR     .FFADD
352900              .BYTE   0
353000              .WORD   .T000073,.T000079
353100              .WORD   D!!!!!01
353200      ;       IF (IER .EQ. 0 .AND. IERFL .NE. 0) GO TO 375                00005200
353300              LDA     IERFL!01+1
353400              CMP     #0
353500              BNE     .L000357
353600              LDA     IERFL!01
353700              CMP     #0
353800              BEQ     .L000356
353900      .L000357 LDA    #80H
354000              BNE     *+4
354100      .L000356 LDA    #0
354200              STA     .T000018
354300              LDA     IER!!!01+1
354400              CMP     #0
354500              BNE     .L000358
354600              LDA     IER!!!01
354700              CMP     #0
354800              BNE     .L000358
354900      .L000359 LDA    #80H
355000              BNE     *+4
355100      .L000358 LDA    #0
355200              AND     .T000018
355300              ASL     A
355400              BCS     *+5
355500              JMP     .L000360
355600              JMP     .L000361
355700      .L000360 EQU    *
355800      ;       IF (D .GE. DSAV) GO TO 385                                  00005210
355900      .MFFGE  SET     1
356000              JSR     .FFGE
356100              .BYTE   0
356200              .WORD   D!!!!!01,DSAV!!01
356300              ASL     A
356400              BCS     *+5
356500              JMP     .L000362
356600              JMP     .L000363
356700      .L000362 EQU    *
356800      ;   375 IERFL = IER                                                 00005220
356900      .L000361 EQU    *
357000              LDA     IER!!!01
357100              STA     IERFL!01
357200              LDA     IER!!!01+1
357300              STA     IERFL!01+1
357400      ;       DSAV=D                                                      00005230
357500      .MFLTASG SET    1
357600              JSR     .FLTASGN
357700              .BYTE   0
357800              .WORD   D!!!!!01
357900              .WORD   DSAV!!01
358000      ;       DENCL = RHO                                                 00005240
358100      .MFLTASG SET    1
358200              JSR     .FLTASGN
358300              .BYTE   0
358400              .WORD   RHO!!!01
358500              .WORD   DENCL!01
358600      ;       DO 20 I=2,N                                                 00005250
```

```
358700              LDA     #0
358800              STA     I!!!!!!01
358900              LDA     #2
359000              STA     I!!!!!!01+1
359100              JMP     .L000366
359200   .L000364   EQU     *
359300              LDA     I!!!!!!01+1
359400              CLC
359500              ADC     #1
359600              STA     I!!!!!!01+1
359700              LDA     I!!!!!!01
359800              ADC     #0
359900              STA     I!!!!!!01
360000              LDA     N!!!!!!01+1
360100              CMP     I!!!!!!01+1
360200              LDA     N!!!!!!01
360300              SBC     I!!!!!!01
360400              BMI     .L000365
360500   .L000366   EQU     *
360600    ;         DSAVE(I)=X(I)                                          00005260
360700              LDA     I!!!!!!01+1
360800              ASL     A
360900              STA     .T000007
361000              LDA     I!!!!!!01+1
361100              ASL     A
361200              TAX
361300              LDA     X!!!!!!01-2,X
361400              LDY     .T000007
361500              STA     DSAVE!01-2,Y
361600              LDA     X!!!!!!01-1,X
361700              STA     DSAVE!01-1,Y
361800    ;     20 CONTINUE                                                00005270
361900   .L000368   EQU     *
362000              JMP     .L000364
362100   .L000365   EQU     *
362200    ;         SAVP=VP                                                00005280
362300   .MFLTASG   SET     1
362400              JSR     .FLTASGN
362500              .BYTE   0
362600              .WORD   VP!!!01
362700              .WORD   SAVP!!01
362800    ;         SAVS=VS                                                00005290
362900   .MFLTASG   SET     1
363000              JSR     .FLTASGN
363100              .BYTE   0
363200              .WORD   VS!!!01
363300              .WORD   SAVS!!01
363400    ;         SAVPER = VPERR                                         00005300
363500   .MFLTASG   SET     1
363600              JSR     .FLTASGN
363700              .BYTE   0
363800              .WORD   VPERR!01
363900              .WORD   SAVPER!01
364000    ;         SAVSER = VSERR                                         00005310
364100   .MFLTASG   SET     1
364200              JSR     .FLTASGN
364300              .BYTE   0
364400              .WORD   VSERR!01
364500              .WORD   SAVSER!01
364600    ;     385 IF (IER .EQ. 1) GO TO 320                              00005320
364700   .L000363   EQU     *
364800              LDA     IER!!!01+1
364900              CMP     #1
365000              BNE     .L000369
365100              LDA     IER!!!01
365200              CMP     #0
365300              BNE     .L000369
365400              JMP     .L000281
365500   .L000369   EQU     *
365600    ;     380 CNT=CNT+1                                              00005330
365700
365800    ; CC      WRITE(9,390) CNT,VP,VS,(X(I),I=2,N)                    00005340
365900    ; C   390 FORMAT(1X,I6,4F7.0,I4I3/6I3)                           00005350
366000    ; C       WRITE(11,390) CNT,VP,VPERR,VS,VSERR,(X(I),I=2,N)       00005360
366100              LDA     CNT!!!01+1
366200              CLC
366300              ADC     #1
366400              STA     CNT!!!01+1
366500              LDA     CNT!!!01
366600              ADC     #0
366700              STA     CNT!!!01
366800    ;         GO TO 320                                              00005370
```

```
366900              JMP       .L000281
367000      ; C              EXIT PROGRAM                                           00005380
367100      ; C 400   WRITE(9,406)                                                   00005390
367200      ;     400 CONTINUE                                                       00005391
367300      .L000196 EQU     *
367400      ; C 406   FORMAT( /' -------------------------------------------------   00005400
367500      ; C      1'----------------NEW CASE'/)                                   00005410
367600      ;        CALL TIMES(ICPU,ITOD,HMS,DATE)                                  00005420
367700              LDA       #DATE!!01 MOD .M
367800              STA       TIMES.04
367900              LDA       #DATE!!01/256
368000              STA       TIMES.04+1
368100              LDA       #HMS!!!01 MOD .M
368200              STA       TIMES.03
368300              LDA       #HMS!!!01/256
368400              STA       TIMES.03+1
368500              LDA       #ITOD!!01 MOD .M
368600              STA       TIMES.02
368700              LDA       #ITOD!!01/256
368800              STA       TIMES.02+1
368900              LDA       #ICPU!!01 MOD .M
369000              STA       TIMES.01
369100              LDA       #ICPU!!01/256
369200              STA       TIMES.01+1
369300              JSR       TIMES
369400      ; C      WRITE(9,409) DATE,HMS                                           00005430
369500      ; C 409  FORMAT(/45X,' DATE = ',A8,' TIME = ',A8)                        00005440
369600      ; C      WRITE(9,101) TITLE                                              00005450
369700      ; C      WRITE(9,407) AK,AG                                              00005460
369800      ; C 407  FORMAT( /' AK = ',F7.3,' AG = ',F7.3)                           00005470
369900      ; C      WRITE(9,4071)                                                   00005480
370000      ; C 4071 FORMAT(/' GEOLOGICAL CONSTRAINTS '/45X,'STEP SIZE ')            00005490
370100      ;        DO 4073 IJ = 2,N                                                00005500
370200              LDA       #0
370300              STA       IJ!!!!01
370400              LDA       #2
370500              STA       IJ!!!!01+1
370600      ; C      WRITE(9,4072) XA(IJ),NUM(IJ),(NAME(II,IJ),II=1,8),XB(IJ),XINC(  00005510
370700              JMP       .L000373
370800      .L000371 EQU    *
370900              LDA       IJ!!!!01+1
371000              CLC
371100              ADC       #1
371200              STA       IJ!!!!01+1
371300              LDA       IJ!!!!01
371400              ADC       #0
371500              STA       IJ!!!!01
371600              LDA       N!!!!01+1
371800              LDA       N!!!!01
371900              SBC       IJ!!!!01
372000              BMI       .L000372
372100      .L000373 EQU    *
372200      ;        IF(IHIST(IJ) .NE. 1) GO TO 4073                                 00005520
372300              LDA       IJ!!!!01+1
372400              ASL       A
372500              TAX
372600              LDA       IHIST!01-1,X
372700              CMP       #1
372800              BNE       .L000377
372900              LDA       IHIST!01-2,X
373000              CMP       #0
373100              BEQ       .L000376
373200      .L000377 EQU    *
373300              JMP       .L000375
373400      .L000376 EQU    *
373500      ;        NTEMP = NUMBX(IJ)                                               00005530
373600      ; C      WRITE(9,4078) (HIST(IJ,I),I=1,NTEMP)                            00005540
373700      ; C4078  FORMAT(7X,'HISTOGRAM',21I3)                                     00005550
373800              LDA       IJ!!!!01+1
373900              ASL       A
374000              TAX
374100              LDA       NUMBX!01-2,X
374200              STA       NTEMP!01
374300              LDA       NUMBX!01-1,X
374400              STA       NTEMP!01+1
374500      ;   4073 CONTINUE                                                        00005560
374600      .L000375 EQU    *
374700              JMP       .L000371
374800      .L000372 EQU    *
374900      ; C 4072 FORMAT(4X,I3,' LE (',I3,'-',8A2,') LE ',I3,7X,I3)               00005570
375000      ;        IF (NUMSP .EQ. 0) GO TO 4077                                    00005580
```

```
375100              LDA    NUMSP!01+1
375200              CMP    #0
375300              BNE    .L000378
375400              LDA    NUMSP!01
375500              CMP    #0
375600              BNE    .L000378
375700              JMP    .L000380
375800     .L000378 EQU    *
375900   ; C        WRITE(9,4074)                                              00005590
376000   ; C 4074 FORMAT(/' SPECIAL GEOLOGICAL CONSTRAINTS'/)                   00005600
376100   ;          DO 4077 IOJ = 1,NUMSP                                      00005610
376200              LDA    #0
376300              STA    IOJ!!!01
376400              LDA    #1
376500              STA    IOJ!!!01+1
376600              JMP    .L000383
376700     .L000381 EQU    *
376800              LDA    IOJ!!!01+1
376900              CLC
377000              ADC    #1
377100              STA    IOJ!!!01+1
377200              LDA    IOJ!!!01
377300              ADC    #0
377400              STA    IOJ!!!01
377500              LDA    NUMSP!01+1
377600              CMP    IOJ!!!01+1
377700              ...    ...
377800              SBC    IOJ!!!01
377900              BMI    .L000382
378000     .L000383 EQU    *
378100   ;          NM1 = NUMSPC(IOJ*2+1)                                       00005620
378200     .MIMUL   SET    1
378300              JSR    .IMUL
378400              .BYTE  5
378500              .WORD  IOJ!!!01,.C000056
378600              .WORD  .T000018
378700              LDA    .T000018+1
378800              CLC
378900              ADC    #1
379000              ASL    A
379100              TAX
379200              LDA    NUMSPC01-2,X
379300              STA    NM1!!!01
379400              LDA    NUMSPC01-1,X
379500              STA    NM1!!!01+1
379600   ;          NM2 = NUMSPC(IOJ*2+2)                                       00005630
379700     .MIMUL   SET    1
379800              JSR    .IMUL
379900              .BYTE  5
380000              .WORD  IOJ!!!01,.C000056
380100              .WORD  .T000018
380200              LDA    .T000018+1
380300              CLC
380400              ADC    #2
380500   ; C        WRITE(9,4075) (NUMS(IOJ,1,I),I=1,NM1)                      00005640
380600   ; C 4075 FORMAT(1H+,6(I3,1X))                                          00005650
380700   ; C        WRITE(9,4076) TYPE(IOJ),(NUMS(IOJ,2,I),I=1,NM2)            00005660
380800   ; C 4076 FORMAT(27X,A2,6(1X,I3))                                       00005670
380900              ASL    A
381000              TAX
381100              LDA    NUMSPC01-2,X
381200              STA    NM2!!!01
381300              LDA    NUMSPC01-1,X
381400              STA    NM2!!!01+1
381500   ;          IF (IMULT(IOJ) .EQ. 0) GO TO 4077                          00005680
381600              LDA    IOJ!!!01+1
381700              ASL    A
381800              TAX
381900              LDA    IMULT!01-1,X
382000              CMP    #0
382100              BNE    .L000385
382200              LDA    IMULT!01-2,X
382300              CMP    #0
382400              BNE    .L000385
382500              JMP    .L000380
382600     .L000385 EQU    *
382700   ; C        WRITE(9,4080) (VMULT(IOJ,1,I),I=1,NM1)                     00005690
382800   ; C        WRITE(9,4081) (VMULT(IOJ,2,I),I=1,NM2)                     00005700
382900   ; C 4080 FORMAT(1H+,6F6.3)                                             00005710
383000   ; C 4081 FORMAT(37X,'-MULT-'.6F6.3)                                    00005720
383100   ;     4077 CONTINUE                                                   00005730
```

```
383200          .L000380 EQU     *
383300                   JMP     .L000381
383400          .L000382 EQU     *
383500          ;        IF (IVPVS .EQ. 2 .OR. IVPVS .GT. 4) GO TO 4172       00005740
383600                   LDA     #4
383700                   ~        IVPVS!01
383800                   LDA     #0
383900                   SBC     IVPVS!01
384000                   BMI     .L000388
384100                   LDA     #0
384200                   BEQ     *+4
384300          .L000388 LDA     #80H
384400                   STA     .T000018
384500                   LDA     IVPVS!01+1
384600                   CMP     #2
384700                   BNE     .L000389
384800                   LDA     IVPVS!01
384900                   CMP     #0
385000                   BNE     .L000389
385100          .L000390 LDA     #80H
385200                   BNE     *+4
385300          .L000389 LDA     #0
385400                   ORA     .T000018
385500                   ASL     A
385600                   BCS     *+5
385700                   JMP     .L000391
385800                   JMP     .L000392
385900          .L000391 EQU     *
386000          ; C       WRITE(9,4170)
386100          ; C 4170 FORMAT(/'VOIGHT REUSS HILL BOUNDS ON BULK AND SHEAR MODULII'/)00005760
386200          ;        GO TO 4173                                            00005770
386300                   JMP     .L000393
386400          ; C 4172 WRITE(9,4171)                                         00005780
386500          ;  4172 CONTINUE                                               00005781
386600          .L000392 EQU     *
386700          ; C 4171 FORMAT(/'HASHIN SHTRIKMAN BOUNDS ON BULK AND SHEAR MODULII'/) 00005790
386800          ;  4173 CONTINUE                                               00005800
386900          .L000393 EQU     *
387000          ; C       WRITE(9,401) CNT,MTCNT                               00005810
387100          ; C 401  FORMAT(I8,'  POSSIBLE CASES OUT OF ',I10,' CONSTR. SATISFYING'00005820
387200          ; C      1' CASES')                                            00005830
387300          ; C      WRITE(7,401) CNT,MTCNT                                00005840
387400          ; C      WRITE(9,402) VELP,VELPD,VELS,VELSD,DEN,DEND           00005850
387500          ; C 402  FORMAT(/14X,'   VP    ERROR    VS    ERROR DENSITY ERROR '/  00005860
387600          ; C      1' OBSERVED       ',4(F7.0),2F7.3)                    00005870
387700          ;        DSAV = SQRT(DSAV)                                     00005880
387800                   LDA     #DSAV!!01 MOD .M
387900                   STA     SQRT.001
388000                   LDA     #DSAV!!01/256
388100                   STA     SQRT.001+1
388200                   LDA     #.T000073 MOD .M
388300                   STA     SQRT.000
388400                   LDA     #.T000073/256
388500                   STA     SQRT.000+1
388600                   JSR     SQRT
388700          ; C      WRITE(9,403) SAVP,SAVPER,SAVS,SAVSER,DENCL,DSAV       00005890
388800          ; C 403  FORMAT(' CLOSEST CASE ',4F7.0,F7.3/' DISTANCE = ',E10.3/) 00005900
388900          .MFLTASG SEI     1
389000                   JSR     .FLTASGN
389100                   .BYTE   0
389200                   .WORD   .T000073
389300                   .WORD   DSAV!!01
389400          ;        DO 404 IJ = 2,N                                       00005910
389500                   LDA     #0
389600                   STA     IJ!!!!01
389700                   STA     IJ!!!!01+1
389800                   JMP     .L000396
389900          .L000394 EQU     *
390000                   LDA     IJ!!!!01+1
390100                   CLC
390200                   ADC     #1
390300                   STA     IJ!!!!01+1
390400                   LDA     IJ!!!!01
390500                   ADC     #0
390600                   STA     IJ!!!!01
390700                   LDA     N!!!!01+1
390800                   CMP     IJ!!!!01+1
390900                   LDA     N!!!!01
391000                   SBC     IJ!!!!01
391100                   BMI     .L000395
391200          .L000396 EQU     *
391300          ;  404 CONTINUE                                                00005919
391400          .L000398 EQU     *
391500                   JMP     .L000394
391600          .L000395 EQU     *
```

```
391800      ; C 404    WRITE(9,405) NUM(IJ),(NAME(II,IJ),II=1,8),DSAVE(IJ)              00005920
391900      ;    402 CONTINUE                                                            00005921
392000      .L000399 EQU    *
392100      ; C 405    FORMAT( I3,2X,8A2,3X,I3)                                           00005930
392200      ;          IF (CNT .LT. 1) GO TO 192                                          00005940
392300                 LDA    CNT!!!01+1
392400                 CMP    #1
392500                 LDA    CNT!!!01
392600                 SBC    #0
392700                 BMI    .L000401
392800                 JMP    .L000400
392900      .L000401 EQU    *
393000                 JMP    .L000402
393100      .L000400 EQU    *
393200      ;          LMN = IQQ(N)
393300      ; C        WRITE(7,391) LMN                                                   00005950
393400                 LDA    N!!!!!01+1                                                  00005960
393500                 ASL    A
393600                 TAX
393700                 LDA    IQQ!!!01-2,X
393800                 STA    LMN!!!01
393900                 LDA    IQQ!!!01-1,X
394000                 STA    LMN!!!01+1
394100      ;          IF (LMN .LT. 22) GO TO 4174                                        00005970
394200                 LDA    LMN!!!01+1
394300                 CMP    #22
394400                 LDA    LMN!!!01
394500                 SBC    #0
394600                 BMI    .L000405
394700                 JMP    .L000404
394800      .L000405 EQU    *
394900                 JMP    .L000406
395000      .L000404 EQU    *
395100      ; CC       WRITE(9,391) (IRANG2(LL,1),LL=1,51)                                00005980
395200      ; CC       WRITE(9,391) (IRANG2(LL,2),LL=1,51)                                00005990
395300      ;          NTEMP = (XB(N) - XA(N)) / XINC(N)                                  00006000
395400                 LDA    N!!!!01+1
395500                 ASL    A
395600                 STA    .T000007
395700                 ASL    A
395800                 ASL    A
395900                 TAX
396000                 LDA    XB!!!01-1,X
396100                 SEC
396200                 LDY    .T000007
396300                 SBC    XA!!!01-1,Y
396400                 STA    .T000018+1
396500                 LDA    XB!!!01-2,X
396600                 SBC    XA!!!01-2,Y
396700                 STA    .T000018
396800                 LDA    N!!!!01+1
396900                 ASL    A
397000                 CLC
397100                 ADC    #(XINC!!01-2) MOD .M
397200                 STA    .T000019
397300                 LDA    #0
397400                 ADC    #(XINC!!01-2)/256
397500                 STA    .T000019+1
397600      .MIDIV   SET    1
397700                 JSR    .IDIV
397800                 .BYTE  7
397900                 .WORD  .T000018,-.T000019
398000                 .WORD  NTEMP!01
398100      ;          NTEMP = NTEMP + 1                                                  00006010
398200                 LDA    NTEMP!01+1
398300                 CLC
398400                 ADC    #1
398500                 STA    NTEMP!01+1
398600                 LDA    NTEMP!01
398700                 ADC    #0
398800                 STA    NTEMP!01
398900      ;          IDX=21+N                                                           00006019
399000                 LDA    #21
399100                 CLC
399200                 ADC    N!!!!!01+1
399300                 STA    IDX!!!01+1
399400                 LDA    #0
399500                 ADC    N!!!!!01
399600                 STA    IDX!!!01
399700      ;          IRANGE(IDX)=XA(N)                                                  00006020
399800                 LDA    IDX!!!01+1
```

```
399900              ASL    A
400000              STA    .T000007
400100              LDA    N!!!!!01+1
400200              ASL    A
400300              TAX
400400              LDA    XA!!!!01-2,X
400500              LDY    .T000007
400600              STA    IRANGE01-2,Y
400700              LDA    XA!!!!01-1,X
400800              STA    IRANGE01-1,Y
400900      ;       IDX=42+N                                        00006029
401000              LDA    #42
401100              CLC
401200              ADC    N!!!!!01+1
401300              STA    IDX!!!01+1
401400              LDA    #0
401500              ADC    N!!!!!01
401600              STA    IDX!!!01
401700      ;       IRANGE(IDX)=0                                   00006030
401800              LDA    IDX!!!01+1
401900              ASL    A
402000              STA    .T000007
402100              LDA    #0
402200              LDX    .T000007
402300              STA    IRANGE01-2,X
402400              LDA    #0
402500              STA    IRANGE01-1,X
402600      ;       DO 4177 LL=2,NTEMP                              00006040
402700              LDA    #0
402800              STA    LL!!!!01
402900              LDA    #2
403000              STA    LL!!!!01+1
403100              JMP    .L000409
403200  .L000407 EQU    *
403300              LDA    LL!!!!01+1
403400              CLC
403500              ADC    #1
403600              STA    LL!!!!01+1
403700              LDA    LL!!!!01
403800              ADC    #0
403900              STA    LL!!!01
404000              LDA    NTEMP!01+1
404100              CMP    LL!!!!01+1
404200              LDA    NTEMP!01
404300              SBC    LL!!!!01
404400              BMI    .L000408
404500  .L000409 EQU    *
404600      ;       IDX=LL*42+N                                     00006049
404700  .MIMUL      SET    1
404800              JSR    .IMUL
404900              .BYTE  5
405000              .WORD  LL!!!!01,.C000308
405100              .WORD  .T000018
405200              LDA    .T000018+1
405300              CLC
405400              ADC    N!!!!!01+1
405500              STA    IDX!!!01+1
405600              LDA    .T000018
405700              ADC    N!!!!!01
405800              STA    IDX!!!01
405900      ;       IRANGE(IDX)=0                                   00006050
406000              LDA    IDX!!!01+1
406100              ASL    A
406200              STA    .T000007
406300              LDA    #0
406400              LDX    .T000007
406500              STA    IRANGE01-2,X
406600              LDA    #0
406700              STA    IRANGE01-1,X
406800      ;    4177 IRANGE(LL*21+N)=IRANGE(LL*21+N-21)+XINC(N)    00006060
406900  .L000411 EQU    *
407000  .MIMUL      SET    1
407100              JSR    .IMUL
407200              .BYTE  5
407300              .WORD  LL!!!!01,.C000005
407400              .WORD  .T000018
407500              LDA    .T000018+1
407600              CLC
407700              ADC    N!!!!!01+1
```

```
407800            STA    .T000019
407900   .MIMUL   SET    1
408000            JSR    .IMUL
408100            .BYTE  5
408200            .WORD  LL!!!!01,.C000005
408300            .WORD  .T000018
408400            LDA    .T000018+1
408500            CLC
408600            ADC    N!!!!!01+1
408700            STA    .T000033+1
408800            LDA    .T000018
408900            ADC    N!!!!!01
409000            STA    .T000033
409100            LDA    .T000033+1
409200            SEC
409300            SBC    #21
409400            STA    .T000018
409500            LDA    .T000019
409600            ASL    A
409700            STA    .T000007
409800            LDA    N!!!!!01+1
409900            ASL    A
410000            STA    .T000019
410100            LDA    .T000018
410200            ASL    A
410300            TAX
410400            LDA    IRANGE01-1,X
410500            CLC
410600            LDY    .T000019
410700            ADC    XINC!!01-1,Y
410800            STX    .T000018
410900            LDX    .T000007
411000            STA    IRANGE01-1,X
411100            STX    .T000007
411200            LDX    .T000018
411300            LDA    IRANGE01-2,X
411400            ADC    XINC!!01-2,Y
411500            LDX    .T000007
411600            STA    IRANGE01-2,X
411700            JMP    .L000407
411800  .L000408 EQU     *
411900   ;        ITEST = XINC(N) / 2                                    00006070
412000            LDA    N!!!!!01+1
412100            ASL    A
412200            CLC
412300            ADC    #(XINC!!01-2) MOD .M
412400            STA    .T000019
412500            LDA    #0
412600            ADC    #(XINC!!01-2)/256
412700            STA    .T000019+1
412800   .MIDIV   SET    1
412900            JSR    .IDIV
413000            .BYTE  5
413100            .WORD  -.T000019,.C000056
413200            .WORD  ITEST!01
413300   ;        ITEST = ITEST + 1                                      00006080
413400            LDA    ITEST!01+1
413500            CLC
413600            ADC    #1
413700            STA    ITEST!01+1
413800            LDA    ITEST!01
413900            ADC    #0
414000            STA    ITEST!01
414100   ;        DO 4178 LL = 1,LMN                                     00006090
414200            LDA    #0
414300            STA    LL!!!!01
414400            LDA    #1
414500            STA    LL!!!!01+1
414600            JMP    .L000414
414700  .L000412 EQU     *
414800            LDA    LL!!!!01+1
414900            CLC
415000            ADC    #1
415100            STA    LL!!!!01+1
415200            LDA    LL!!!!01
415300            ADC    #0
415400            STA    LL!!!!01
415500            LDA    LMN!!!01+1
415600            CMP    LL!!!!01+1
415700            LDA    LMN!!!01
415800            SBC    LL!!!!01
```

```
415900              BMI     .L000413
416000   .L000414 EQU      *
416100   ;          DO 4180 LQ = 1,NTEMP                              00006100
416200              LDA     #0
416300              STA     LQ!!!!01
416400              LDA     #1
416500              STA     LQ!!!!01+1
416600              JMP     .L000419
416700   .L000417 EQU      *
416800              LDA     LQ!!!!01+1
416900              CLC
417000              ADC     #1
417100              STA     LQ!!!!01+1
417200              LDA     LQ!!!!01
417300              ADC     #0
417400              STA     LQ!!!!01
417500              LDA     NTEMP!01+1
417600              CMP     LQ!!!!01+1
417700              LDA     NTEMP!01
417800              SBC     LQ!!!!01
417900              BMI     .L000418
418000   .L000419 EQU      *
418100   ;          ITEMP=IABS(IRANGE(LQ*2+N)-IRANG2(LL*2+1))          00006110
418200   .MIMUL   SET     1
418300              JSR     .IMUL
418400              .BYTE   5
418500              .WORD   LQ!!!!01,.C000005
418600              .WORD   .T000018
418700              LDA     .T000018+1
418800              CLC
418900              ADC     N!!!!!01+1
419000              STA     .T000019
419100   .MIMUL   SET     1
419200              JSR     .IMUL
419300              .BYTE   5
419400              .WORD   LL!!!!01,.C000056
419500              .WORD   .T000018
419600              LDA     .T000018+1
419700              CLC
419800              ADC     #1
419900              ASL     A
420000              STA     .T000007
420100              LDA     .T000019
420200              ASL     A
420300              TAX
420400              LDA     IRANGE01-1,X
420500              SEC
420600              LDY     .T000007
420700              SBC     IRANG201-1,Y
420800              STA     .T000018+1
420900              LDA     IRANGE01-2,X
421000              SBC     IRANG201-2,Y
421100              STA     .T000018
421200              LDA     #.T000018 MOD .M
421300              STA     IABS.001
421400              LDA     #.T000018/256
421500              STA     IABS.001+1
421600              LDA     #.T000018 MOD .M
421700              STA     IABS.000
421800              LDA     #.T000018/256
421900              STA     IABS.000+1
422000              JSR     IABS
422100              LDA     .T000018
422200              STA     ITEMP!01
422300              LDA     .T000018+1
422400              STA     ITEMP!01+1
422500   ;          IF (ITEST - ITEMP) 4180,4180,4179                  00006120
422600              LDA     ITEST!01+1
422700              SEC
422800              SBC     ITEMP!01+1
422900              STA     .T000018+1
423000              LDA     ITEST!01
423100              SBC     ITEMP!01
423200              STA     .T000018
423300   .MARIF   SET     1
423400              JSR     .ARIF
423500              .BYTE   1
423600              .WORD   .T000018
423700              .WORD   .L000421
423800              .WORD   .L000421
423900              .WORD   .L000422
424000   ;   4179 IRANGE(LQ*42+N)=IRANGE(LQ*42+N)+IRANG2(LL*2+2)       00006130
```

```
424100      .L000422 EQU    *
424200      .MIMUL   SET    1
424300               JSR    .IMUL
424400               .BYTE  5
424500               .WORD  LU!!!!01,.C000308
424600               .WORD  .T000018
424700               LDA    .T000018+1
424800               CLC
424900               ADC    N!!!!!01+1
425000               STA    .T000019
425100      .MIMUL   SET    1
425200               JSR    .IMUL
425300               .BYTE  5
425400               .WORD  LU!!!!01,.C000308
425500               .WORD  .T000018
425600               LDA    .T000018+1
425700               CLC
425800               ADC    N!!!!!01+1
425900               STA    .T000033
426000      .MIMUL   SET    1
426100               JSR    .IMUL
426200               .BYTE  5
426300               .WORD  LL!!!!01,.C000056
426400               .WORD  .T000018
426500               LDA    .T000018+1
426600               CLC
426700               ADC    #2
426800               STA    .T000073
426900               LDA    .T000019
427000               ASL    A
427100               STA    .T000007
427200               LDA    .T000073
427300               ASL    A
427400               STA    .T000018
427500               LDA    .T000033
427600               ASL    A
427700               TAX
427800               LDA    IRANGE01-1,X
427900               CLC
428000               LDY    .T000018
428100               ADC    IRANG201-1,Y
428200               STX    .T000018
428300               LDX    .T000007
428400               STA    IRANGE01-1,X
428500               STX    .T000007
428600               LDX    .T000018
428700               LDA    IRANGE01-2,X
428800               ADC    IRANG201-2,Y
428900               LDX    .T000007
429000               STA    IRANGE01-2,X
429100      ;        GO TO 4178                                  00006140
429200               JMP    .L000416
429300      ;   4180 CONTINUE                                    00006150
429400      .L000421 EQU    *
429500               JMP    .L000417
429600      .L000418 EQU    *
429700      ;   4178 CONTINUE                                    00006160
429800      .L000416 EQU    *
429900               JMP    .L000412
430000      .L000413 EQU    *
430100      ;        IUU(N) = NTEMP                              00006170
430200               LDA    N!!!!!01+1
430300               ASL    A
430400               STA    .T000007
430500               LDA    NTEMP!01
430600               LDX    .T000007
430700               STA    IUU!!!01-2,X
430800               LDA    NTEMP!01+1
430900               STA    IUU!!!01-1,X
431000      ;        GO TO 4176                                  00006180
431100               JMP    .L000423
431200      ;   4174 DO 4175 LL = 1,LMN                          00006190
431300      .L000406 EQU    *
431400               LDA    #0
431500               STA    LL!!!!01
431600               LDA    #1
431700               STA    LL!!!!01+1
431800               JMP    .L000426
431900      .L000424 EQU    *
432000               LDA    LL!!!!01+1
432100               CLC
```

```
432200              ADC     #1
432300              STA     LL!!!!01+1
432400              LDA     LL!!!!01
432500              ADC     #0
432600              STA     LL!!!!01
432700              LDA     LMN!!!01+1
432800              CMP     LL!!!!01+1
432900              LDA     LMN!!!01
433000              SBC     LL!!!!01
433100              BMI     .L000425
433200     .L000426 EQU     *
433300     ;        IRANGE(LL*21+N)=IRANG2(LL*2+1)                          00006200
433400     .MIMUL   SET     1
433500              JSR     .IMUL
433600              .BYTE   5
433700              .WORD   LL!!!!01,.C000005
433800              .WORD   .T000018
433900              LDA     .T000018+1
434000              CLC
434100              ADC     N!!!!!01+1
434200              STA     .T000019
434300     .MIMUL   SET     1
434400              JSR     .IMUL
434500              .BYTE   5
434600              .WORD   LL!!!!01,.C000056
434700              .WORD   .T000018
434800              LDA     .T000018+1
434900              CLC
435000              ADC     #1
435100              STA     .T000033
435200              LDA     .T000019
435300              ASL     A
435400              STA     .T000007
435500              LDA     .T000033
435600              ASL     A
435700              TAX
435800              LDA     IRANG201-2,X
435900              LDY     .T000007
436000              STA     IRANGE01-2,Y
436100              LDA     IRANG201-1,X
436200              STA     IRANGE01-1,Y
436300     ; 4175   IRANGE(LL*42+N)=IRANG2(LL*2+2)                          00006210
436400     .L000428 EQU     *
436500     .MIMUL   SET     1
436600              JSR     .IMUL
436700              .BYTE   5
436800              .WORD   LL!!!!01,.C000308
436900              .WORD   .T000018
437000              LDA     .T000018+1
437100              CLC
437200              ADC     N!!!!!01+1
437300              STA     .T000019
437400     .MIMUL   SET     1
437500              JSR     .IMUL
437600              .BYTE   5
437700              .WORD   LL!!!!01,.C000056
437800              .WORD   .T000018
437900              LDA     .T000018+1
438000              CLC
438100              ADC     #2
438200              STA     .T000033
438300              LDA     .T000019
438400              ASL     A
438500              STA     .T000007
438600              LDA     .T000033
438700              ASL     A
438800              TAX
438900              LDA     IRANG201-2,X
439000              LDY     .T000007
439100              STA     IRANGE01-2,Y
439200              LDA     IRANG201-1,X
439300              STA     IRANGE01-1,Y
439400              JMP     .L000424
439500     .L000425 EQU     *
439600     ; 4176   CONTINUE                                                00006220
439700     .L000423 EQU     *
439800     ;        DO 192 IJ = 2,N                                         00006230
439900              LDA     #0
440000              STA     IJ!!!!01
440100              LDA     #2
440200              STA     IJ!!!!01+1
```

```
440300            JMP     .L000431
440400  ..L000429 EQU     *
440500            LDA     IJ!!!!01+1
440600            CLC
440700            ADC     #1
440800            STA     IJ!!!!01+1
440900            LDA     IJ!!!!01
441000            ADC     #0
441100            STA     IJ!!!!01
441200            LDA     N!!!!01+1
441300            CMP     IJ!!!!01+1
441400            LDA     N!!!!01
441500            SBC     IJ!!!!01
441600            BMI     .L000430
441700   .L000431 EQU     *
441800  ;         LMN  =  IQQ(IJ)
441900  ; C       WRITE(11,391) NUM(IJ),LMN                           00006240
442000  ; C       WRITE(11,391) (IRANGE(LL,1,IJ),LL=1,LMN)             00006250
442100  ; C       WRITE(11,391) (IRANGE(LL,2,IJ),LL=1,LMN)             00006260
442200            LDA     IJ!!!!01+1                                   00006270
442300            ASL     A
442400            TAX
442500            LDA     IQQ!!!01-2,X
442600            STA     LMN!!!01
442700            LDA     IQQ!!!01-1,X
442800            STA     LMN!!!01+1
442900  ;  192    CONTINUE                                             00006280
443000   .L000402 EQU     *
443100            JMP     .L000429
443200   .L000430 EQU     *
443300  ; C 391   FORMAT(1316)                                         00006290
443400  ;         RETURN                                               00006300
443500            JMP     .R000001
443600  ;         END
443700   .R000001 RTS                                                  00006310
```

The Embodiments of the Invention in which an exclusive property or privilege is claimed are defined as follows:

1. Method of accurately determining lithology of an earth formation to identify ore, marker rocks, economic minerals or the like, using a refraction exploration field system including a series of detectors, positioned along a line or survey at inline positions $X_1, X_2, \ldots X_n$ and at least one seismic source located adjacent to said detectors for producing a seismic wave for travel through said formation:

(a) generating a seismic wave at a first sourcepoint location adjacent said series of detectors;
   (b) after said wave undergoes refraction, detecting arrival of a refracted wave at said series of detectors at said inline offset positions, to obtain a first set of traces associated with said offset positions $X_1, X_2, \ldots X_n$;
   (c) repeating steps (a) and (b) by generating a second wave at a second sourcepoint adjacent to inline position $X_n$ of said detector positions, and detecting said refracted wave to obtain a second set of traces;
   (d) advancing said series of detectors a selected number of inline positions or fractions thereof and repeating steps (a), (b) and (c) above to obtain additional sets of traces, but in which said additional sets of traces are associated with more than two inline positions overlapping common inline positions of said first and second sets of traces;
   (e) distinguishing arrival times of shear waves from compressional waves so as to indicate true compressional and shear wave velocities associated with a series of depth intervals within said earth formation;
   (f) after computing compressional and shear wave velocity values for a plurality of mineral compositions of variable size, comparing such computed values with said indicated true compressional and shear wave velocities of step (e) whereby the lithology of said earth formation can be accurately predicted.

2. The method of claim 1 in which step (f) includes the substeps of (i) constraining said plurality of mineral compositions interactively based on selected relationships:
   (ii) computing compressional and shear wave velocity values for said constrained mineral compositions; and
   (iii) comparing said computed velocity values for said constrained mineral compositions with said true velocities provided by said refraction exploration system whereby lithology of said earth formation can be accurately predicted.

3. The method of claim 2 in which substep (iii) includes:

(a) plotting said true velocities associated with said depth intervals and said refraction system as a function of each other to form a $V_p$ vs. $V_s$ plot, with boundry limits thereof being indicated along abscissa and ordinate axes of said plot;
   (b) annotating all mineral compositions those computed compressional and shear wave velocity values are plottable on said $V_p$ vs. $V_s$ plot whereby probable lithogy of said depth intervals is indicated.

4. The method of claim 3 in which substep (b) includes plotting annotation symbols associated with said mineral compositions on said $V_p$ vs. $V_s$ plot.

5. The method of claim 3 in which substep (b) includes printing a report containing said mineral compositions meeting said plottable selection criterian.

6. The method of claim 3 in which substep (b) includes statistical ranking said mineral composition.

7. The method of claim 6 in which the statistical ranking of substep (b) is based on distance proximity to said true velocities and known geological parameters associated with said earth formation.

8. In accurately determining lithology of an earth formation to identify ore, marker rocks, economic minerals or the like, using a refraction exploration field system including a series of detectors, positioned along a line or survey at inline positions $X_1, X_2, \ldots X_n$ and at least one seismic source located adjacent to said detectors for producing a seismic wave for travel through said formation, means for distinguishing arrival times of refracted shear waves from compressional waves and indicating true observed compressional velocity ($V_p$) and true observed shear wave velocity ($V_s$) of a series of depth intervals within said earth formation, memory means for storing said true $V_p$, $V_s$ velocities as a function of depth interval, means for computing compressional and shear wave velocity values for a plurality of mineral compositions and associated means for comparing said computed velocity values with said true stored compressional and shear wave velocities whereby lithology of said depth interval can be accurately predicted 9. Means of claim 8 in which said associated means selects all compositions within selected $V_p/V_s$ bounds associated with said true $V_p$, $V_s$ values and rejects all other compositions outside said bounds.

10. Means of claim 9 in which said associated means also includes plotting-printing means for plotting and/or printing a list of said compositions within said selected $V_p/V_s$ bounds.

11. Means of claim 8 in which said associated means selects all compositions within selected $V_p/V_s$ bounds associated with said true $V_p$, $V_s$ values and rejects all other compositions outside said bounds, as well as statistically ranking said mineral compositions.

12. Means of claim 11 in which statistical ranking by said associated means is based on distance promimity to said true $V_p$, $V_s$ values and known geological parameters associated with said earth formation.

* * * * *